(12) United States Patent
McCormick et al.

(10) Patent No.: US 11,708,729 B2
(45) Date of Patent: *Jul. 25, 2023

(54) ROBOTIC SYSTEM FOR MAKING OR BREAKING A RISER

(71) Applicants: TRANSOCEAN SEDCO FOREX VENTURES LIMITED, Grand Cayman (KY); Stebbins Innovations, LLC, Houston, TX (US)

(72) Inventors: Craig McCormick, Houston, TX (US); Michael Coady, Houston, TX (US); John Martin, Houston, TX (US); James Lippold, Houston, TX (US); Michael Willey, Houston, TX (US); Shane McClaugherty, Houston, TX (US)

(73) Assignees: STEBBINS INNOVATIONS, LLC, Houston, TX (US); TRANSOCEAN SEDCO FOREX VENTURES LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,243

(22) Filed: Nov. 15, 2022

(65) Prior Publication Data
US 2023/0072336 A1    Mar. 9, 2023

Related U.S. Application Data

(63) Continuation of application No. 17/402,265, filed on Aug. 13, 2021, now Pat. No. 11,499,383, which is a
(Continued)

(51) Int. Cl.
*E21B 19/16*    (2006.01)
*B25J 9/16*    (2006.01)
*E21B 17/08*    (2006.01)

(52) U.S. Cl.
CPC ............ *E21B 19/165* (2013.01); *B25J 9/1697* (2013.01); *E21B 17/085* (2013.01); *G05B 2219/40306* (2013.01)

(58) Field of Classification Search
CPC .... E21B 19/165; E21B 17/085; B25J 9/1697; G05B 2219/40306
See application file for complete search history.

(56) References Cited

U.S. PATENT DOCUMENTS

| 5,687,417 | A | * | 11/1997 | Furlani | ............... G03B 9/24 396/510 |
| 9,840,886 | B1 | | 12/2017 | Gable et al. | |

(Continued)

FOREIGN PATENT DOCUMENTS

| CN | 107298424 A | 10/2017 |
| ES | 1139433 U | 5/2015 |
| GB | 2579556 A | 7/2020 |

OTHER PUBLICATIONS

Webpage for Robo-Spider Automate Bolting System, dated Oct. 17, 2019, retrieved online from https://www.torqlite.com/products/robo-spider-2/,2 pages.
(Continued)

*Primary Examiner* — Christopher J Sebesta
(74) *Attorney, Agent, or Firm* — Panitch Schwarze Belisario & Nadel LLP

(57) ABSTRACT

The system for making or breaking the riser includes a robotic system. The robotic system includes one or more robotic arms configured to be disposed on a spider deck, and one or more riser-connection manipulation tools each having a camera and being configured to manipulate a riser connection, the camera being configured to capture an image of an object, wherein each robotic arm is configured to couple to one riser-connection manipulation tool. Further the system for making or breaking the riser includes a control
(Continued)

system. The control system includes a robot controller in communication with the one or more robotic arms and configured to control the one or more robotic arms. The system for making or breaking the riser is configured to analyze the image to determine the location and orientation of the object and transmit the location and orientation of the object to the robot controller.

22 Claims, 38 Drawing Sheets

Related U.S. Application Data continuation-in-part of application No. PCT/US2021/038501, filed on Jun. 22, 2021.

(60) Provisional application No. 63/084,824, filed on Sep. 29, 2020, provisional application No. 63/084,824, filed on Sep. 29, 2020.

(56) References Cited

U.S. PATENT DOCUMENTS

| | | | |
|---|---|---|---|
| 2010/0025046 A1* | 2/2010 | Francis | E21B 17/085 166/380 |
| 2016/0312550 A1* | 10/2016 | Jonassen | E21B 19/16 |
| 2017/0314369 A1 | 11/2017 | Rosano et al. | |
| 2018/0021945 A1 | 1/2018 | Pettersen et al. | |
| 2018/0224029 A1* | 8/2018 | Ruehmann | E21B 19/166 |
| 2019/0078402 A1* | 3/2019 | Domec | G01M 5/0025 |
| 2019/0226287 A1* | 7/2019 | Trydal | G06V 10/10 |
| 2020/0001414 A1* | 1/2020 | Wen | B60B 29/006 |
| 2021/0114151 A1* | 4/2021 | Vornweg | B23P 19/069 |

OTHER PUBLICATIONS

International Search Report and Written Opinion issued by the International Searching Authority for Application No. PCT/US2021/038501, dated Sep. 13, 2021, 15 pages.

Office Action dated Dec. 7, 2021 in U.S. Appl. No. 17/402,265.

Notice of Allowance dated Mar. 23, 2022 in U.S. Appl. No. 17/402,265.

Notice of Allowance dated Jul. 20, 2022 in U.S. Appl. No. 17/402,265.

* cited by examiner

100

100

100

100

100

100

100

100

300

300

400

400

430

450

450

700

701

705

740

Top View                Bottom View

116

911

1000

1000

1020

421

1111 riser flange

421

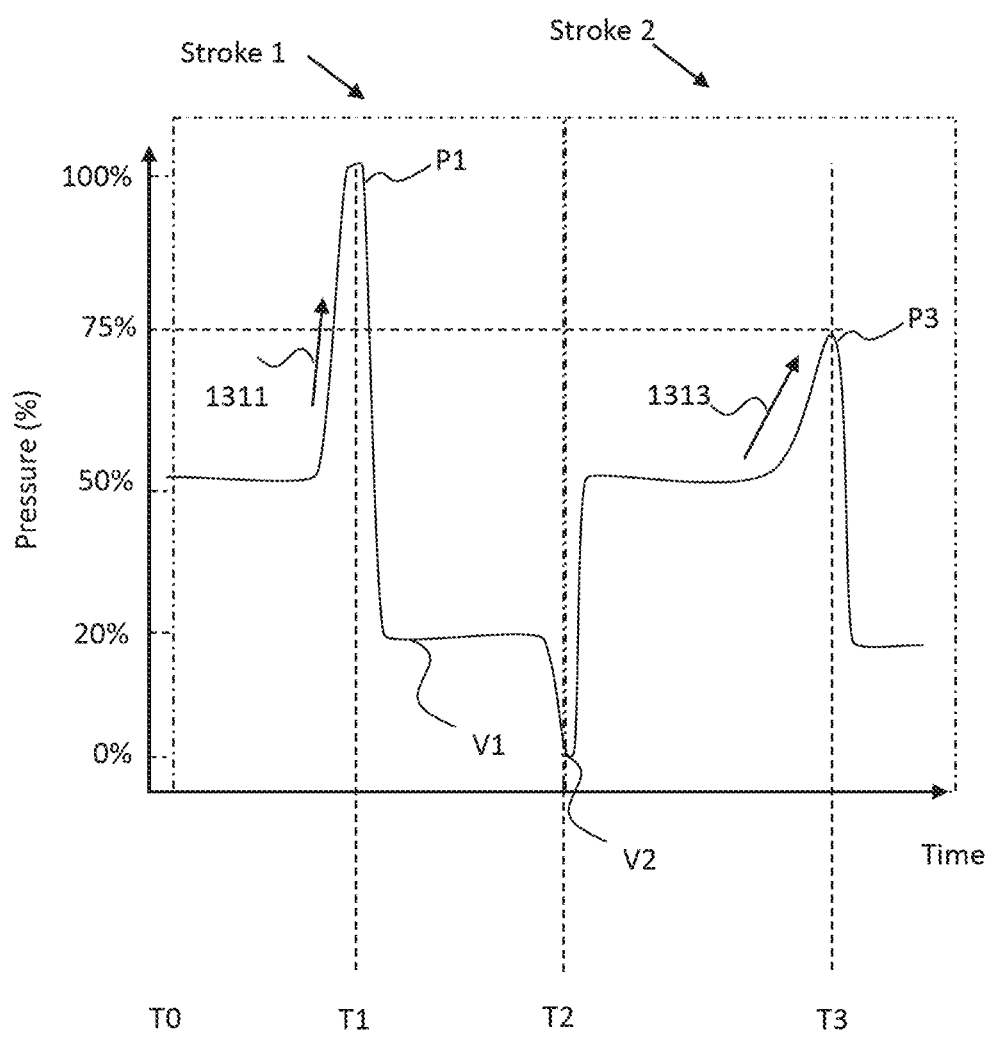

1400

1500

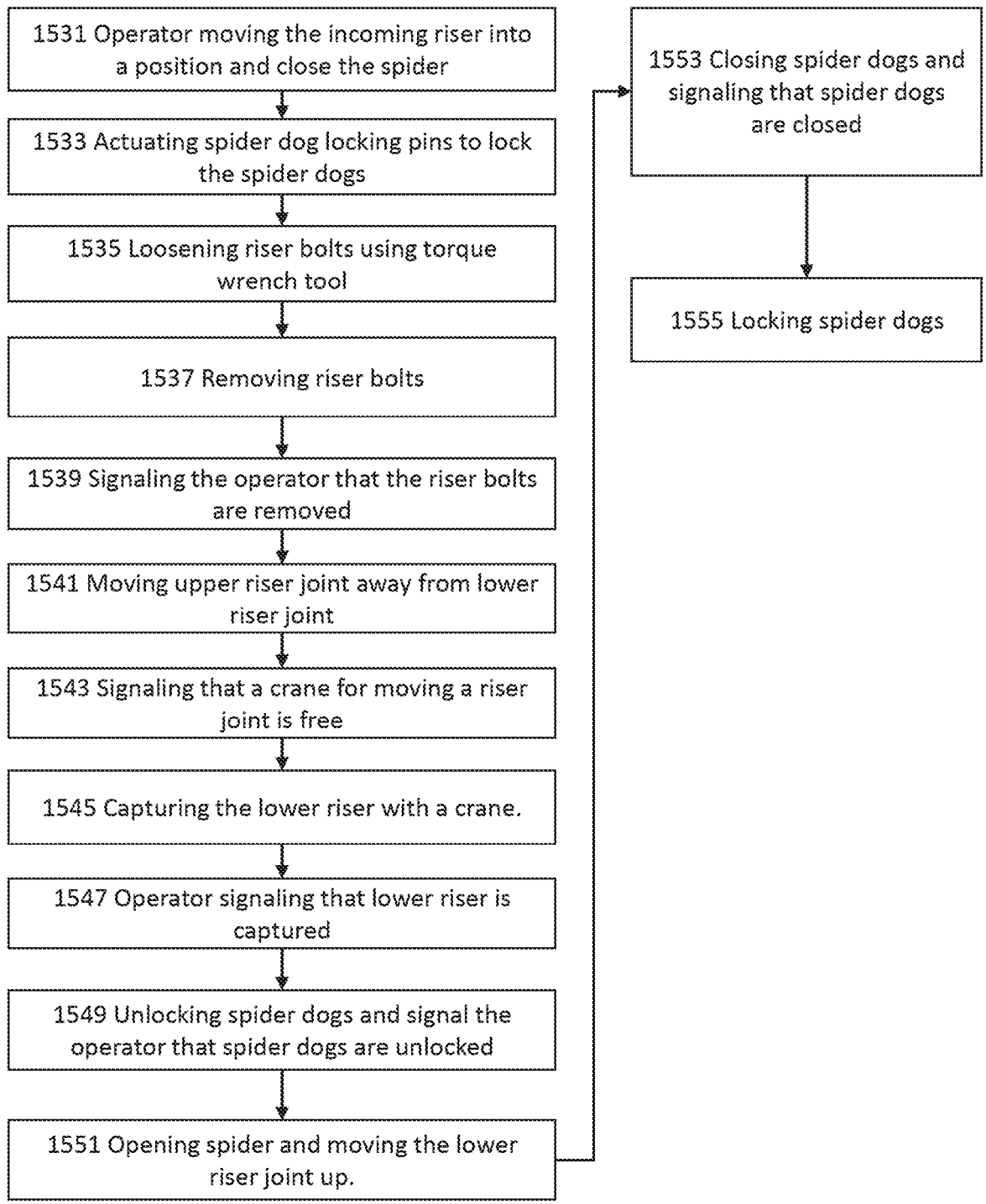

1801

1802

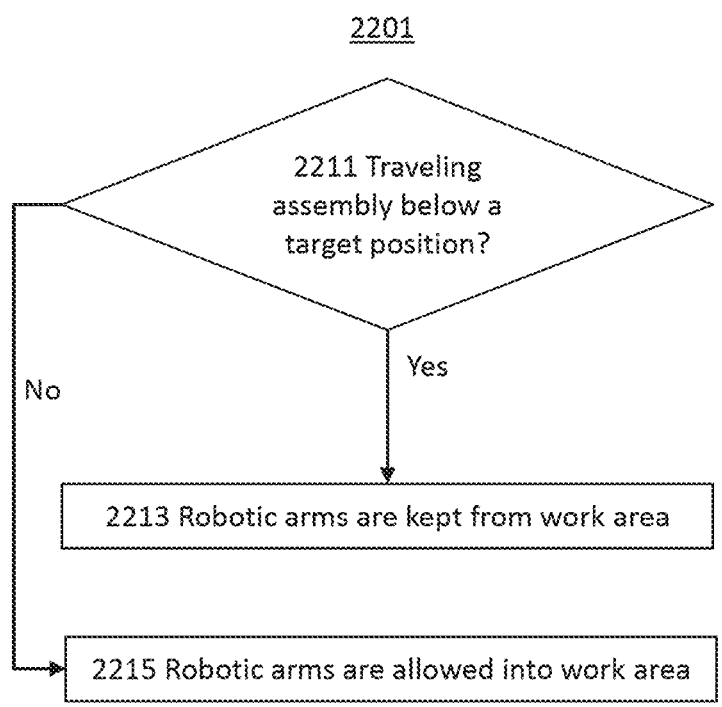

ROBOTIC SYSTEM FOR MAKING OR BREAKING A RISER

RELATED APPLICATIONS

This application is a continuation of U.S. patent application Ser. No. 17/402,265, filed on Aug. 13, 2021, which claims priority to and the benefit of U.S. Provisional Patent Application No. 63/084,824, filed Sep. 29, 2020. U.S. patent application Ser. No. 17/402,265 is also a continuation-in-part of International Patent Application No. PCT/US2021/038501, filed on Jun. 22, 2021, which claims priority to and the benefit of U.S. Provisional Patent Application No. 63/084,824. The disclosures of each of the aforementioned applications are hereby incorporated by reference in their entireties.

TECHNICAL FIELD

The present disclosure generally relates to offshore well risers and, in particular, to a system for connecting riser joints to form a riser or for disconnecting riser joints to break a riser.

BACKGROUND

In offshore drilling operations, the drilling operations may be performed using a drilling riser. The drilling riser may extend between the subsea wellhead assembly at the seafloor and the drilling vessel. The drilling riser may be made up of a number of individual riser joints. These riser joints may be connected to each other using connecting elements such as riser bolts. Further, the drilling riser also has a number of auxiliary conduits that extend around the main central pipe. These auxiliary conduits supply hydraulic fluid pressure to the subsea blowout preventer and lower marine riser package.

It is common for riser joints to have riser flanges which may be connected with a number of bolts spaced around the circumference of these riser flanges. For such risers, a riser spider—a platform for connecting and disconnecting riser joints may be used. The riser spider may have a circular opening through which the riser is extended and may include mechanisms for supporting and stabilizing riser joints while they are being connected to or disconnected from other riser joints.

Typically, to connect or disconnect riser joints, workers use wrenches to run down (screw) or remove (unscrew) riser bolts. Personnel employed to secure these riser bolts are exposed to a risk of injury or death. Also, manipulating the individual bolts is time consuming. Therefore, there is a need for improving a process of connecting and disconnecting riser joints. The present disclosure addresses problems of present drilling risers that require workers to connect or disconnect riser joints.

SUMMARY

The present disclosure relates to a system for making or breaking a riser. Consistent with a disclosed embodiment, the system for making or breaking the riser includes a robotic system. The robotic system includes one or more robotic arms configured to be disposed on a spider deck, and one or more riser-connection manipulation tools each having a camera and being configured to manipulate a riser connection. The camera is configured to capture an image of an object, and each robotic arm is configured to couple to one riser-connection manipulation tool. Further, the system for making or breaking the riser includes a control system. The control system includes a robot controller in communication with the one or more robotic arms, and is configured to control the one or more robotic arms. The system for making or breaking the riser is configured to analyze the image to determine the location and orientation of the object and transmit the location and orientation of the object to the robot controller.

Consistent with another disclosed embodiment, a multi-function tool is provided. The multi-functional tool is configured to perform a function associated with making or breaking a riser. Further, the multi-function tool includes a camera configured to capture an image of an object, a socket disposed below the camera and configured to engage a head of a riser bolt, a servo motor operatively coupled to the socket and configured to drive the socket, and a fork tool assembly having a retaining fork disposed in proximity to the socket. The fork tool assembly is configured to pick and place the object using the retaining fork.

Consistent with another disclosed embodiment, a method of making a riser using the system for making or breaking a riser is provided. The method includes aligning a second riser joint with a first riser joint. The first riser joint is disposed below the second riser joint. The method further includes initiating a programmed sequence of steps to command the one or more robotic arms to pick up a plurality of riser bolts from a bolt receptacle, to place the plurality of riser bolts into flange holes of the second rider joint, and to tighten each one of the riser bolts, thereby connecting the second riser joint with the first riser joint. Further, the method includes lowering the second riser joint to be below the spider deck. Additionally, steps of the method for making the riser may be repeated until a desired number of riser joints are connected to form the riser.

Consistent with another disclosed embodiment, a method of breaking a riser using the system for making or breaking a riser is provided. The method of breaking a riser includes moving a riser joint of the riser onto the spider deck, commanding the control system to insert spider dog locking pins to lock the spider deck, and initiating a programmed sequence of steps to command the one or more robotic arms to determine the position and orientation of each riser bolt that is fastened to the riser joint, to loosen each riser bolt from the riser joint, and to remove each riser bolt from the riser joint. Further, the method includes removing the riser joint from the riser. Additionally, steps of the method for breaking the riser may be repeated until a desired number of riser joints are removed from the riser.

The foregoing general description and the following detailed description are exemplary and explanatory only and are not restrictive of the claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 13 is an example detection of a torque exerted on a riser bolt by the torque wrench tool.

FIGS. 15A and 15B are example processes for breaking a riser, according to an embodiment.

FIG. 22 is a diagram of a control logic for removing or keeping robotic arms in work area, according to an embodiment.

DETAILED DESCRIPTION

Aspects of the present disclosure are related to a system for making or breaking a riser such as a marine riser. An example riser includes multiple riser joints, and making the riser includes connecting these riser joints via riser flanges to form a riser. In an example embodiment, the riser may be sufficiently long (e.g., tens, hundred, and sometimes, more than a thousand meters long) to reach an ocean floor.

Figure 1A:
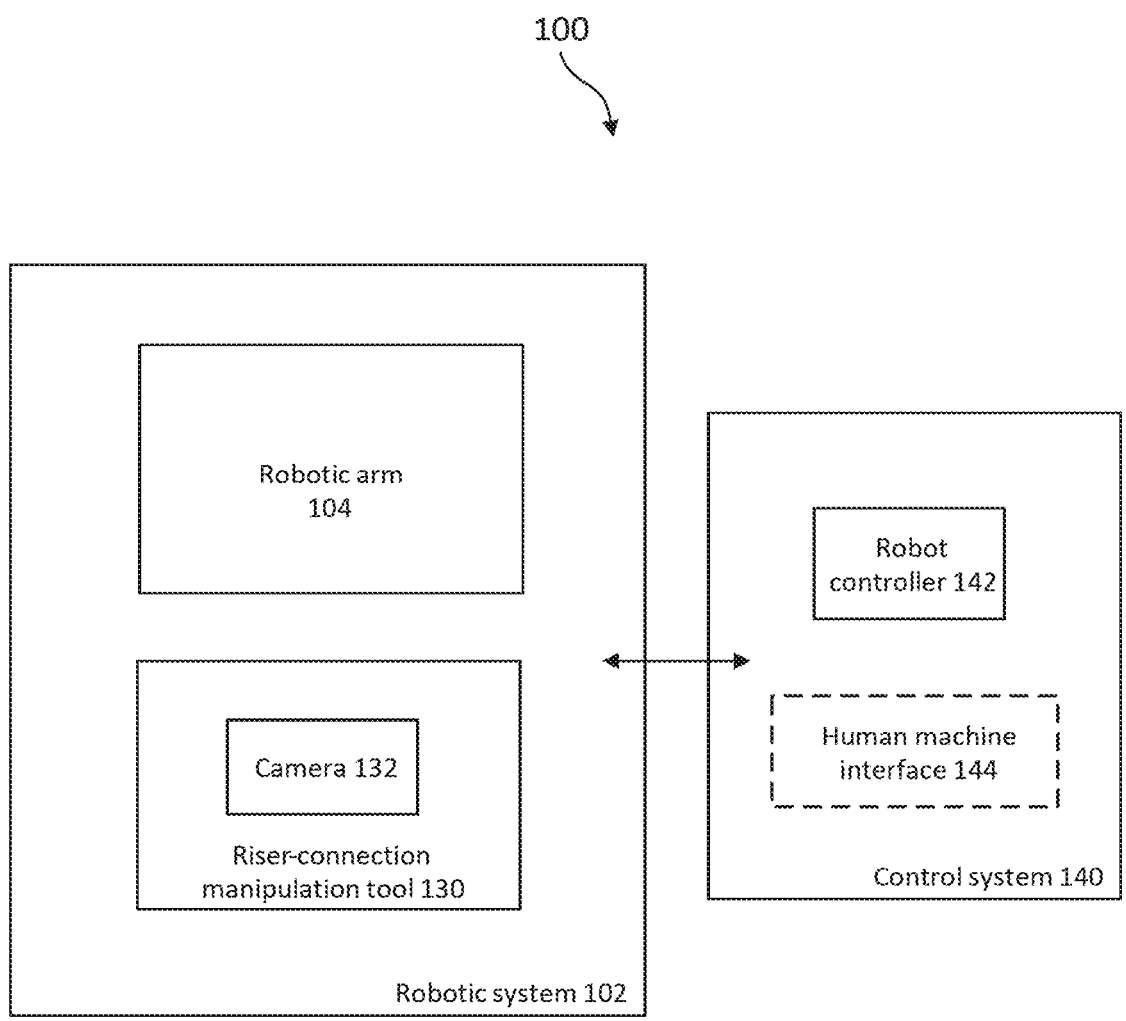
FIG. 1A is an example diagram of a system for making or breaking a riser according to an embodiment.

FIG. 1A shows an example diagram of a system 100 for making or breaking a riser. Consistent with disclosed embodiments, system 100 for making or breaking the riser includes a robotic system 102 for joining the riser joints of the riser (i.e., making the riser) or disjoining the riser joints of the riser (i.e., breaking the riser). Robotic system 102 includes one or more robotic arms 104 (herein, also referred to, in a singular form, as a robotic arm 104) located on a supporting deck (herein, referred to as a spider deck, consistent with a common terminology used for offshore drilling). Further, the robotic system includes one or more riser-connection manipulation tools 130 (herein, also referred to, in a singular form, as a riser-connection manipulation tool 130) for manipulating a riser connection. In an example embodiment, the riser connection can be a riser bolt, a breech lock, or a latching dog. Accordingly, manipulating a riser connection can include placing a riser bolt into the riser joint, removing a riser bolt from the riser joint, manipulating a breech lock, manipulating a latching dog, or a combination thereof. For example, when riser-connection manipulation tool 130 is used to manipulate the breech lock, riser-connection manipulation tool 130 is configured to rotate a breech lock sleeve to engage the breach mechanism and insert a locking pin to positively lock the connection. When riser-connection manipulation tool 130 is used to manipulate a latching dog, riser-connection manipulation tool 130 is configured to engage the latch dog actuator screw head and to screw the screw head until the latch dog actuator screw achieves the pre-determined torque value.

Figure 1B:
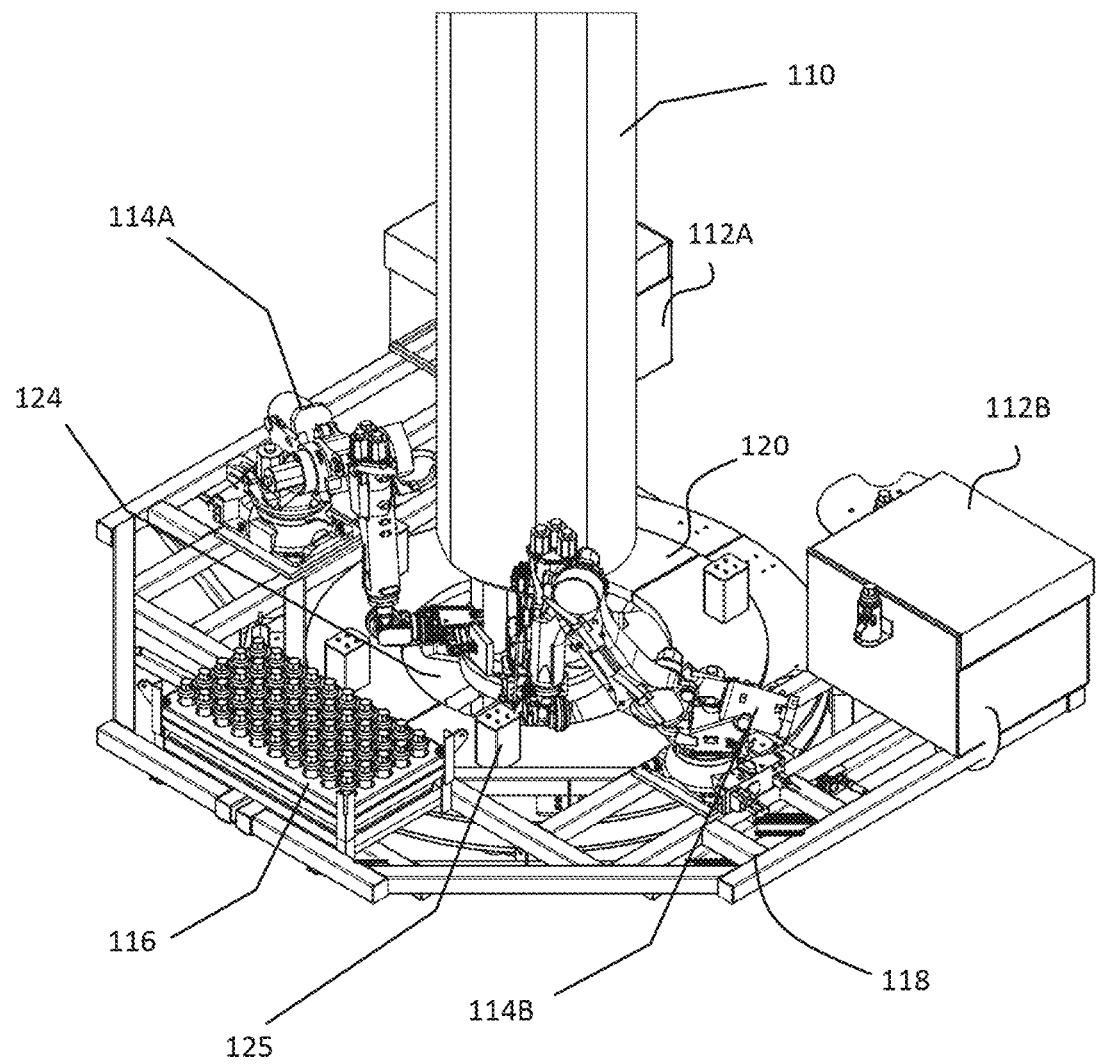
FIGS. 1B-1H are different views of an example system for making or breaking a riser, according to an embodiment.
Figure 1C:
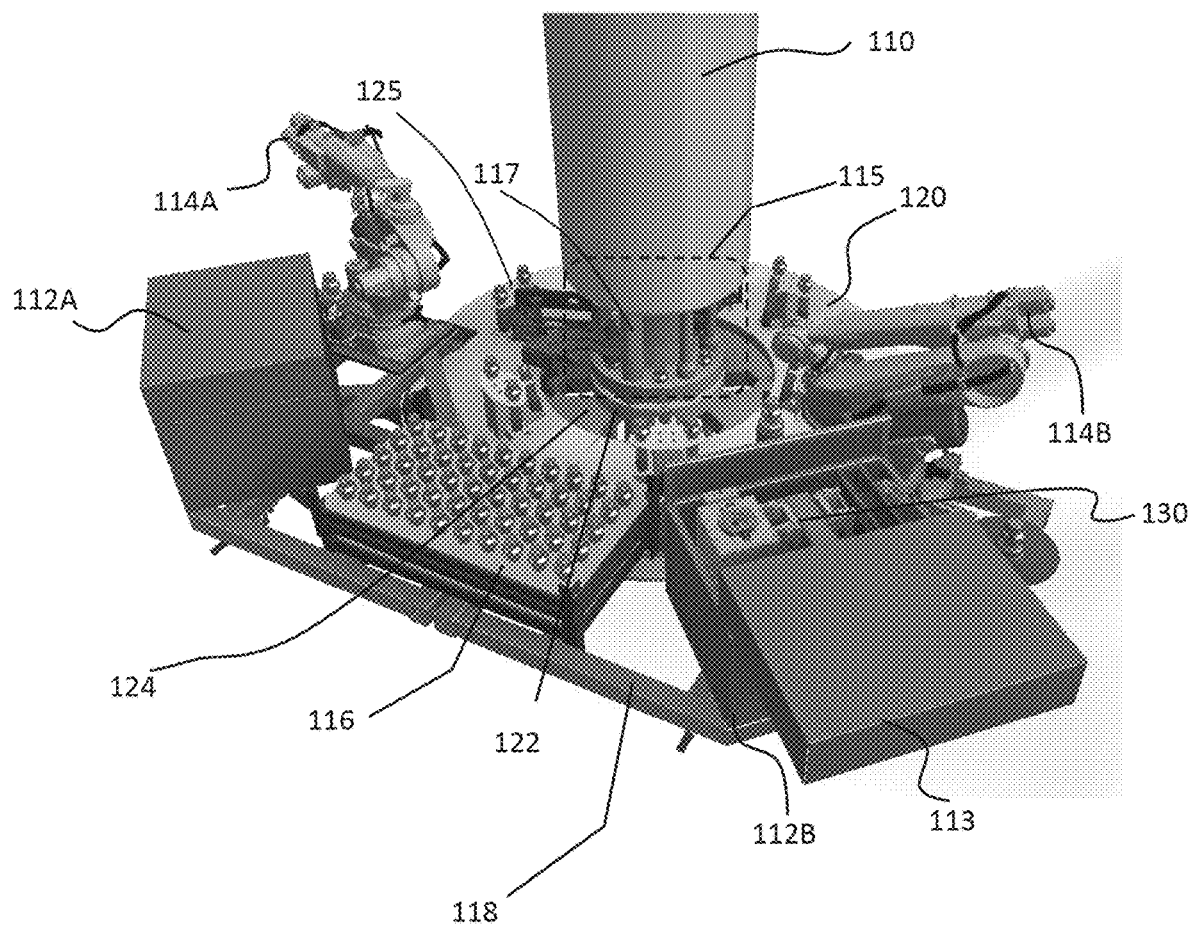
Figure 1D:
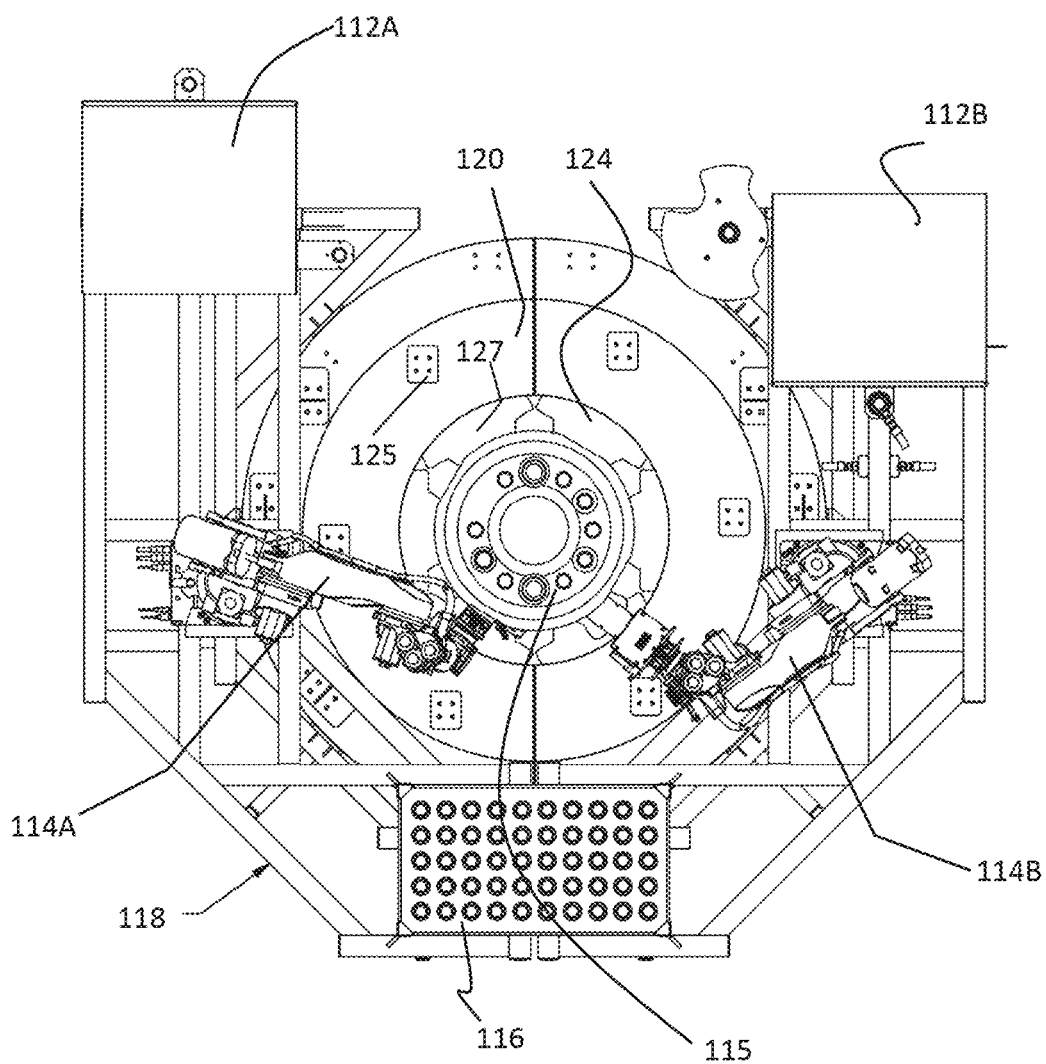
Figure 1E:
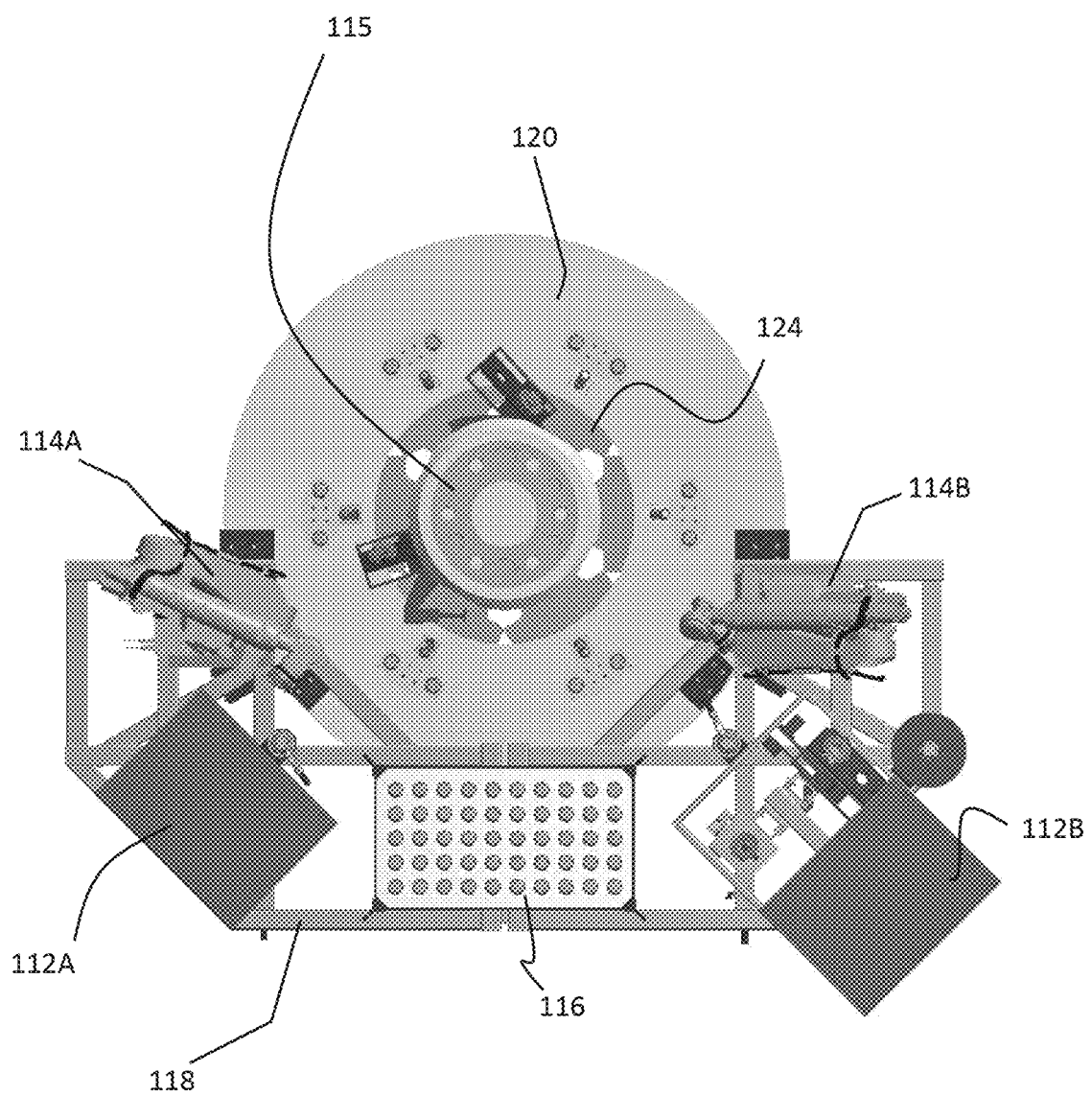
Figure 1F:
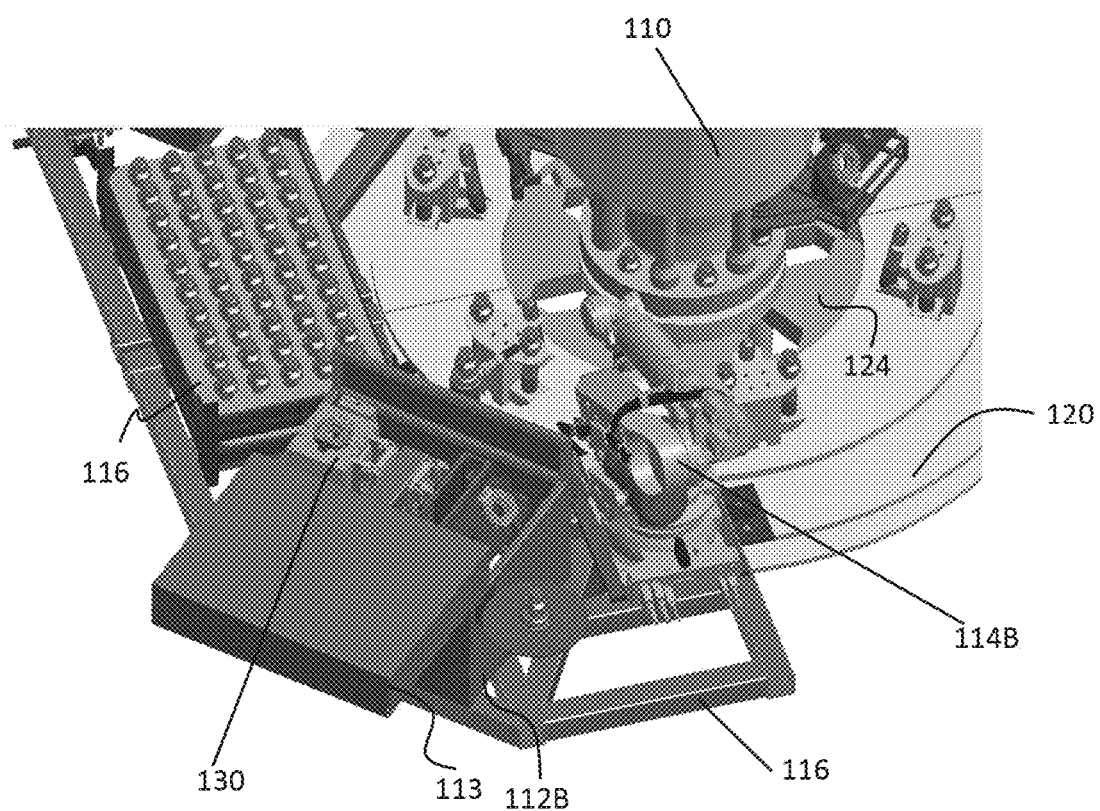
Figure 1G:
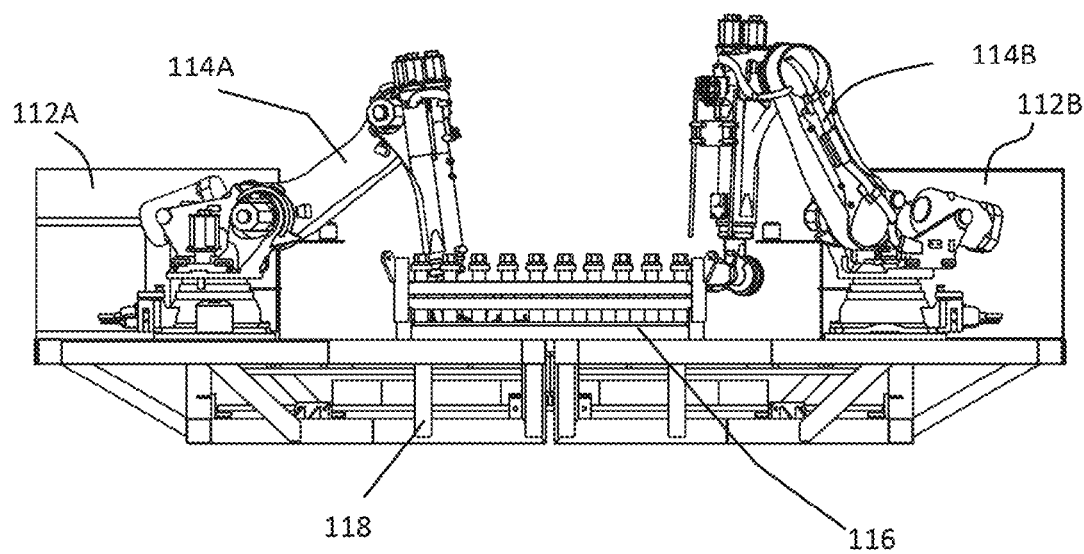
Figure 1H:
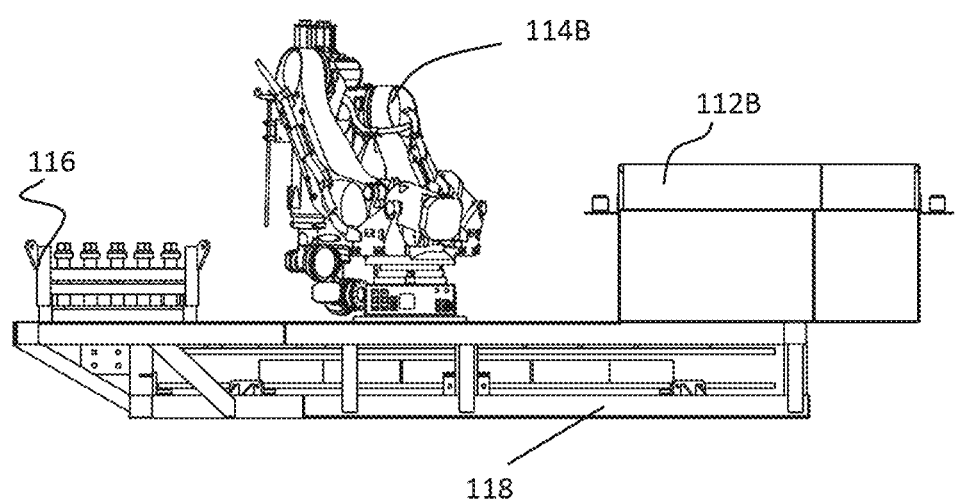
Figure 1I:
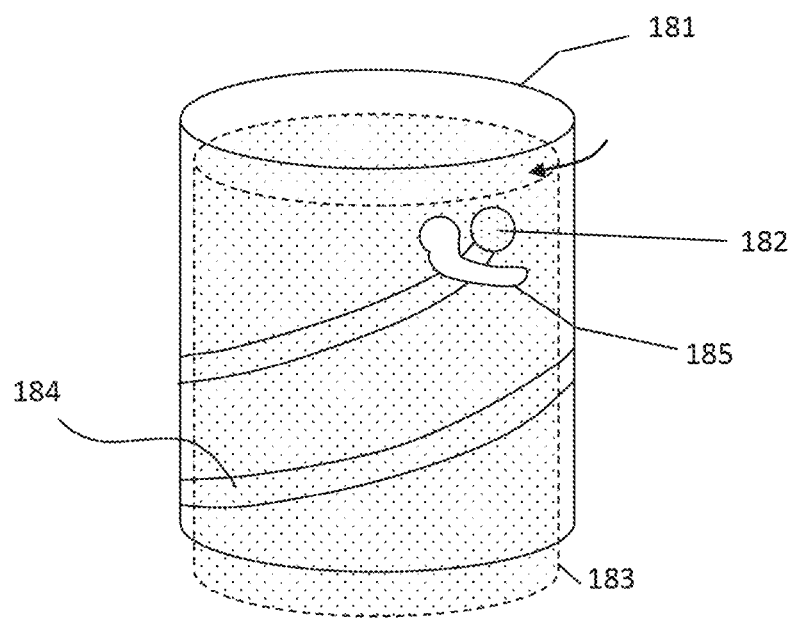
FIG. 1I is an example breech lock connection, according to an embodiment.

FIG. 1I shows an example of a breech lock connection for connecting a breech lock sleeve 181 of a top riser joint with a bottom section 183 of a bottom riser joint. In an example embodiment, breech lock sleeve 181 is configured to rotate in a clockwise direction relative to bottom section 183, and when breech lock sleeve 181 is rotated in the clockwise direction and lowered onto bottom section 183, element 182 follows a spiral opening 184 in breech lock sleeve 181. Element 182 is then secured by a pin 185, thus, preventing element 182 from moving back through spiral opening 184. Further pin 185 is configured to prevent counterclockwise rotation of breech lock sleeve 181. As another example, in some implementations, the rotation directions can be reversed.

Figure 1J:
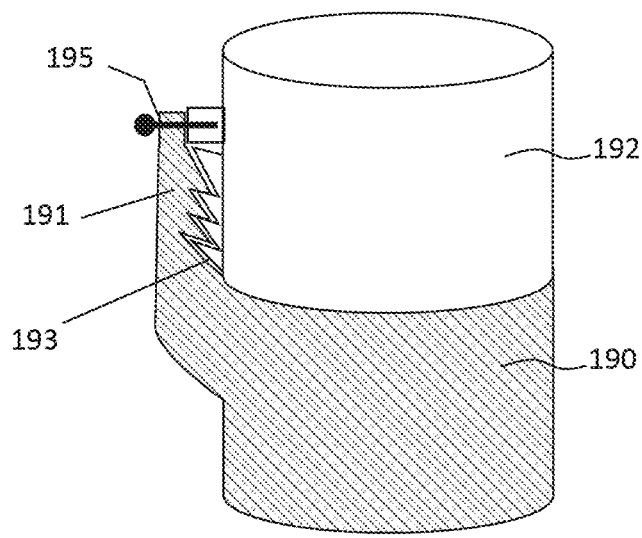
FIG. 1J is an example latching dog connection, according to an embodiment.

FIG. 1J shows an example of a latching dog connection. For example, latching dog 191 connected to a bottom riser joint 190 is attached to a receiving portion 193 of a top riser joint 192, and latching dog 191 is secured to top riser joint 192 via actuator screw 195, ensuring that latching dog 191 is coupled to receiving portion 193. As shown in FIG. 1J, both latching dog 191 and receiving portion 193 includes protrusions that allow for a sufficiently tight coupling of latching dog 191 and receiving portion 193. In an example embodiment, the protrusions are configured not to allow motion of latching dog 191 relative to receiving portion 193 when latching dog 191 is secured via actuator screw 195.

Riser-connection manipulation tool 130 is configured to include a camera 132, which may be used for controlling riser-connection manipulation tool 130. For example, camera 132 may be configured to capture an image of an object (e.g., the object may be a top portion of a riser connection, such as a bolt). In various embodiments, different types of riser-connection manipulation tools may be used for different types of manipulations, as further described below. In various embodiments, robotic arms 104 are configured to couple to a selected riser-connection manipulation tool 130 at a given time period, depending on the tasks that need to be performed.

Consistent with disclosed embodiments, the system for making or breaking the riser includes a control system 140 that includes a robot controller 142 in communication with one or more robotic arms 104 and configured to control one or more robotic arms 104 (e.g., control motions of the robotic arms, control forces exerted by robotic arms 104 on various objects, control orientations of robotic arms 104, and the like).

Further, system 100 (e.g., via camera 132 or via control system 140) is configured to analyze the collected images to determine a location and orientation of an object (e.g., a riser bolt), and transmit the location and orientation of the object to the robot controller. In an example embodiment, the image analysis may be performed using any suitable algorithm (e.g., pattern recognition, line detection, a suitable neural network such as a convolutional neural network, a decision tree, and the like). In an example embodiment, the image analysis may include image pre-processing. For example, image pre-processing may improve the image data (features) by removing or reducing noise, suppressing unwanted distortions, and enhancing some important image features. Further, the image analysis may include detection of an object in an image, and classification of the object. In some cases, the image analysis may also be done (or helped by) an operator of the system for making or breaking the riser.

Besides having robot controller 142, control system 140 may include a human machine interface 144 for allowing a human operator to control various aspects of control system 140. In an example embodiment, via human machine interface 144, the human operator may be configured to control robotic arms 104, camera 132, modify software instructions of control system 140, or exercise any other type of control over robotic system 102 (e.g., exercise control over functions of riser-connection manipulation tool 130).

FIGS. 1B and 1C show an example system 100 for making or breaking the riser. In an example embodiment, the riser is formed by connecting riser joints, such as a riser joint 110. Riser joint 110 may be placed vertically, as shown in FIG. 1B, over a spider 120, as shown in FIGS. 1B and 1C. As shown in FIG. 1C, spider 120 is a platform that includes a circular opening through which riser joints can be extended. Spider 120 includes spider dogs 124—movable elements for securing and holding in place a riser. As shown in FIG. 1D, spider dogs 124 extend towards riser flanges and may be configured to secure and hold in place at least one riser flange (e.g., in FIG. 1C, spider dogs 124 are extended to hold a lower riser flange). Spider dogs 124 may apply sufficient pressure onto surfaces of a riser flange to secure the riser flange. When spider dogs 124 are extended towards a riser, spider dogs 124 may be secured by spider dog locking pins, as further described below.

Riser joint 110 may include a first connection joint 115 (herein also referred to as first riser flange 115) for connecting riser joint 110 to a second connection joint 122 (second riser flange 122), as shown in FIG. 1C, of another riser joint. In various embodiments, riser flanges may include openings (herein also referred to as flange holes) for accepting a riser bolt. In example embodiments, the flange holes may be threaded, and riser bolt may be screwed into a flange hole. Alternatively, a riser bolt may be inserted into the flange hole and a nut (herein also referred to as a riser nut) may be used to secure the riser bolt. Further, a riser joint may include a hydraulic line 117 with a corresponding hydraulic port.

System 100 includes one or more robotic arms, such as robotic arms 114A and 114B, as shown in FIGS. 1B and 1C. Robotic arms 114A and 114B may be multi-axis robots mounted on the starboard and port side of a spider deck 118, as shown in FIGS. 1B and 1C. In a first embodiment of system 100 as shown in FIG. 1B, tool cabinet 112A is located to the left of robotic arm 114A and tool cabinet 112B is located to the right of robotic arm 114B. Alternatively, a second embodiment of system 100, shown in FIG. 1C, includes tool cabinet 112A located to the right of robotic arm 114A and tool cabinet 112B located to the left of robotic arm 114B. FIG. 1C, shows tool cabinet 112B partially open. For example, a lid 113 of cabinet 112B may be configured to slide (as shown in FIG. 1C) to allow robotic arm 114B to reach riser-connection manipulation tool 130 located within cabinet 112B. The locations of tool cabinets 112A and 112B can vary, depending on the embodiment of the system, as long as they are within reaching distance of their respective robotic arm.

As shown in FIG. 1C, in a second embodiment of system 100, tool cabinets 112A and 112B are located in proximity of a bolt receptacle 116. Bolt receptacle 116 is configured to hold riser connections (e.g., bolts) for joining riser flanges of riser joints of a riser. It should be noted that bolt receptacle 116 may be configured to hold not only bolts but any other suitable riser connections (e.g., clips, pins, breech lock, latching dog, and the like) that may be utilized for connecting connection joints, depending on connection joint configuration.

System 100 is configured to make and break connection joints of riser joints on the rig floor without human intervention. In various embodiments, various components of system 100 (e.g., robotic arms 114A and 114B, bolt receptacle 116, tool cabinets 112A and 112B, or any other suitable components needed for making or breaking the riser) are mounted on spider deck 118. In some cases, components of system 100 are configured to move along with the riser and spider 120 to keep an accurate location in relationship between the robotic system and the riser.

FIGS. 1D-1F shows various embodiments of system 100 from different view angles. For example, FIGS. 1D and 1E shows a top view of system 100 including spider deck 118, spider 120, spider dogs 124, tool cabinets 112A and 112B, robotic arms 114A and 114B, bolt receptacle 116, and a connection joint 115. Also, FIG. 1D shows spider dog locking pin assembly 125 (also shown in FIGS. 1B-1C), which can be used to lock a corresponding spider dog 127 in place. FIG. 1D shows an embodiment of system 100 corresponding to the embodiment shown in FIG. 1B, in which tool cabinets 112A and 112B are located respectively to the left and right of robotic arms 114A and 114B, while FIG. 1E shows an embodiment of system 100 corresponding to the embodiment shown in FIG. 1C, in which tool cabinets 112A and 112B are located respectively to the right and left of robotic arms 114A and 114B. FIG. 1G shows a side view of system 100 including tool cabinets 112A and 112B, robotic arms 114A and 114B, bolt receptacle 116, and spider deck 118. FIG. 1H shows another side view of system 100, including robotic arm 114B, cabinet 112B, bolt receptacle 116, and spider deck 118. In an example embodiment, spider deck 118 is attached to spider 120, and may be a part of spider 120.

In an example embodiment, one robotic arm can be used. In an example embodiment, a few (e.g., two, three, four, or more) robotic arms (e.g., robotic arms 114A and 114B) can be used. In an example embodiment, a first robotic arm (e.g., robotic arm 114A) is configured to be disposed on a first side of spider deck 118 and a second robotic arm (e.g., robotic arm 114B) is configured to be disposed on a second side of spider deck 118. For example, one of the robotic arms may be mounted on the starboard side, and another robotic arm may be mounted on the port side of spider deck 118. The robotic arms are configured to be placed at locations on spider deck 118 such that each one of the robotic arms can reach bolt receptacle 116 and a corresponding one of tool cabinet 112A or 112B. Further, each one of the robotic arms is configured to reach regions (i.e., areas and surfaces) of connection joints (i.e., riser flanges) such that both arms in combination are configured to reach all of the regions of connection joints. In some cases, when one robotic arm cannot reach a certain region of a connection joint, another robotic arm is configured to reach that region. Alternatively, each robotic arm may be configured to reach all of the regions of connection joint.

In various embodiments, system 100 can include two or more riser-connection manipulation tools. In an example embodiment, riser-connection manipulation tool 130 is a multi-function tool configured to perform at least one of the following, place a riser bolt into a flange hole, remove the riser bolt from the flange hole, manipulate the breech lock, manipulate the latching dog, manipulate a stabbing guide, manipulate a hole cover, apply a pre-determined torque, or a combination thereof. Various embodiments of a riser-connection manipulation tool 130 and ways to manipulate one or more of these tools are further described below.

As described above, one or more robotic arms (e.g., robotic arms 114A and 114B) may have six degrees of freedom. In an example embodiment, the first robotic arm is substantially diametrically opposed to the second robotic arm (i.e., the first robotic arm, the riser and the second robotic arm are positioned on a substantially straight line). Alternatively, the first robotic arm, the riser and the second robotic arm may form a triangle, with an angle at the riser being less than 180 degrees (e.g., the angle at the riser may be 150 degrees, 120 degrees, or 90 degrees). Further, at least some components of system 100 (e.g., robotic arms 114A and 114B) may be configured to be mounted onto a skid that is mounted onto spider deck 118, the skid being configured to permit system 100 to be in a fixed position relative to the riser. In an example embodiment, the skid is configured to be movable in any lateral direction relative to the riser. In some cases, the skid may be configured to be movable in a vertical direction. Additionally, or alternatively, the entire spider deck 118 is configured to be movable relative to the riser. For example, spider deck 118 may be movable in any one (or both) lateral directions, and, in some case, in a vertical direction. In an example embodiment, at least some components (e.g., robotic arms 114A and 114B) may be movable (in any suitable way) relative to spider deck 118, and spider deck 118 may be movable relative to the riser. For example, robotic arms 114A and 114B may be configured to move laterally relative to spider deck 118, and spider deck 118 may be configured to be movable vertically relative to the riser. In various embodiments, motions of components of system 100 and/or motions of spider deck 118 are facilitated using any suitable means, such as electrical motors, pneumatic motors, internal combustion motors, diesels, and the like, or combinations thereof. Furthermore, these motions may be controlled by as suitable control system, as further discussed below.

Figure 2:
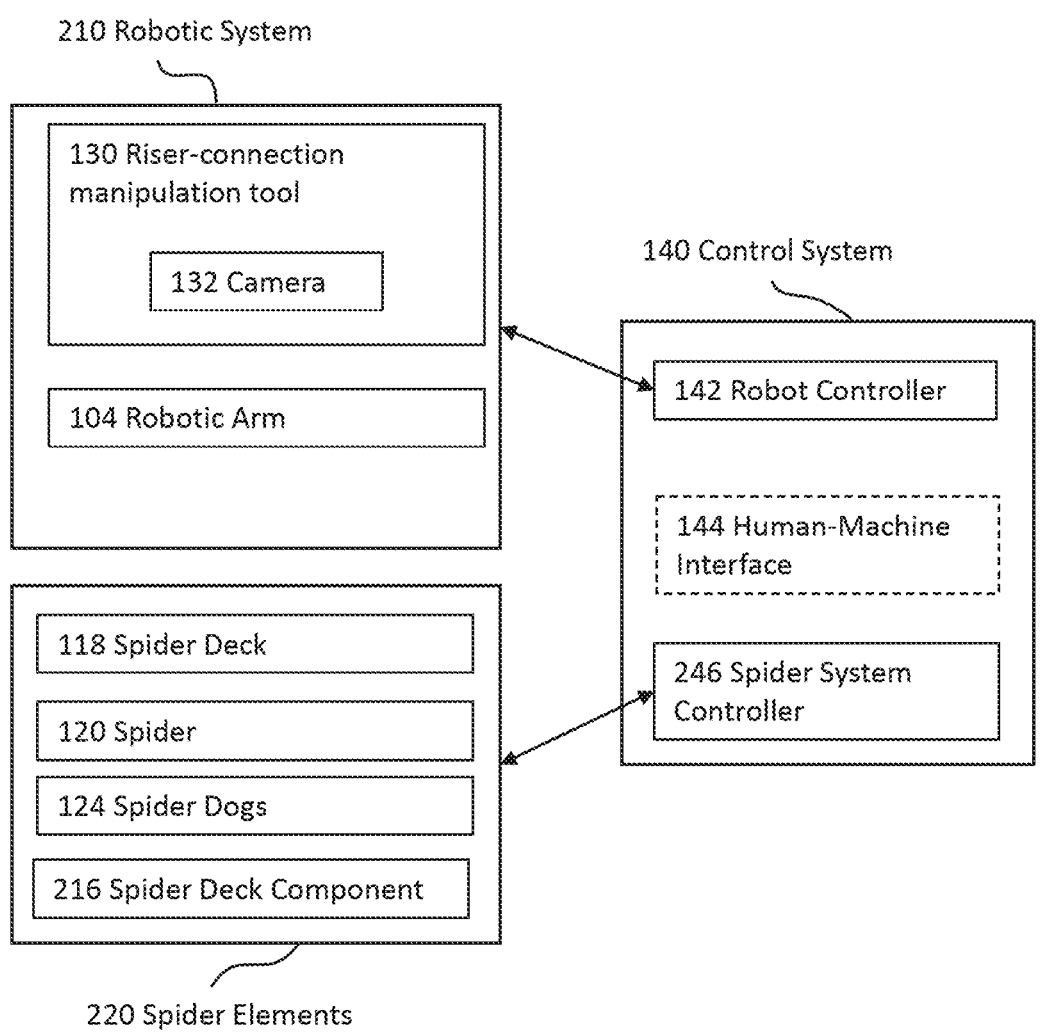
FIG. 2 is an example system for making or breaking a riser including a control system, according to an embodiment.

FIG. 2 shows schematically components of system 100, which, in an example embodiment, may include a robotic system 210 and a control system 140 for controlling operations of robotic system 210. In an example embodiment, robotic system 210 includes a robotic arm 104 (robotic arm 104 may be one of arms 114A or 114B in system 100) and a riser-connection manipulation tool 130 that is configured to be picked up by robotic arm 104. As previously shown, multiple riser-connection manipulation tools (e.g., riser-connection manipulation tool 130, as shown, for example in FIG. 1B) may be stored in tool cabinets 112A and 112B and may be used by robotic arm 104. In an example embodiment, robotic arm 104 is operated using any suitable means, such as electrical motors, pneumatic motors, internal combustion motors, diesels, and the like, or combinations thereof. In various embodiments, robotic system 210 may be the same as robotic system 102, as shown in FIG. 1A.

Consistent with disclosed embodiments, a control system 140 is configured to control the operation of robotic system 210 and spider elements 220, such as spider deck 118, spider 120, spider dogs 124, or other spider deck components 216. In an example embodiment, a robot controller 142 may be configured to control robotic arm 104 and riser-connection manipulation tool 130. In an example embodiment, robot controller 142 is configured to receive data from robotic arm 104 such as positional and orientational data of various elements of robotic arm 104, velocity data, momentum data, acceleration data, angular momentum data, angular acceleration data, and the like, associated with a motion of robotic arm 104, as well as forces or torques acting on robotic arm 104. Further, robot controller 142 is configured to receive data from riser-connection manipulation tool 130.

In an example embodiment, as described above, riser-connection manipulation tool 130 includes a camera 132 for facilitating the operation of riser-connection manipulation tool 130. For instance, camera 132 may take images for determining an object (e.g., a riser bolt) that is being manipulated by riser-connection manipulation tool 130. The images from camera 132 may be used to determine a proximity of the object to riser-connection manipulation tool 130, a position of the object, a size of the object, a shape of the object, and the like. In some cases, a system of cameras may be used to identify various characteristics of the object being manipulated by riser-connection manipulation tool 130, including spatial location and orientation of the object. In some cases, a system of cameras may include two, three, or more cameras. In an example embodiment, several cameras may be used for determining a position of an object (including a distance to the object) via triangulation. In some cases, locations of different points on an object may be determined via triangulation, thus allowing to determining distance between the different points. In an example embodiment, camera 132 may be a visual camera, infrared camera, ultraviolet camera and the like. In some cases, a system of cameras may include a combination of visible, infrared and ultraviolet cameras. In an example embodiment, infrared camera may detect a heating of an object being manipulated by riser-connection manipulation tool 130, and ultraviolet camera may determine object characteristics that are otherwise not detectable with a visible or infrared light (e.g., cracks within the object). In some cases, various gas/liquid leaks may be determined via ultraviolet camera. In various embodiments, camera 132 (or one or more cameras of the system of cameras) may include suitable optical elements (e.g., zoom lenses, TIR lenses, prisms, and the like) for focusing on an object being manipulated by riser-connection manipulation tool 130.

In some cases, riser-connection manipulation tool 130 may be equipped with other devices for determining a location and an orientation of an object that is being manipulated by riser-connection manipulation tool 130. For instance, riser-connection manipulation tool 130 may include a light source for illuminating an object (or surroundings of the object) that is being manipulated by riser-connection manipulation tool 130. Additionally, or alternatively, riser-connection manipulation tool 130 may include a laser source for measuring distances (e.g., a lidar) and/or an ultrasound tool for measuring distances.

As described above, robot controller 142 is configured to receive data from robotic arm 104 and riser-connection manipulation tool 130. In an example embodiment, data may include image data collected from camera 132 or any of cameras from a system of cameras, as described above. The image data in combination with other data (e.g., the other data may be a position and orientation of robotic arm 104) may be used by robot controller 142 to determine operational commands (herein also referred to as signals) that are sent to either robotic arm 104 or riser-connection manipulation tool 130. Further, robot controller 142 is configured to receive positional and/or orientational data from various elements of riser-connection manipulation tool 130. Further, forces/torques, or other relevant data (e.g., angular velocity or angular momentum data), may be collected by robot controller 142. In various embodiments, riser-connection manipulation tool 130 as well as robotic arm 104 include sensors for collecting various data (e.g., positional data, orientational data, force and torque data, and the like), and the data from these sensors may be transmitted to robot controller 142. In some cases, sensors may include an associated temporary memory for saving the collected data. Further, robotic arm 104 and riser-connection manipulation tool 130 include data communication channels for communicating data to and from robot controller 142. In an example embodiment, data communication channels may include wired communication, wireless communication (facilitated by suitable devices such as Wi-Fi devices, Bluetooth devices, and the like), or combination thereof.

In an example embodiment, robot controller 142 may be a programmable logic controller. Robot controller 142 may be configured to instruct riser-connection manipulation tool 130 to pick up a riser bolt from a bolt receptacle (e.g. bolt receptacle 116 in system 100) and secure the riser bolt to the riser flange without human intervention, thereby making the riser. In another example embodiment, robot controller 142 may be configured to instruct riser-connection manipulation tool 130 to remove the riser bolt from the riser joint and place it into the bolt receptacle without human intervention, thereby breaking the riser.

Control system 140 also includes spider system controller 246 for controlling spider elements 220. In an example embodiment, spider system controller 246 may control a position of spider dogs 124, a movement of spider deck 218 (for cases when such a movement is allowed), or a position and a state of spider deck components 216, such as bolt receptacle 116, tool cabinets 112A and 112B, spider dog locking pin assembly 125, as shown in system 100, or any other components, tools, machinery associated with spider deck 218. For example, when bolt receptacle 116 and/or tool cabinets 112A and 112B are capable of motion, controller 246 may control such a motion. In some cases, spider system controller 246 may control opening or closing of tool cabinets 112A and 112B. In some cases, spider system controller 246 may control the locking or unlocking of spider dog locking pin assembly 125. Further, spider system controller may control movement of spider 120, for cases when spider 120 is capable of motion. Similar to robotic arm 214 and riser-connection manipulation tool 212, any one of spider deck components 216 may include sensors for collecting data, temporary memory storage associated with the collected data and suitable communication channels for communicating the collected data to spider system controller 246 for further analysis.

As shown in FIG. 2, in addition to robot controller 142 and spider system controller 246, control system 140 may include (optionally) a human-machine interface 144, allowing a user of control system 140 to control one or more aspects of robotic system 210 or spider elements 220. In some cases, human-machine interface 144 may allow a user to overwrite one or more instructions from controllers 142 and 246. In some cases, human-machine interface 144 may allow a user to supplement one or more instructions from controllers 142 and 246 with additional instructions. In some cases, human-machine interface 144 may allow a user to update software applications of controllers 142 and 246 (e.g., change a decision control logic related to various commands from controllers 142 and 246, determine warnings or flags that need to be issued based on the data obtained from various sensors of robotic arm 104 and/or riser-connection manipulation tool 130, and the like). In some embodiments, human-machine interface 144 may include a user interface element for providing a user with the data received from robotic system 210 and spider elements 220, and for inputting data/commands from a user. In some cases, interface may be a display (e.g., a touch screen, a computer monitor, and the like), a paper copy, or any other suitable means for providing a user with the data received from robotic system 210 and spider elements 220 (e.g., the data may be communicated to a user via audio signals (e.g., alarms, voicemails, audio messages, and the like), visual signals (e.g., data displayed on a screen, a flashing light, a text message, and the like), or any other suitable sensory signals (e.g., touch signals, vibrations, smells, and the like).

In some cases, control system 140 may be configured to user a robotic arm (e.g., robotic arm 114A) and a suitable riser-connection manipulation tool 130 to clean and/or lubricate riser bolts. For example, a suitable cleaning tool may be used (e.g., cleaning tool may contain a suitable cleaning/lubricating liquid, such as oil) for cleaning and lubricating riser bolts. In an example embodiment, the cleaning tool may be a liquid sprayer. In some cases, multiple cleaning liquids may be applied sequentially to clean and lubricate riser bolts. For example, a first liquid may be applied (e.g., sprayed) to clean a riser bolt and a second liquid may be applied to lubricate a riser bolt.

A robotic arm (e.g., robotic arm 114A, as shown in FIG. 1A) is configured to select a particular riser-connection manipulation tool 130 based on a specific task that needs to be completed. In an example embodiment, robotic arm 114A is equipped with a quick-change system to load various tools to the end of robotic arm 114A. Robotic arm 114A may have a master end that is permanently mounted to a distal end of arm 114A. The master end is a receiving end and may accept a set of different riser-connection manipulation tools. An example riser-connection manipulation tool has a tool end that corresponds to the master end of robotic arm 114A. In an example embodiment, the tool end and the master end use alignment pins to position riser-connection manipulation tool 130 accurately relative to the master end. In an example embodiment, a fail-safe ball lock system makes the connection between the master end and the tool end. A ball lock of the fail-safe ball lock system is actuated by air and can only change state when air is applied to its desired position. In an example embodiment, the fail-safe ball lock system includes sensors to validate the presence of a riser-connection manipulation tool. In various embodiments, the master end and the tool end are configured to allow electrical, and/or pneumatic, and/or hydraulic circuits to pass through the connection formed by the master end and tool end.

Figure 3A:
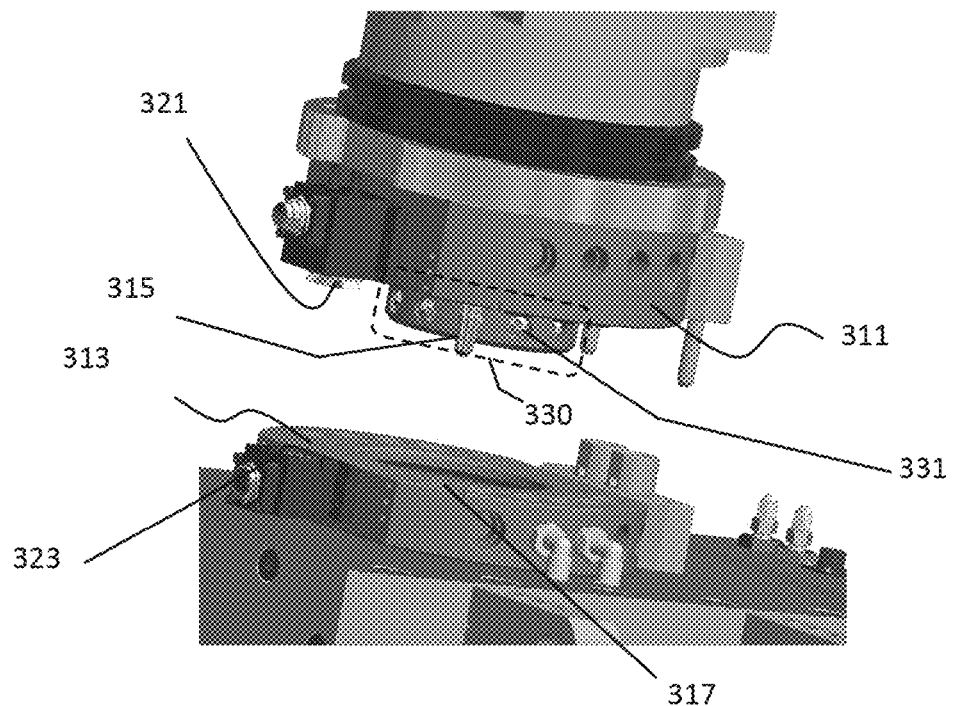
FIGS. 3A-3B are different views of an example quick-change system for joining a riser tool and a robotic arm, according to an embodiment.
Figure 3B:
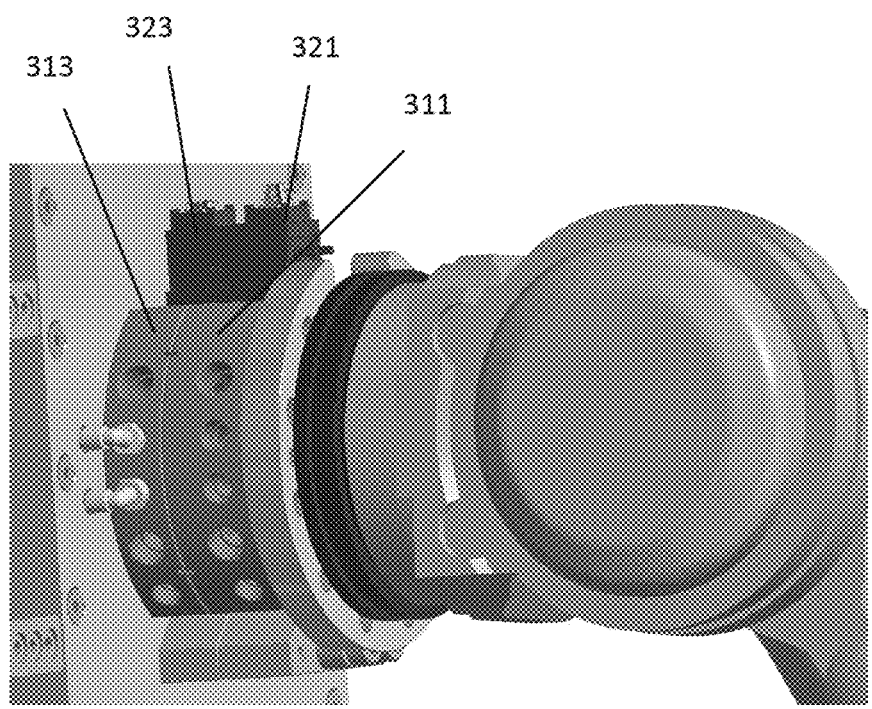

An example embodiment of a quick-change system 300 is shown in FIGS. 3A and 3B. FIG. 3A shows a master end 311 and a tool end 313. In an example embodiment, master end 311 includes pins, such as pin 315 that is configured to be inserted into a corresponding opening 317. In an example embodiment, a master electrical connection 321 is configured to electrically connect to a tool electrical connection 323. Similarly, pneumatic or hydraulic connections may be employed. In an example embodiment, master end 311 includes a fail-safe ball lock system 330 that includes moving balls 331 for locking with tool end 313. FIG. 3B shows an embodiment of system 300, in which master end 311 and tool end 313 are connected. Further, master electrical connection 321 is connected with tool electrical connection 323.

In an example embodiment of system 100, multiple riser-connection manipulation tools may be used. In an example embodiment, multiple riser-connection manipulation tools may include one or more multi-function tools and one or more torque wrench tools. System 100 may include other tools such an auxiliary line fill tool configured to fill a riser conduit with a drilling fluid while making the riser. Further, system 100 includes components such as a hole cover, a stabbing guide, a riser bolt, a bolt receptacle, and a spider dog locking pin assembly. Further details associated with these tools and components are discussed below.

Figure 4A:
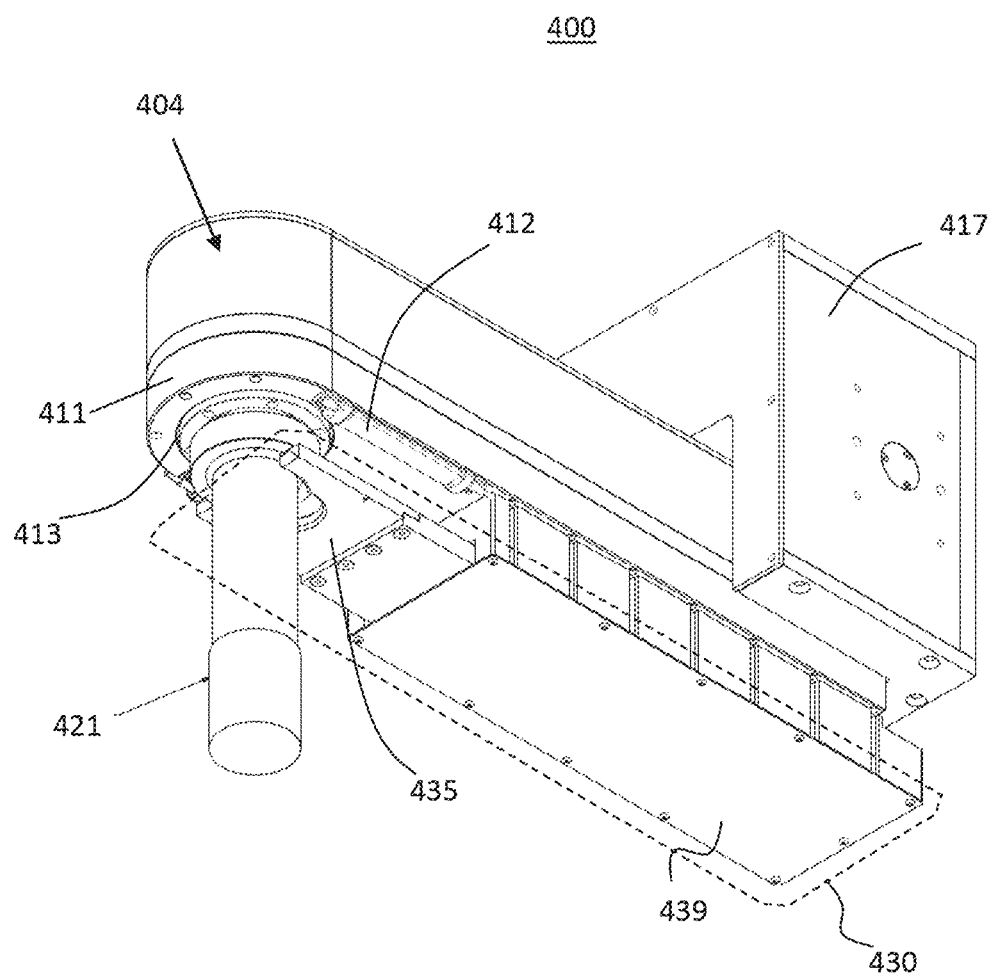
FIGS. 4A-4C are different views of an example multi-function tool, according to an embodiment.
Figure 4B:
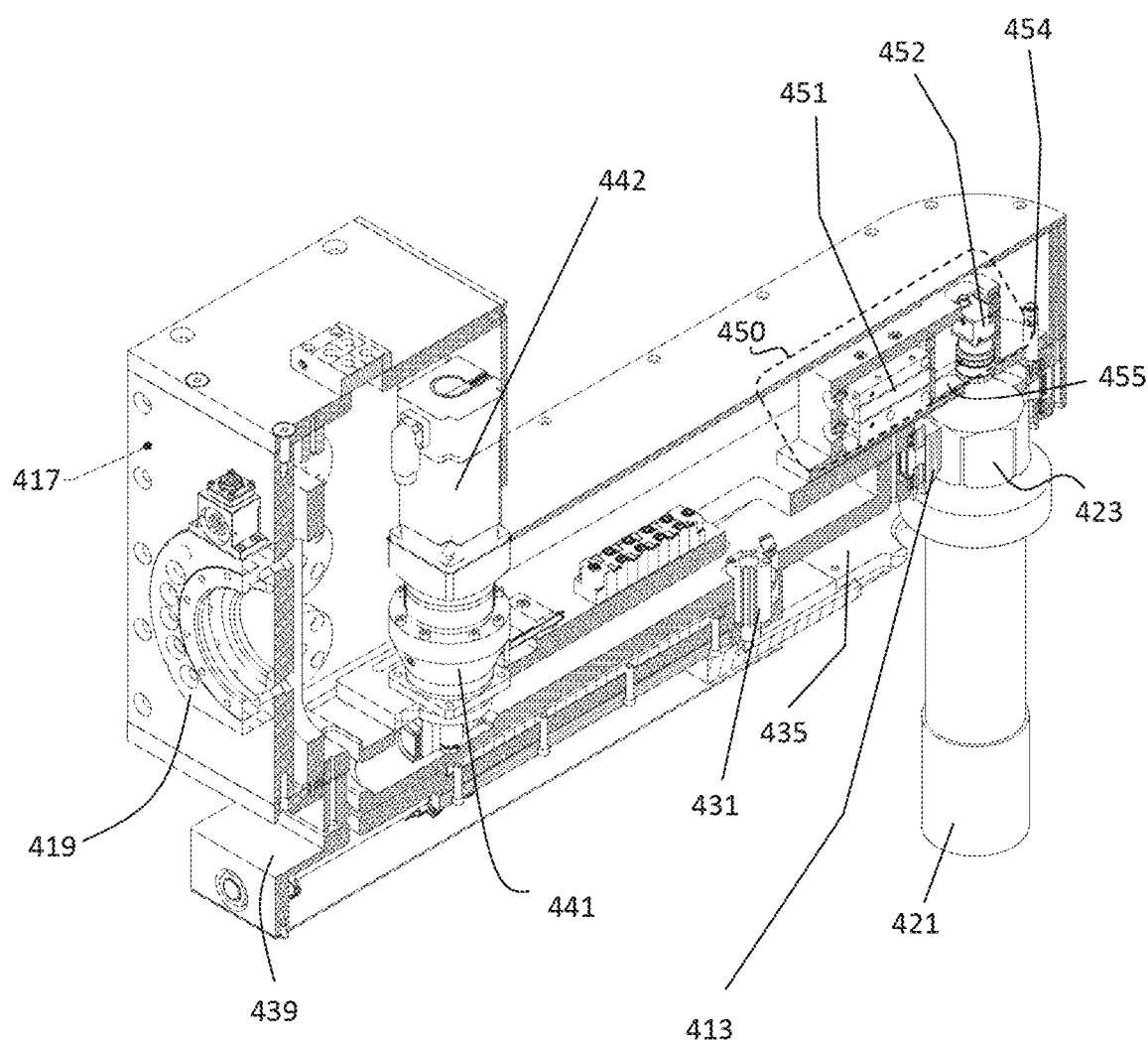
Figure 4C:
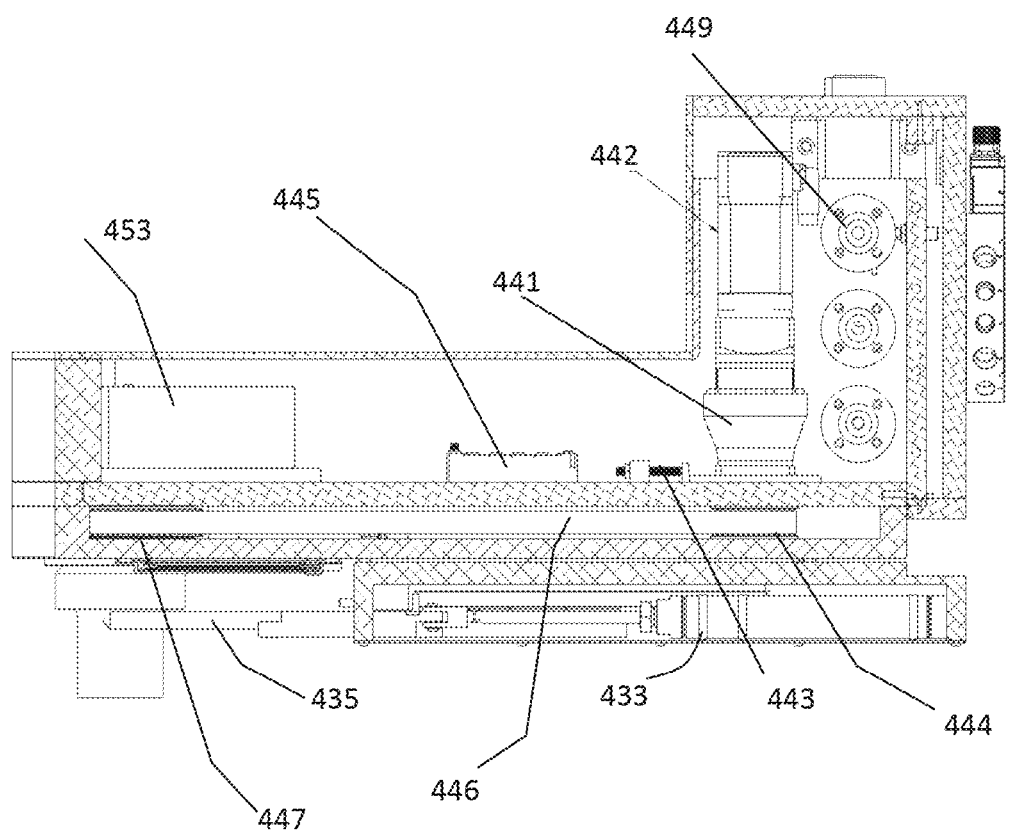

FIGS. 4A-4C show examples of a multi-function tool (MFT) 400. MFT 400 may be used for picking and placing components or objects around spider deck 118. For example, MFT 400 may be used to run down riser bolts. Herein, the term "run down" is used to describe the process of tightening riser bolts to connect riser joints. In various embodiments, MFT 400 is configured to place a riser bolt into a hole of a riser flange, remove the riser bolt from the riser flange hole, manipulate a breech lock, manipulate a latching dog, manipulate a stabbing guide (as further described below), manipulate a hole cover (as further described below), apply a pre-determined torque, or a combination thereof.

Similar to other riser-connection manipulation tools, MFT 400 includes a quick-change system 300 for connecting to a robotic arm (e.g., to robotic arm 114A). In an example embodiment, robotic arm 114A is configured to move to a tool cabinet (e.g., tool cabinet 112A), to pick up MFT 400. Robotic arm 114A may return MFT 400 to cabinet 112A when a task requiring MFT 400 is completed. In an example embodiment, MFT 400 is equipped with pneumatic and electrical connections to a servo motor, a camera system, and a fork tool assembly. The pneumatic and electrical connections are configured to pass through the quick-change system 300, as previously described.

In an example embodiment, MFT 400 includes a front section 404 and a back part 417, with front section 404 capable of moving vertically relative to back part 417, as further described below. Front section 404 of MFT 400 includes a drive belt housing 411, a socket 413, a light source 412, a retaining fork 435, and housings 439. MFT 400 is configured to pick and place various components or objects using socket 413, which, in an example embodiment, can be a hex socket. Further, retaining fork 435 is used to grab components or objects that are picked and placed by MFT 400, as further described below. In an example embodiment, a picked component or object may be a riser bolt 421 having a hexagonal head that fits socket 413.

After aligning riser bolt 421 with a flange hole, MFT 400 may run down riser bolt 421 via socket 413. In an example embodiment, socket 413 is configured to transmit a torque to riser bolt 421. In other cases, socket 413 may transmit a torque to a stabbing guide. In an example embodiment, socket 413 may be driven by a belt drive located in drive belt housing 411. Further, socket 413 may be driven by a gear box and a servo motor. In an example embodiment, the torque may be a few tens to a few hundreds of foot pound (e.g., about 20 to about 200 foot pound). In an example embodiment, the torque may be about 60 foot pounds, about 70 foot pounds, about 80 foot pounds, about 90 foot pounds, about 100 foot pounds, and the like. In an example embodiment, the torque may be any value less than about 200 foot pound. In an example embodiment, socket 413 may deliver a rotational rate of a few tens to a few hundreds of revolutions per minute (rpms). For example, socket 413 may deliver about 50-200 rpms. In an example embodiment, socket 413 may deliver about 60 rpm, about 65 rpm, about 70 rpm, about 75 rpm, about 80 rpm, about 85 rpm, about 90 rpm, and the like. In an example embodiment, the socket may rotate at any rate that is less than 150 rpm. In an example embodiment, the socket may rotate at any rate that is less than 200 rpm. In various embodiments, the torque may be monitored via sensors communicating with robot controller 142, to detect any deviation from normal operations (e.g., detect fluctuations in torques and angular velocities that indicate various issues associated with running down bolts, such as damaged threads).

As described before, MFT 400 includes a front section 404 and a back part 417. Back part 417 is also referred to as a compliance housing 417. In an example embodiment, MFT 400 may include a compliance system, housed in compliance housing 417, and configured to allow front section 404 of MFT 400 to move up and down relative to housing 417 (which may be motionless and attached to a robotic arm, such as robotic arm 114A). In an example embodiment, the compliance system includes one or more rails solidly attached to housing 417. Further, the compliance system includes one or more guide rollers 449 configured to roll up and down the rails of housing 417, without detaching from the rails. In an example embodiment, guide rollers 449 are connected to front section 404 of MFT 400 and, when rolled up or down the rails of housing 417, result in front section 404 moving up or down relative to housing 417.

In various embodiments, based on data received from camera 452, and data from other possible sensors that may be present (e.g., optical proximity sensors, ultrasound sensor, and the like) for determining position of socket 413 relative to hexagonal head 423 of riser bolt 421, the compliance system may regulate placement of socket 413 relative to hexagonal head 423. If it is determined that socket 413 is coupled with hexagonal head 423, the compliance system may be configured to rotate socket 413 (and/or increase a rotational speed of socket 413). Further, the compliance system may be configured to move socket 413 vertically relative to riser bolt 421, such that socket 413 exerts an appropriate pressure onto riser bolt 421.

Consistent with disclosed embodiments, MFT 400 includes a fork tool assembly 430 that includes a retaining fork 435, a retaining fork housing 439, and mechanisms for operating retaining fork 435, as further described below. Retaining fork 435 is disposed in proximity to socket 413 and fork tool assembly 430 is configured to pick and place an object using retaining fork 435.

FIG. 4B shows a cross-sectional view of MFT 400 displaying compliance housing 417, tool end 419 of quick-change system 300, as described above, retaining fork housing 439, a servo motor 442, a drive gearbox 441, a fork position selector cylinder 431, retaining fork 435, a camera system 450 that may include a camera cover cylinder 451 and a camera 452, socket 413, a socket rotation proximity switch 454, and riser bolt 421 having a hexagonal head 423. In an example embodiment, camera 452 is mounted above socket 413, and is configured to identify the position and orientation of components (e.g., riser bolts) to be picked up. Camera cover cylinders 451 are configured to operate a shutter 455 to open and close an aperture located in a housing of camera system 450. For example, when camera 452 is in use, shutter 455 may open the aperture using camera cover cylinders 451, and when camera 452 is not in use, shutter 455 may close the aperture to protect a lens of camera 452 (and/or other camera 452 components) from being exposed to elements (e.g., liquids, such as water or oil, gases, and the like).

In various embodiments, retaining fork 435 is used to keep riser bolt 421 (or any other suitable component) engaged with socket 413. Servo motor 442 may be any suitable motor configured to rotate socket 413. For example, servo motor 442 may be an electric motor or a pneumatic motor.

In an example embodiment, socket 413 may be configured to couple to hexagonal heads, such as a hexagonal head 423 of riser bolt 421. For example, socket 413 may have a hexagonal shape matching the hexagonal head 423 of the riser bolt 421. In an example embodiment, socket 413 may be adjustable. For example, elements forming socket 413 may be movable to be able to have a tight grip to different sizes of hexagonal heads. It should be appreciated, that socket 413 may be replaced by any other suitable sockets depending on the type of component that requires manipulation. For example, hexagonal socket 413 may be replaced by any other suitable socket for handling bolts with hexagonal sockets, torx sockets, or any other bolts (or other connecting elements).

FIG. 4C shows another cross-sectional view of MFT 400 displaying compliance housing guide rollers 449 servo motor 442, drive gearbox 441, a belt tensioner 443, a drive pulley 444, a driven pulley 447 (driven pulley 447 may be part of a socket 413 assembly), drive belt 446, electronic junction box 445, camera housing 453, retainer fork actuation cylinder 433, and retainer fork 435.

In an example embodiment, as shown, for example in FIG. 4C, servo motor 442 is connected via drive gearbox 441 to a drive pulley 444. Drive pulley 444 is configured to drive driven pulley 447 via drive belt 446. Belt tensioner 443 is configured to adjust a tension in dive belt 446 based on a required target tension (or based on tension needed for completing a particular task). Belt tensioner 443 may be configured to transmit tension data to robot controller 142. For example, if tension in drive belt 446 drops, or there is a slippage of drive belt 446 relative to drive pulley 444 or driven pulley 447, robot controller 142 may determine that drive belt 446 needs to be replaced, or that there are other problems with a drive system of MFT 400 (the drive system of MFT 400 may include servo motor 442, drive gearbox 441, drive pulley 444, driven pulley 447, and socket 413). In various embodiments, driven pulley 447, in turn is coupled to socket 413, and is configured to rotate socket 413. In an example embodiment, socket 413 is configured to rotate back and forth at a pre-determined frequency when socket 413 is engaged with or disengaged from a riser bolt, a stabbing guide, a hole cover, or an auxiliary line fill tool. In some embodiments, socket 413 is rotated back and forth about 0.5 degree at a frequency of about 1 Hz. The back-and-forth rotation serves to prevent a riser bolt from being stuck in socket 413 when socket 413 is disengaged from the riser bolt or prevent a riser bolt from being jammed in socket 413 when socket 413 is engaged with the riser bolt.

Electronic junction box 445 is configured to provide power and data connection to various elements of MFT 400. For example, an electrical power supply and a data bus from a robotic arm (e.g., robotic arm 114A) may be connected to junction box 445, and junction box 445 may distribute power to various elements of MFT 400. Further, data from various sensors of MFT 400 (e.g., data from camera 452) may be collected and transmitted via junction box 445 and the data bus to robotic controller 142 for processing. Additionally, or alternatively, electrical signals from junction box 445 may be distributed to various elements of MFT 400 to control operation of these elements (e.g., a signal may be sent to cover cylinder camera 451 to open or close the aperture located in the housing for camera system 450, as described above).

FIG. 4B shows socket rotation proximity switch 454 configured to return the socket to a pre-determined null position. In an example embodiment, the pre-determined null position may be selected by robot controller 142 or by a user via a human-machine interface. As described above, MFT 400 further includes camera cover cylinder 451 disposed in proximity to the camera.

Figure 5:
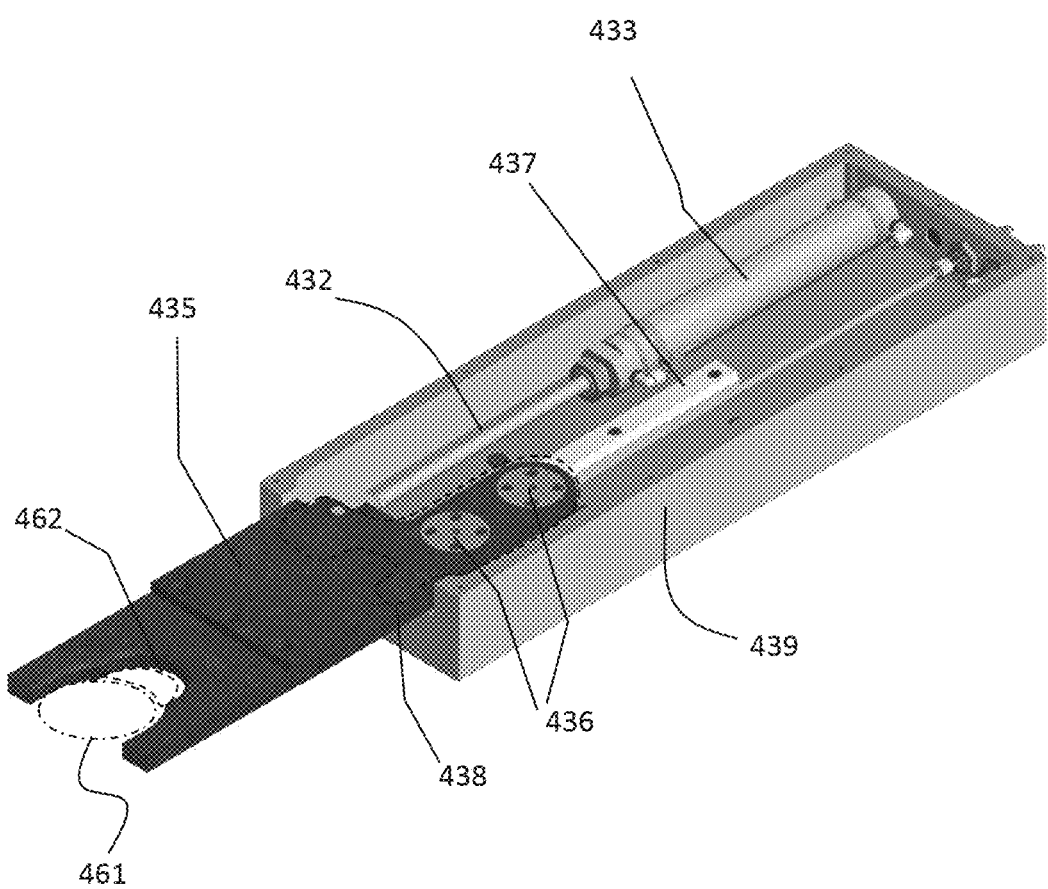
FIG. 5 is an example fork tool assembly, according to an embodiment.

As described above, MFT 400 includes a fork tool assembly 430, as shown for example, in FIG. 4A. Another view of fork tool assembly 430 is shown in FIG. 5. In various embodiments, fork tool assembly 430 is configured, along with socket 413, to pick and place components (e.g., riser bolts, stabbing guides, a fill nozzle, or a hole cover). Retaining fork 435 is configured to be mounted on a vee roller track and is configured to move in and out when track rollers 436 roll on a track rail 437. Retaining fork 435 is extendable via retainer fork actuation cylinder 433 (herein also referred to as actuation cylinder 433). Actuation cylinder 433 contains pressurized air that is configured to move a fork-cylinder connecting member 432 in and out of actuation cylinder 433, resulting in corresponding motions of fork tool 435. In an example embodiment, actuation cylinder 433 includes sensors that may validate the position of retaining fork 435. Actuation cylinder 433 is controlled by a closed center solenoid valve and uses speed controllers with a pilot operated check valve. In an example embodiment, actuation cylinder 433 may be configured to move retaining fork 435 into several possible positions depending on the type of a component (e.g., riser bolt, stabbing guide, and the like) is being handled by retaining fork 435. In an example embodiment, besides lateral movements facilitated by actuation cylinder 433, retaining fork 435 may execute vertical movements. In one embodiment, the entire fork tool assembly 430 is configured to execute vertical movements relative to socket 413. In an example embodiment, vertical position of retaining fork 435 may be selected based on a type of a component (e.g., riser bolt, stabbing guide, and the like) being handled by retaining fork 435. As shown in FIG. 5, retaining fork 435 may include a first cut-out 461 for handling riser bolts and a second cut-out 462 for handling stabbing guides. In an example embodiment, an end of retaining fork 435 may be bolted to an element 438 to facilitate easy replacement in case of a wear or a damage of retaining fork 435. Further, fork tool assembly 430 includes a fork position selector cylinder 431, as shown in FIG. 4B, operatively coupled to the retaining fork 435 and configured to extend to limit extension of the retaining fork and to retract to permit maximum extension of the retaining fork. When fork position selector cylinder 431 is extended, the extension of retaining fork 435 is limited. Such a limitation in the extension of retaining fork 435 is selected so that retaining fork 435 is not pushing into the shank of a riser bolt which, otherwise, would skew the riser bolt. Limiting the extension of retaining fork 435 configures retaining fork 435 to be directly underneath the riser bolt, thus allowing the riser bolt to be perfectly straight. Alternatively, when fork position selector cylinder 431 is retracted the retaining fork 435 can fully extend. This is used for picking up stabbing guide pins.

Figure 6A:
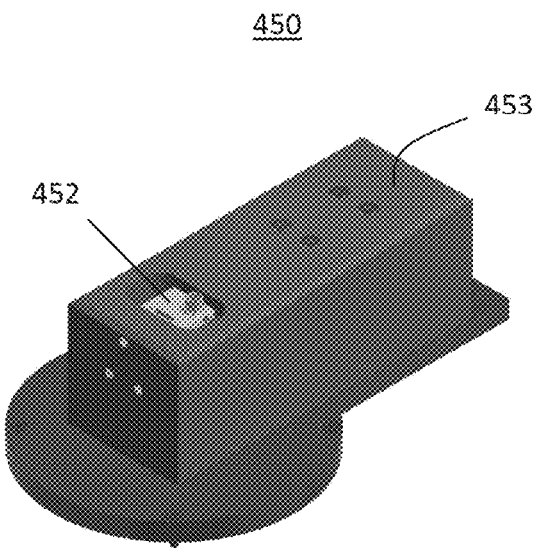
FIGS. 6A and 6B are different views of an example camera system, according to an embodiment.
Figure 6B:
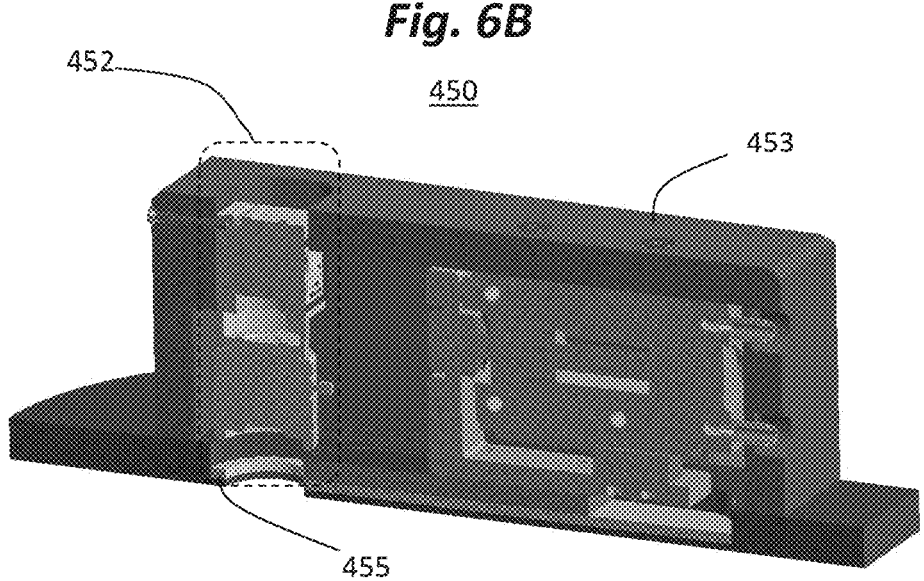

FIGS. 6A and 6B are different views of camera system 450. While camera system 450 is shown in connection with MFT 400, the same camera system, as described in detail below, can be used in other riser-connection manipulation tools such as a torque wrench tool. In various embodiments, camera system 450 is configured to collect images of the positions and orientations of various components. Camera system 450 includes camera 452 located in a housing 453, which protects camera 452 from contamination and/or physical impacts. In some cases, housing 453 may include an air actuated slide door to seal off the camera lens. The slide door may be opened when camera 452 is in use. In various embodiments, images collected by camera 452, such as images of hexagonal head 423, may be sent to control system 140 (e.g., robot controller 142). Robot controller 142 (or a suitable computing system associated with robot controller 142) is configured to recognize object from the images and adjust position of the MFT 400 to improve manipulation of various objects. In some cases, at least some of the data analysis may be performed by electrical components associated with camera 452 to determine location and orientation of objects manipulated by MFT 400. Camera 452 may be mounted as shown in FIG. 4B (e.g., camera 452 may be positioned on a centerline of socket 413 and above socket 413).

In various embodiments, housing 453 includes camera cover cylinder 451.

Figure 7A:
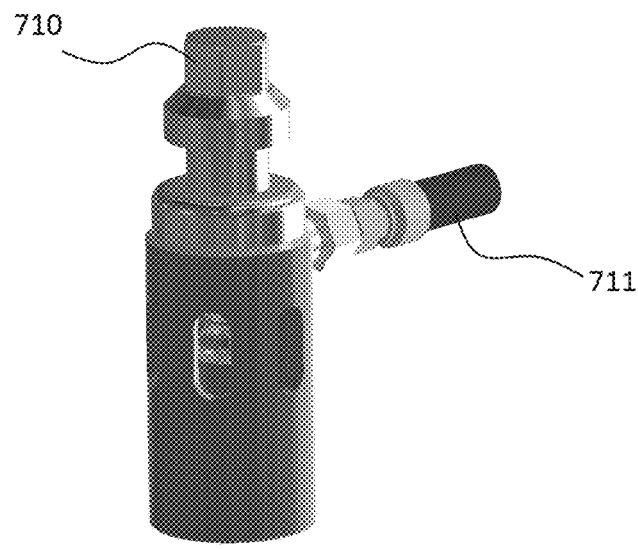
FIG. 7A is an example auxiliary line fill tool, according to an embodiment.
Figure 7B:
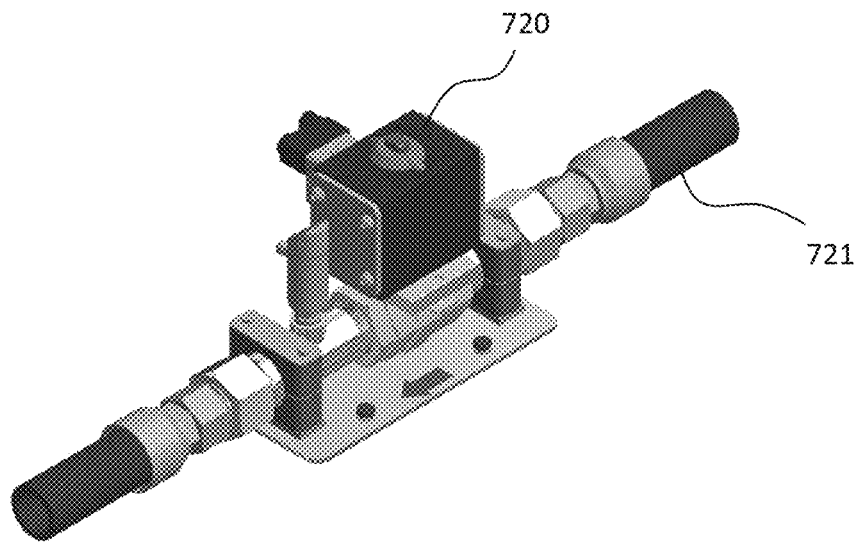
FIG. 7B is an example auxiliary line fill tool, according to an embodiment.

FIG. 7A shows an auxiliary line fill tool 700 that may be used by a suitable tool (e.g., MFT 400) to fill one or more hydraulic lines of the riser. In an example embodiment, a robotic arm (e.g., robotic arm 114A) is configured to move to a proximity of a connection joint of a riser and locate a position of a riser hydraulic port using camera system 450. MFT 400 may also utilize light source 412 for improved image resolution. Once the position of a riser hydraulic port is determined, robot controller 142 is configured to return MFT 400 to a determined position once auxiliary line fill tool 700 is selected. In an example embodiment, the robotic arm equipped with MFT 400 is configured to locate auxiliary line fill tool 700 in a tool cabinet (e.g., cabinet 112A) or at any other location of the spider deck configured to house auxiliary line fill tool 700. In an example embodiment, MFT 400 may grab a top portion 710 (as shown in FIG. 7A) of auxiliary line fill tool 700 and transport auxiliary line fill tool 700 towards the riser hydraulic port. Subsequently, auxiliary line fill tool 700 may be placed over the hydraulic port. The inside of the fill nozzle of auxiliary line fill tool 700 may employ a black Delrin sleeve (black Delrin is a high strength acetal homopolymer perfect for smaller industrial parts requiring strength and rigidity) to ensure that the hydraulic port is not damaged. Once it is determined (e.g., by robot controller 142) that fluid may be released, via fill hose 711, to the hydraulic port (e.g., when a proper connection between auxiliary line fill tool 700 and the hydraulic port is established), a fill nozzle valve assembly 701, as shown in FIG. 7B, is configured to allow a fluid to flow into the hydraulic port to fill a hydraulic line (e.g., hydraulic line 117, as shown in FIG. 1A) of a riser. In an example embodiment, wetted components may be formed from stainless steel and/or rubber. Once the hydraulic line has been filled, the fill nozzle valve assembly 701 will be turned off. Subsequently, the robotic arm using MFT 400 is configured to remove auxiliary line fill tool 700 and place auxiliary line fill tool 700 back in the tool cabinet or at any other suitable location on the spider deck.

In various embodiments, fill nozzle valve assembly 701 controls the flow of the fluid, via fill hose 721, to a hydraulic line (e.g., hydraulic line 117). In an example embodiment, fill nozzle valve assembly 701 is mounted on the spider deck. Valve 720 (as shown in FIG. 7B) of fill nozzle valve assembly 701 is an air actuated valve that is energized by an electronic solenoid valve. A pressure switch may be used to sense a spike in pressure after the hydraulic line has been filled. The spike in pressure may trigger valve 720 to close and information about the pressure spike may be used to indicate to robot controller 142 that fill nozzle assembly 700 is ready to be removed. Similar to auxiliary line fill tool 700, all wetted components of fill nozzle valve assembly 701 may be formed from a stainless steel or rubber.

Figure 7C:
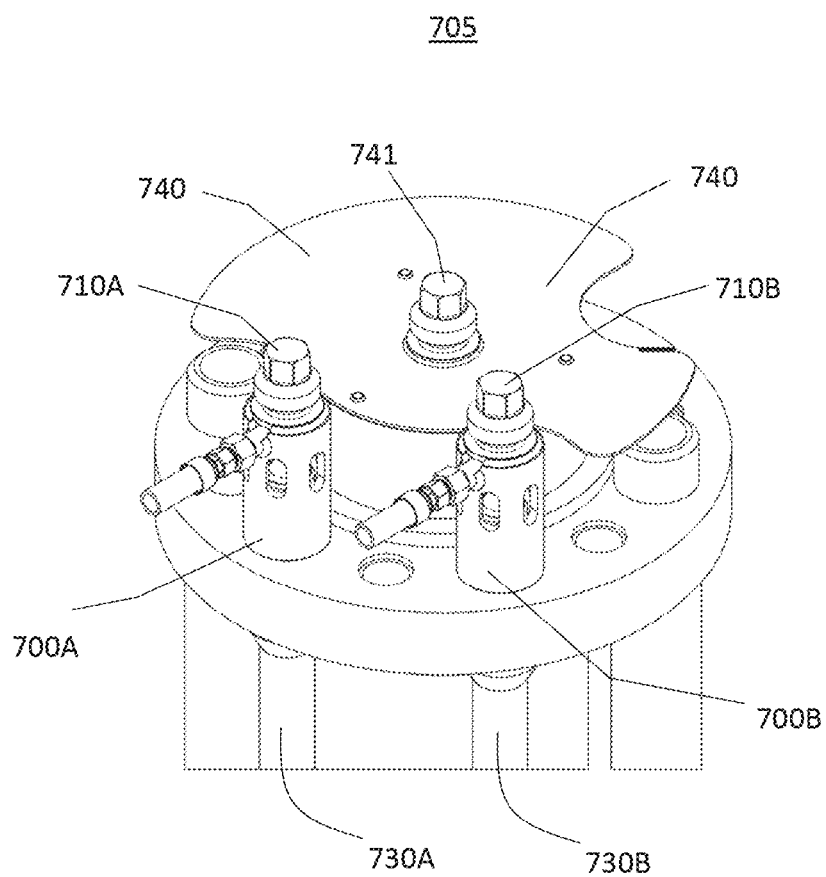
FIG. 7C is an example view of an auxiliary line fill tool used to connect to hydraulic ports of a riser, according to an embodiment.
Figure 7D:
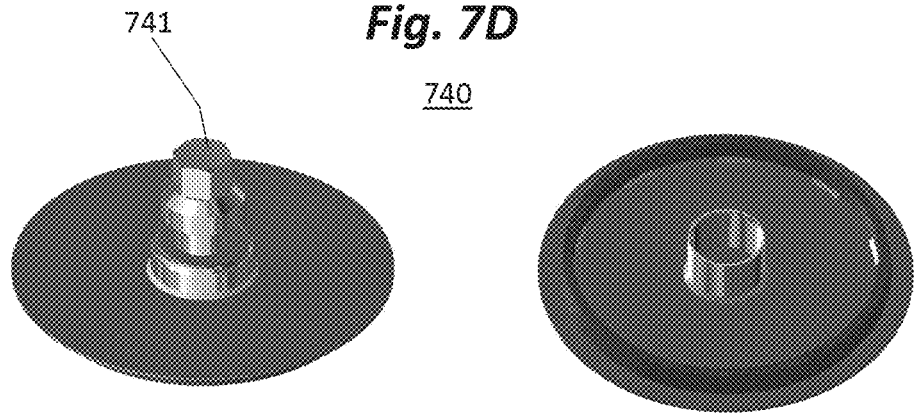
FIG. 7D are example views of a hole cover, according to an embodiment.

FIG. 7C shows an example configuration of connecting joint 705 with two auxiliary line fill tools 700A and 700B used to fill corresponding hydraulic lines 730A and 730B. As shown in FIG. 7C, riser may be capped with a hole cover plate 740. Both top and bottom views of hole cover plate 740 is also shown in FIG. 7D. Hole cover 740 is configured to block the main bore of the riser. As shown in FIG. 7C, both auxiliary line fill tools 700A and 700B and hole cover plate 740 may include a corresponding top portion that may be engaged by socket 413 of MFT 400. For example, auxiliary line fill tool 700A includes a top portion 710A, auxiliary line fill tool 700B includes a top portion 710B, and hole cover plate 740 includes a top portion 741. In some cases, top portions 710A, 710B, and 741 may be the same. In some cases, each of top portions 710A, 710B, and 741 has a hexagonal cross section matching socket 413 of MFT 400.

Figure 7E:
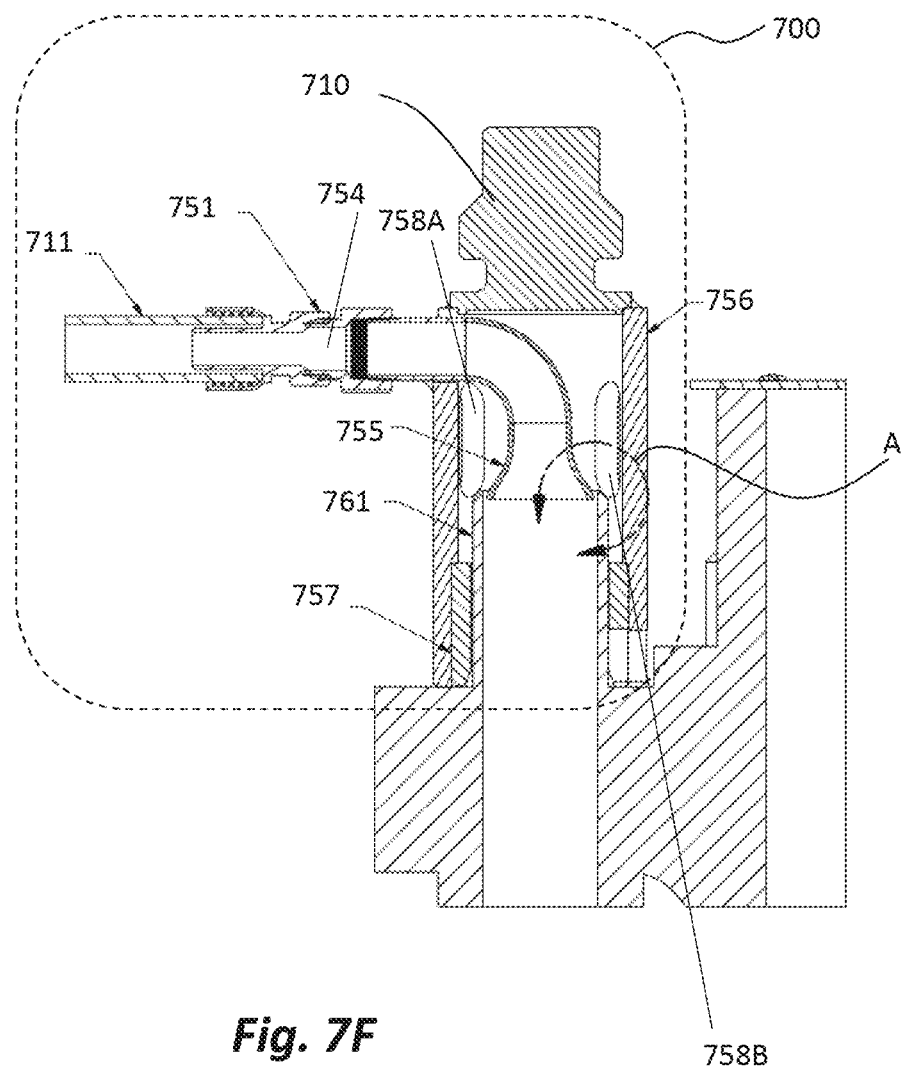
FIG. 7E is an example cross-sectional view of an auxiliary line fill tool connecting to a hydraulic port, according to an embodiment.
Figure 7F:
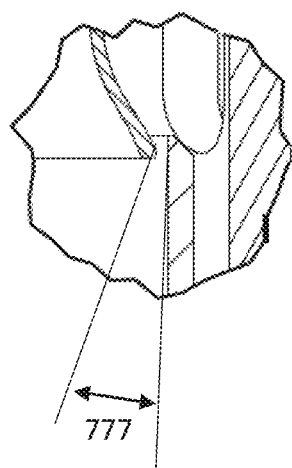
FIG. 7F is a zoomed view of an edge of a bell nozzle of an auxiliary line fill tool connecting to a hydraulic port, according to an embodiment.

FIG. 7E shows further details of auxiliary line fill tool 700. In an example embodiment, auxiliary line fill tool 700 includes top portion 710, fill hose 711, stainless steel house fittings 751 configured to mount fill hose 711 onto entrance portion 754 of bell nozzle 755. Bell nozzle 755 is configured to connect to a hydraulic port of riser conduit 761 (riser conduit 761 may be the same as hydraulic line 117, as shown in FIG. 1B), and riser conduit 761 may be protected by Delrin protective sleeve 757. Pads 758A and 758B may be configured to tightly secure auxiliary line fill tool 700 relative to the hydraulic port of riser conduit 761. FIG. 7F shows that a small gap between bell nozzle 755 and the hydraulic port of riser conduit 761 is used to allow for detection of a pressure spike when riser conduit 761 is filled with a fluid.

Returning to FIG. 7D, MFT 400 may be configured to place hole cover plate 740 over the main bore of the riser. In an example embodiment, robotic arm 114A is configured to use MFT 400 to move to hole cover plate 740 docking station (hole cover plate 740 docking station may be any suitable position on the spider deck at which hole cover plate 740 is located) to pick up hole cover plate 740 using socket 413. Socket 413 may engage hole cover plate 740 via top portion 741. In an example embodiment, hole cover plate 740 may be placed over a portion of a riser (e.g., may be placed over a pin extending from the riser). Hole cover 740 is used to temporary cover a riser joint of the riser until another riser joint of the riser is brought in to extend the riser. When the new riser joint is brought in, MFT 400 is configured to remove hole cover plate 740 and place it back on the corresponding docking station.

Figure 8A:
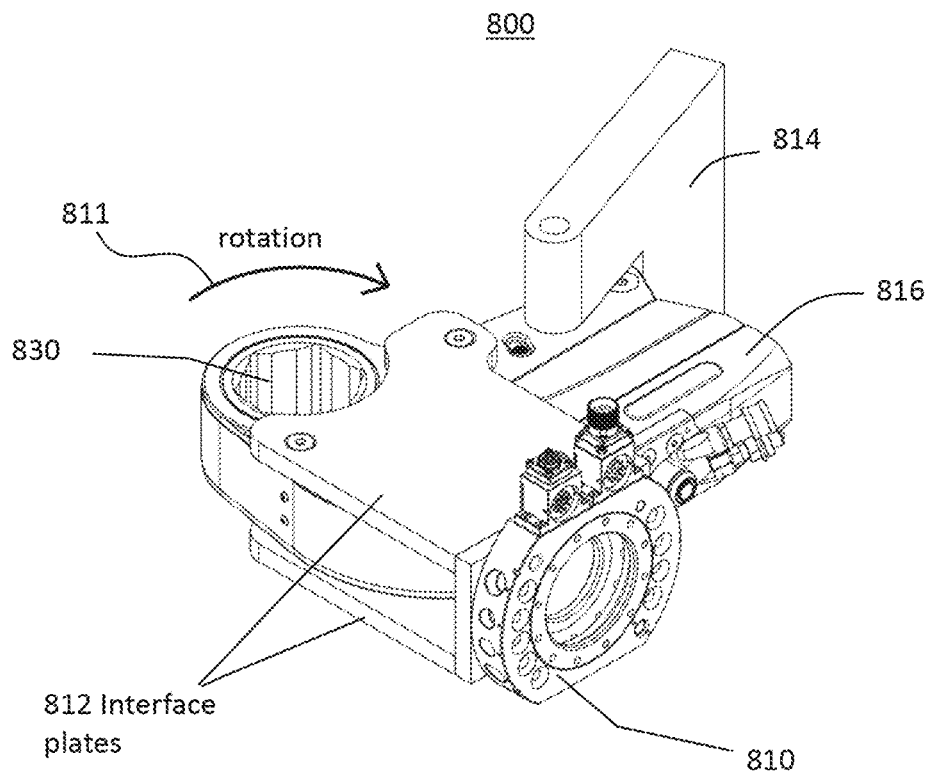
FIGS. 8A and 8B are example views of a torque wrench tool, according to an embodiment.
Figure 8B:
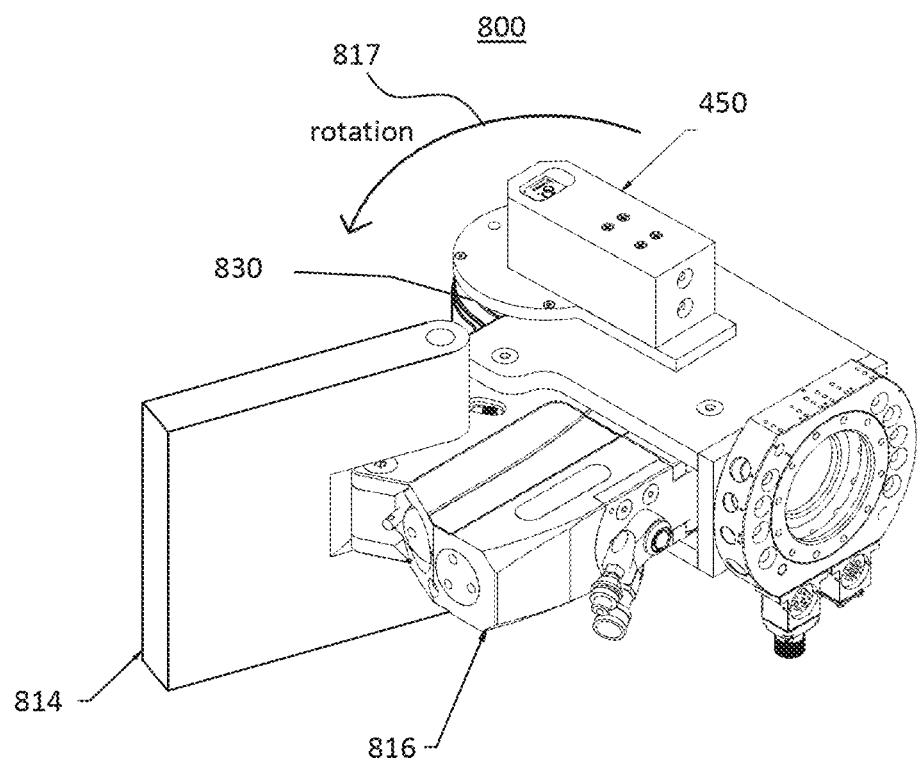

In various embodiments, MFT 400 may run down riser bolts, but may not provide adequate final torques to the riser bolts. In order to provide large final torques to the riser bolts, a torque wrench tool 800 may be used, as shown in FIGS. 8A and 8B. Torque wrench tool 800 is used to apply the final rated toque on the riser bolts. In an example embodiment, torque wrench tool 800 may combine an existing style torque tool and modify it with a custom bracket to integrate with quick-change system 300. In an example embodiment, a robotic arm (e.g., robotic arm 114A) is configured to pick up torque wrench tool 800 from a docking station (e.g., tool cabinet 112A). In an example embodiment, quick-change system 300 allows passage of hydraulic lines and electrical connections to torque wrench tool 800. In an example embodiment, electrical connections may deliver power and electrical signals to solenoid valves of torque wrench tool 800, and these valves may be used to control hydraulic levers of torque wrench tool 800 to actuate tightening or loosening of riser bolts. In an example embodiment, a pressure sensor may be used to record torques achieved when using torque wrench tool 800 for tightening or loosening the riser bolts. In an example embodiment, the pressure reading of the pressure sensor may be scaled for foot pounds and may be logged for quality purposes. The torqueing sequence may be performed in a criss-cross pattern till all riser bolts are tightened (or loosened). The torque data recorded by the pressure sensor may be transmitted to a robotic controller (e.g., robotic controller 142), and robotic controller 142 may determine whether a riser bolt is sufficiently tightened or loosened based on the transmitted torque data. Subsequently, robotic controller 142 may determine if further application of torque wrench tool 800 is still required for the riser bolt, or if the riser bolt is sufficiently tightened or loosened.

FIG. 8A shows a view of torque wrench tool 800 displaying tool end 810 for connecting with a master end of a robotic arm (e.g., robotic arm 114A). Socket 830 is configured to couple with hexagonal head 423 of riser bolt 421 (as shown, for example, in FIG. 4B), and hydraulic torque tool 816 is configured to rotate socket 830 as shown by arrow 811. In an example embodiment, and hydraulic torque tool 816 includes a hydraulic cylinder. The hydraulic cylinder may include a piston rod configured to move in and out of the hydraulic cylinder, thus producing a torque for rotating socket 830. In an example embodiment, interface plates 812 are used as a housing for hydraulic torque tool 816, and as elements for coupling hydraulic torque tool 816 to tool end 810. Hydraulic torque tool 816 is configured to rotate socket 830 and apply high torques on riser bolts coupled to socket 830. In an example embodiment, reaction arm 814 is used to secure torque wrench tool 800 in place (e.g., reaction arm 814 may be leaned against elements of a riser) to ensure that hydraulic torque tool 816 is positioned in place (and not rotated in an opposite direction to a rise bolt that is being tightened or loosened). FIG. 8B shows another view of torque wrench tool 800 having hydraulic torque tool 816 and reaction arm 814. In an example embodiment, camera system 450 is placed above socket 830 to determine the adequate position and orientation of torque wrench tool 800 similarly to how camera 452 was used for MFT 400. For example, camera system 450 may obtain an image of an object (e.g., riser bolt) being manipulated and camera system 450 itself or a control system (e.g., control system 140) may analyze the image to adjust a position and/or orientation of the robotic arm that is attached to torque wrench tool 800. FIG. 8B shows an example rotation of socket 830 as indicated by arrow 817.

In various embodiments, torque wrench tool 800 is configured to apply a pre-determined (e.g., a target torque) to a riser bolt. In an example embodiment, the pre-determined torque is configured to be applied to hexagonal head 423 of riser bolt 421 that is disposed on a riser joint, thereby tightening or loosening riser bolt 421 relative to the riser joint. As described above, torque wrench tool 800 includes a socket disposed below camera system 450 (camera system 450 includes camera 452) and configured to rotate, thereby applying the pre-determined torque to hexagonal head 423 of riser bolt 421.

Figure 9:
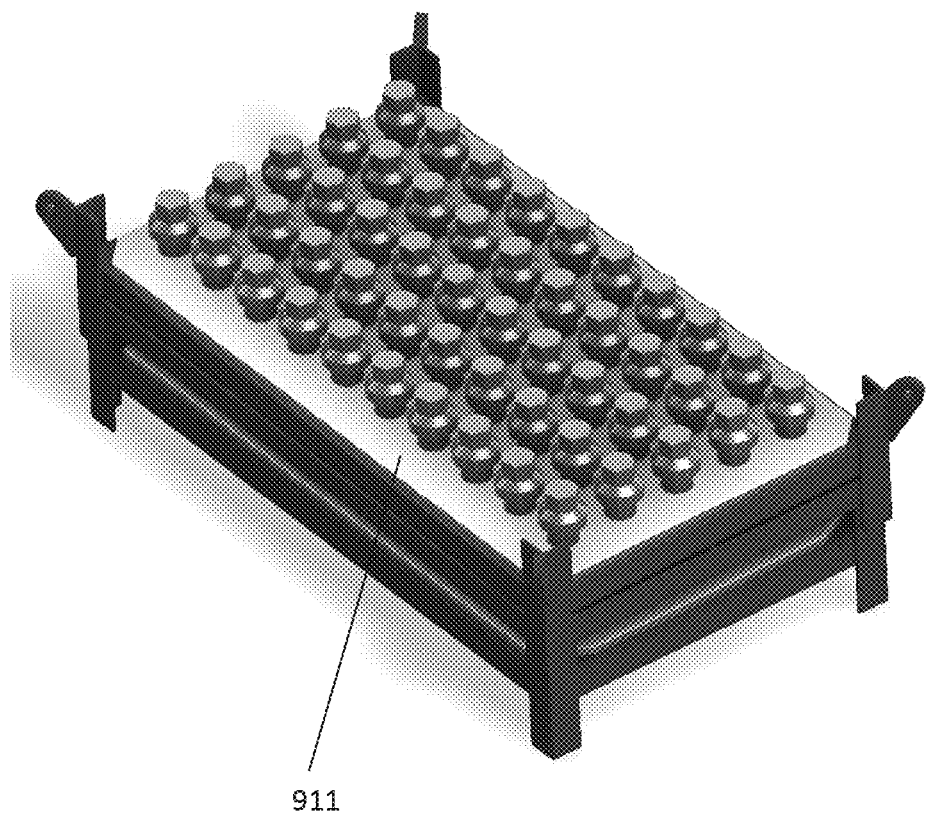
FIG. 9 is an example bolt receptacle, according to an embodiment.

FIG. 9 shows an example bolt receptacle 116, as previously described in connection with FIGS. 1A-1E disposed on spider deck 118 and configured to hold a plurality of riser bolts. In an example embodiment, bolt receptacle 116 may include surface element 911 containing a plurality of holes in which riser bolts may be inserted. In an example embodiment, element 911 includes 50 holes in which 50 riser bolts may be inserted. In an example embodiment, hexagonal heads of riser bolts are configured to be located above surface element 911, and these hexagonal heads may be engaged by socket 413 of MFT 400. In an example embodiment, one or more robotic arms (e.g., both robotic arms 114A and 114B) are configured to take images of the riser bolts in the bolt receptacle 116 to identify the rotations of the riser bolts. In general, the riser bolts are randomly rotated in the bolt receptacle 116, and system 110 may be configured to locate the rotations of hexagonal heads of the riser bolts. The images may be collected by robotic arms 114A and 114B as the riser is being lowered and a new riser joint is being selected. Thus, a time for making the riser may be reduced, but allowing system 100 to multitask (e.g., simultaneously lowering the riser, selecting a new riser joint, and collecting information about the riser bolts, such as their rotation in the bolt receptacle 116, is stored in a suitable memory (e.g., a memory associated with robot controller 142). Having the information about the riser bolts stored in memory, allows robotic controller 142 to pick up a riser bolt from bolt receptacle 116, orient the riser bolt into a correct position, and start running down the riser bolt without significant time delay.

Figure 10A:
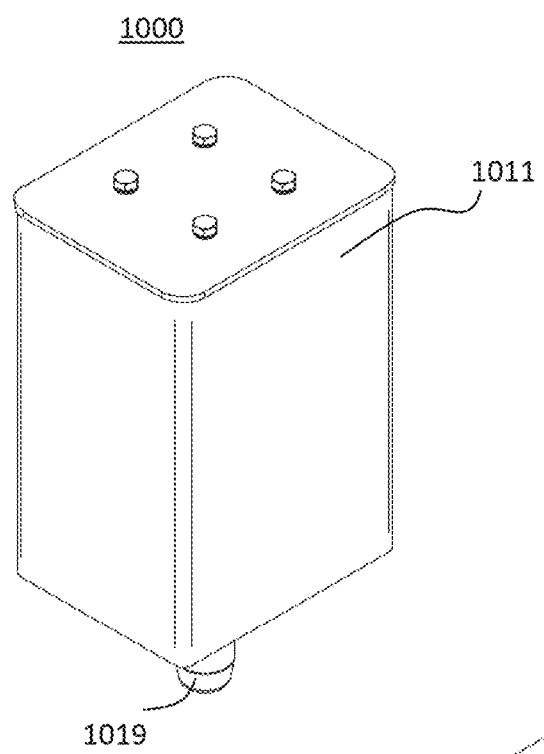
FIGS. 10A and 10B are example views of a spider dog locking pin assembly, according to an embodiment.
Figure 10B:
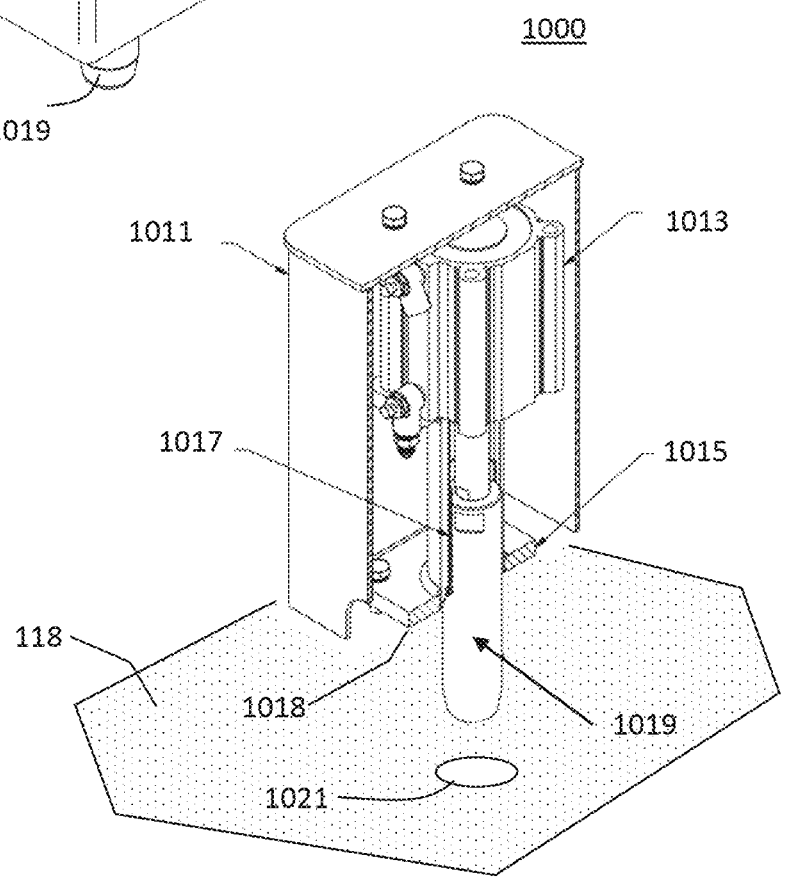

FIGS. 10A-10D show examples of spider dog locking pin assembly 1000 (herein also referred to as pin assembly) used for locking or unlocking spider dogs (e.g., spider dog 127 is locked/unlocked by pin assembly 125, as shown in FIG. 1C). In an example embodiment, a spider dog locking pin assembly (e.g., pin assembly 1000, as shown in FIGS. 10A and 10B) may be disposed above the pin holes of spider deck 118 (pin holes of spider deck 118 are holes in spider deck 118). In an example embodiment, pin assembly 1000 may have one or more spider dog locking pins, which may be configured to automatically be inserted into or removed from the pin holes. The automatic insertion and removal of locking pins may be facilitated by a control system (e.g., control system 140, as shown in FIG. 2).

An example external view of pin assembly 1000 is shown in FIG. 10A, while internal details of pin assembly 1000 are illustrated via a cross-sectional view of pin assembly 1000 in FIG. 10B. An example pin assembly 1000 includes protective housing 1011, a locking pin 1019 for insertion into a pin hole 1021 located in the spider deck, a pneumatic cylinder 1013 for controlling the movement of locking pin 1019 (e.g., pneumatic cylinder 1013 may control lowering/lifting locking pin 1019 into/out of pin hole 1021). Pneumatic cylinder 1013 may be controlled by an electronic solenoid valve, which may be operated by a control system (e.g., by a spider system controller 246 of control system 140). In various embodiments, pneumatic cylinder 1013 may include sensors for validating a position of locking pin 1019. For example, the sensors may determine whether locking pin 1019 is extended into pin hole 1021 or if locking pin 1019 is retracted from pin hole 1021. In an example embodiment, pneumatic cylinder 1013 is connected to locking pin 1019 via a connecting element 114. Additionally, pin assembly 1000 includes a lock pin bushing housing 1015 and a bushing 1017 for protecting locking pin 1019 from walls of cylindrical element 1018. In an example embodiment, cylindrical element 1018 and bushing 1017 are used to ensure that locking pin 1019 does not wobble when it is lowered/lifted into/out of pin hole 1021. In an example embodiment, bushing 1017 may be a polymer bushing.

Figure 10C:
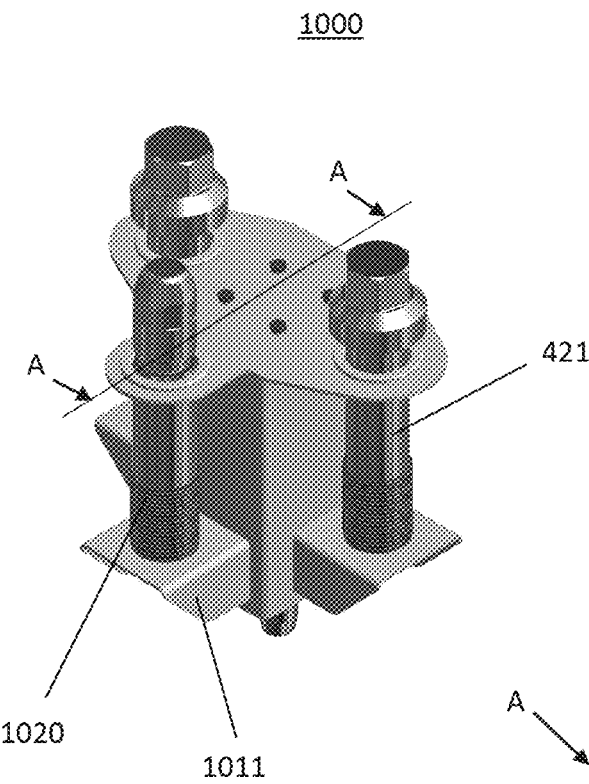
FIGS. 10C and 10D are other example views of a spider dog locking pin assembly, according to an embodiment.
Figure 10D:
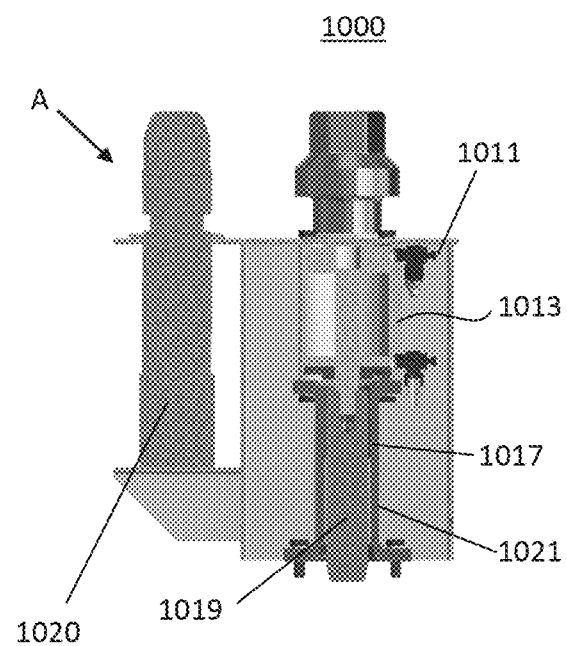

FIGS. 10C and 10D show example embodiments of pin assembly 1000 with protective housing having a docking area for holding riser bolts, such as riser bolt 421 and stabbing guide 1020. The docking area is configured to help improve efficiency by reducing idle time periods for a robotic arm. In an example embodiment, FIG. 11B shows a cross-sectional area A of pin assembly 1000, including bushing 1017, walls 1021 of protective housing 1011, pneumatic cylinder 1013, locking pin 1019, and stabbing guide 1020. As shown in FIGS. 10C and 10D, protective housing 1011 is configured to include a stabbing guide receptacle disposed on the spider deck and configured to hold a plurality of stabbing guides.

Figure 11A:
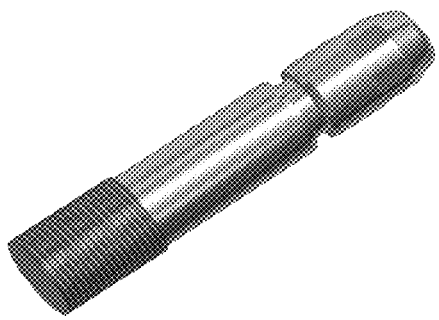
FIG. 11A is an example stabbing guide, according to an embodiment.
Figure 11B:
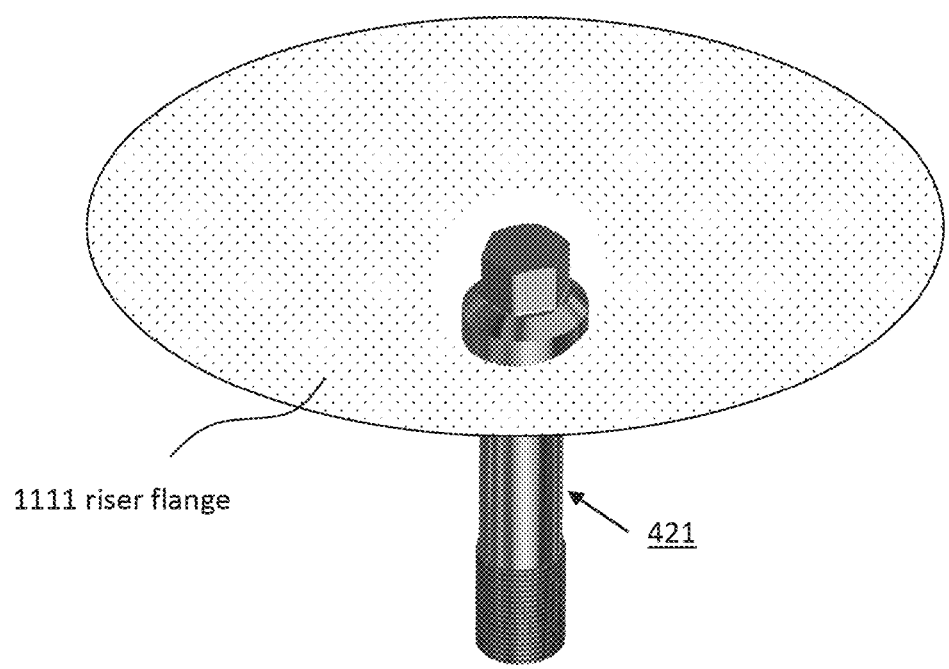
FIG. 11B is an example riser bolt, according to an embodiment.

FIG. 11A shows an example stabbing guide 1020. Consistent with disclosed embodiments, stabbing guide 1020 is used to help align connection of an incoming (second or higher) riser joint of a riser onto a previous (first or lower) riser joint of a riser. In an example embodiment, stabbing guide 1020 is installed into the lower riser. The installation of stabbing guide 1020 may be performed by MFT 400. For example, a robotic arm (e.g., robotic arm 114A) is configured to pick up stabbing guide 1020 from a suitable docking location (e.g., from protective housing 1011) and move stabbing guide 1020 towards a riser flange (i.e., connection joint of the riser). Robotic arm 114 is then configured to place stabbing guide 1020 into a suitable threaded hole (herein also referred to as a flange stabbing guide hole) of the riser flange (in an example embodiment, flange stabbing guide hole may be different than a flange hole for riser bolts). MFT 400 is configured to thread stabbing guide 1020 to a predetermined length. Once stabbing guide 1020 is inserted, the incoming higher riser joint of the riser can then be placed onto the lower riser joint with aligning facilitated by thread stabbing guide 1020. Once the higher and lower riser joints of the riser are connected by riser bolts, MFT 400 is configured to loosen stabbing guide 1020 and return stabbing guide 1020 to the suitable docking station.

FIG. 11B shows an example of riser bolt 421. In various embodiments, riser bolt 421 is used to make a connection between the higher and the lower riser joints of the riser. The installation of riser bolt 421 may be performed by MFT 400. For example, a robotic arm (e.g., robotic arm 114A) is configured to pick up riser bolt 421 from a suitable docking location (e.g., from protective housing 1011 or from bolt receptacle 116) and move riser bolt 421 towards a riser flange (i.e., connection joint of the riser). The robotic arm is then configured to place riser bolt 421 into a suitable available threaded hole of the riser flange (e.g., a hole that does not contain stabbing guide 1020). MFT 400 is configured to run down riser bolt 421 into the hole. In an example embodiment, retaining fork 435 is configured to retract to allow hexagonal head 423 of riser bolt 421 to seat over a surface of a riser flange 1111, as shown in FIG. 11B.

As described above, camera system 450 in combination with control system 140 is configured to analyze images of various components manipulated by riser-connection manipulation tool 130. In various embodiments, camera system 450 may be part of any suitable riser-connection manipulation tool 130. For example, camera system 450 may include camera 452 and be part of MFT 400, as shown in FIG. 4B. Alternatively, camera system 450 may be part of torque wrench tool 800, as shown, for example, in FIG. 8B.

In an example embodiment, an image may include a head of a riser bolt, a head of a stabbing guide, a top view of a riser joint, a top view of a breech lock, a top view of a latching dog, a top view of a riser conduit, a view of a spider, a view of a connecting joint (e.g., connecting joint 705, as shown in FIG. 7C), a view of a bolt receptacle 116, a view of a robotic arm (e.g., robotic arm 114B), a view of one of tool cabinets (e.g., a view of tool cabinet 112A or 112B), a view of spider deck 118, a view of a spider dog locking pin assembly, a top or bottom view of a hole cover, a view of a fill nozzle valve assembly, a view of riser-connection manipulation tool 130 (e.g., a riser-connection manipulation tool), or any other suitable structure or a component that requires recognition (e.g., a docking station for one of riser-connection manipulation tools). In various embodiments, camera system 450 is configured to collect images and transmit the images to control system 140 for further processing. In an example embodiment, control system 140 may analyze images by recognizing objects within the images. Control system 140 may employ any suitable object recognition approach such as decision trees, neural networks (e.g., deep neural networks such as a convolutional neural networks), or any other suitable image classification schemes (e.g., support vector machines). In an example embodiment, image recognition includes pattern recognition, outline detection, detection of object features, and the like.

In an example embodiment, camera system 450 is configured to collect images, and transmit the collected images to control system 140 (e.g., to robotic controller 142) for analysis. Robotic controller 142 may analyze the images using pattern recognition and detect a current position of the riser joint. In an example embodiment, robotic controller 142 may be configured to compare the current position with a previously-known position of the riser joint, determine a deviation from the previously-known position, and adjust a position of a robotic arm (e.g., robotic arm 114A) that uses a particular one of riser-connection manipulation tools.

Figure 12:
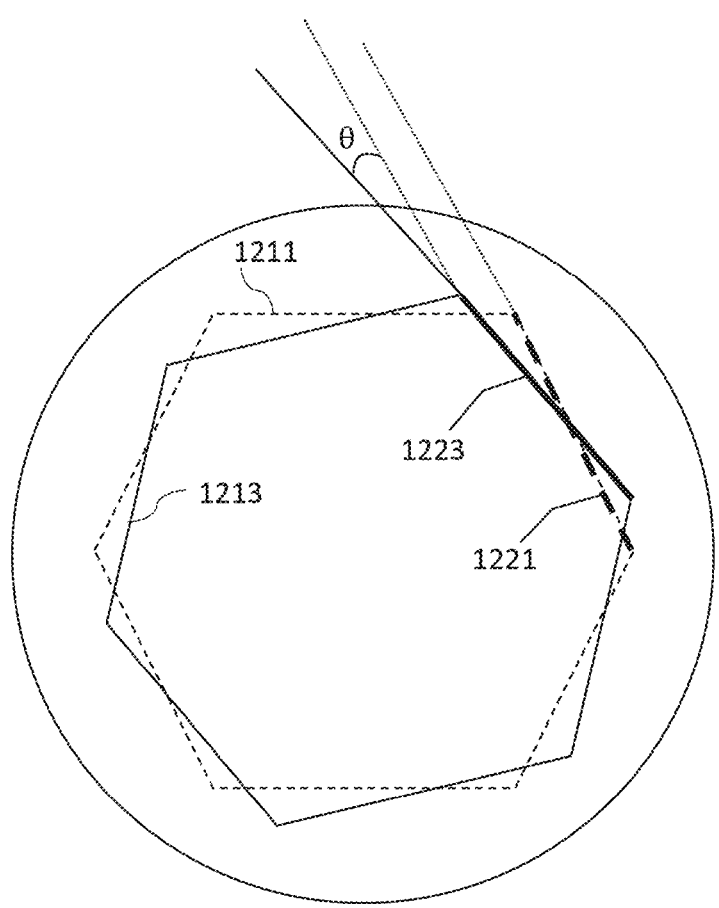
FIG. 12 is an example rotation of a riser bolt detectable by a camera, according to an embodiment.

In another example embodiment, camera system 450 is configured to collect images, and transmit the collected images to robotic controller 142 for analysis. Robotic controller 142 may analyze the images using line recognition and detect a straight line of the bolt and determine a rotation angle of the straight line. In an example embodiment, robotic controller 142 may be configured to send a rotational angle to a suitable tool motor (e.g., a servo motor of MFT 400), thus, allowing the servo motor to rotate socket 413 to match the rotation of the head of the riser bolt. FIG. 12 shows an example embodiment of an orientation 1213 of a hexagonal head being rotated by an angle θ relative to an initial orientation 1211. In an example embodiment, robotic controller 142 is configured to analyze images representing line 1223, compare an orientation of line 1223 with an orientation of line 1221 (line 1221 corresponds to an unrotated hexagonal head), and determine a rotational angle θ based using lines 1223 and 1221. Subsequently, rotational angle θ may be transmitted to the servo motor to appropriately rotate socket 413.

In yet another example embodiment, camera system 450 is configured to analyze the collected images and transmit the analysis results to robotic controller 142.

FIG. 13 is an example plot 1300 of torques exerted by torque wrench tool 800.

Consistent with disclosed embodiments, plot 1300 may be used for detecting the end of stoke of hydraulic torque tool 816 of torque wrench tool 800. In an example embodiment, a pressure sensor may be used to monitor the hydraulic pressure within the hydraulic cylinder to determine the end of stroke of a piston of the hydraulic cylinder by the rate in rise of hydraulic pressure. In some cases, in addition (or alternatively) to the pressure sensor, an end of stroke detection sensor, such as an internal position sensor may be used to determine an extend of the piston of the hydraulic cylinder. Additionally, or alternatively, an external position sensor (e.g., a laser-based sensor) may be used to determine the end of the stroke of the piston. Further, a pressure sensor on torque wrench tool 800 may be used for detecting output torque and when the output torque stops increasing the hydraulic cylinder is determined to be at the end of stroke.

Plot 1300 indicates a first stroke (stroke 1) of the hydraulic cylinder during the time interval of T0 to T2, and a second stroke (stroke 2) of the piston of the hydraulic cylinder during the time interval of T2 to T3. As shown by plot 1300, end of the piston extension during the first stroke may be observed when pressure detected by a pressure sensor reaches a peak P1 at time T1. In an example embodiment, T1 may be a few seconds. After being fully extended, the piston is returned into the hydraulic cylinder thus resulting in observed decrease in the pressure measured by the pressure sensor, as shown by valley V1. The pressure may be further decreased when the piston fully returns to the hydraulic cylinder, as shown by valley V2. Subsequently, during a second stroke the pressure sensor may measure a peak pressure P3 at time T3. In an example embodiment, peak pressure P3 may be not due to the piston being fully extended, but due to a riser bolt (that is being manipulated by torque wrench tool 800) being run down to a target level as determined by a target torque value. In an example embodiment, to distinguish between peaks P1 and P3 derivatives 1311 and 1313 may be taken. As shown for peak P1, derivative 1311 is determined to be higher (due to sudden stop of the piston as it reaches its maximum extension) than derivative 1313 for peak P3. Thus, when the pressure measured by the pressure sensor increases quickly, this indicates the piston of the hydraulic cylinder has reached the end of the stoke. When the pressure ramps up slowly over time this indicates the target torque for the riser bolt is reached.

Figure 14A:
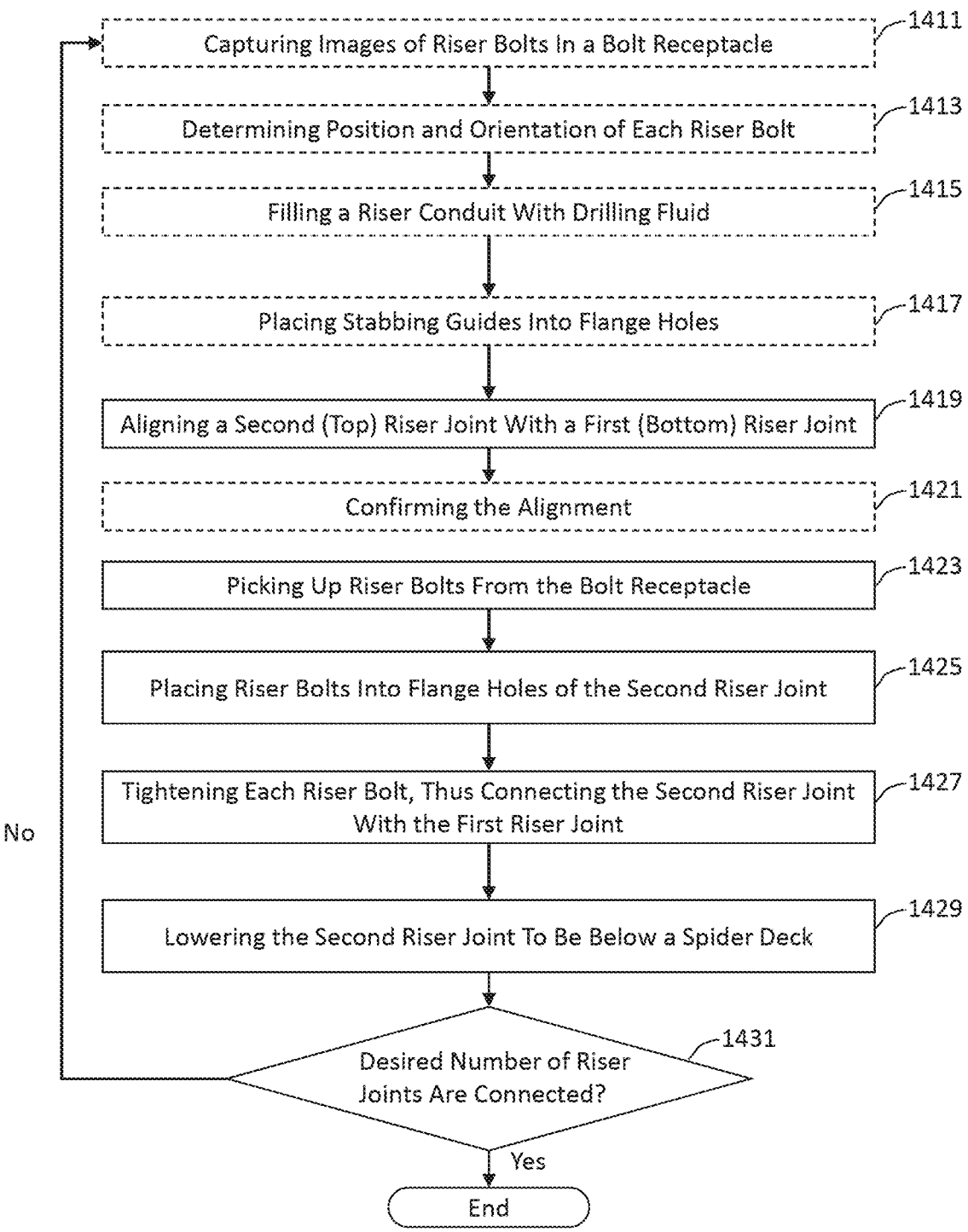
FIGS. 14A and 14B are example processes for making a riser, according to an embodiment.

The systems described herein (e.g., system 100 or 200) may perform various tasks needed for making or breaking the riser. In an example embodiment, the systems described herein may be used in process 1400 for making the riser, as shown in FIG. 14A. Some of the steps of process 1400 may be performed manually. Some of the steps of process 1400 shown in dashed boxes may be optional. In an example embodiment, at step 1411 of process 1400, the systems described herein may be configured to use a camera of one of riser-connection manipulation tools (e.g., camera 452 of MFT 400) to capture images of one or more riser bolts located in a suitable docking station dedicated for the riser bolts. For example, the docking station may be a bolt receptacle 116, as shown, for example, in FIG. 1B. Capturing images of riser bolts located in bolt receptacle 116 may be an optional step, as indicated by a dashed line in FIG. 14A. At step 1413, the systems described herein may also determine the position and orientation of each riser bolt in bolt receptacle 116. In an example embodiment, a suitable control system (e.g., control system 140) may be used for determining the position and the orientation of each riser bolt. As described above, control system 140 may use image recognition software (e.g., neural networks) for determining the position and the orientation of each riser bolt. In an example embodiment, step 1413 may be an optional step.

At step 1415, the systems described herein, via control system 140, may instruct one or more robotic arms (e.g., robotic arms 114A and 114B) to fill one or more riser conduits with a drilling fluid. In an example embodiment, robotic arms 114A and 114B may use an auxiliary line fill tool 700 to fill one or more riser conduits with a drilling fluid as described above. In an example embodiment, step 1415 may be an optional step.

At step 1417, the systems described herein may instruct robotic arms 114A and 114B (via control system 140) to place stabbing guides (e.g., guides 1020) into flange holes, as described above. In an example embodiment, step 1417 may be an optional step.

At step 1419, an operator aligns a top (herein also referred to as a second) riser joint with a bottom (herein also referred to as a first) riser joint. The alignment includes aligning holes of the first and the second riser joints in which the riser bolts mat be inserted to connect the first and the second riser joints. In an example embodiment, aligning is facilitated by step 1417 of process 1400. For example, when stabbing guides are inserted in the first riser joint, the second riser joint may be placed such that stabbing guides pass through flange holes of the second riser joint, thus aligning the first riser joint with the second riser joint.

At step 1421, system 100, via control system 140, may confirm that the first and the second riser joints are aligned. In an example embodiment, the alignment confirmation may be done by using a camera of a selected riser-connection manipulation tool 130 (e.g., camera 452 of MFT 400). For instance, camera 452 may take images of the first and the second riser joints, and control system 140 (e.g., a robotic controller 142 of control system 140) may analyze images and conclude that the first and the second riser joints are aligned (e.g., by checking the alignment of holes in which riser bolts are configured to be inserted). In an example embodiment, the alignment confirmation may be done manually by the operator. In an example embodiment, step 1421 may be an optional step.

At step 1423, the systems described herein, via control system 140, may instruct robotic arms 114A and 114B to pick up riser bolts from a bolt receptacle (e.g., from a bolt receptacle 116). In an example embodiment, robotic arms 114A and/or 114B may user MFT 400 for picking riser bolts.

At step 1425, system 100, via control system 140, may instruct robotic arms 114A and 114B to place riser bolts into flange holes of the second riser joint. The placement of the riser bolts into the flange holes of the second riser joint is accomplished via image recognition process. For example, control system 140 may recognize position of flange holes via a camera (e.g., camera 452 of MFT 400) and direct robotic arms 114A and/or 114B towards flange hole positions determined by control system 140.

At step 1427, after placing riser bolts in corresponding flange holes (each hole may be threaded for receiving a threaded riser bolt) robotic arms 114A and/or 114B are configured to tighten each one of the riser bolts, thus connecting the second riser joint to the first riser joint.

At step 1429, the first and the second riser joints are configured to be lowered, such that a top of the second riser joint is lowered below a spider deck. It should be noted, that while the first and the second riser joints are being connected by riser bolts, spider dogs (e.g., spider dogs 124, as show, for example, in FIGS. 1B and 1C) may secure the first and the second riser joints in place. After a connection between the first and the second riser joint is established, spider dogs 124 are configured to release the first and the second riser joints, and the first and the second riser joints may be lowered below the spider deck.

At step 1431, control system 140 may be configured to check if a desired number of riser joints is connected. Alternatively, the operator may check if a desired number of riser joints is connected. If the desired number of the riser joints is connected (step 1431, Yes), process 1400 is completed. Alternatively, if the desired number of the riser joints is not connected (step 1431, No), process 1400 may proceed to step 1411. In case step 1411 is not performed, process 1400 may proceed to a next subsequent step that is being performed (e.g., to steps 1413-1417 if they are being performed in an order as shown by process 1400, or to step 1419).

Figure 14B:
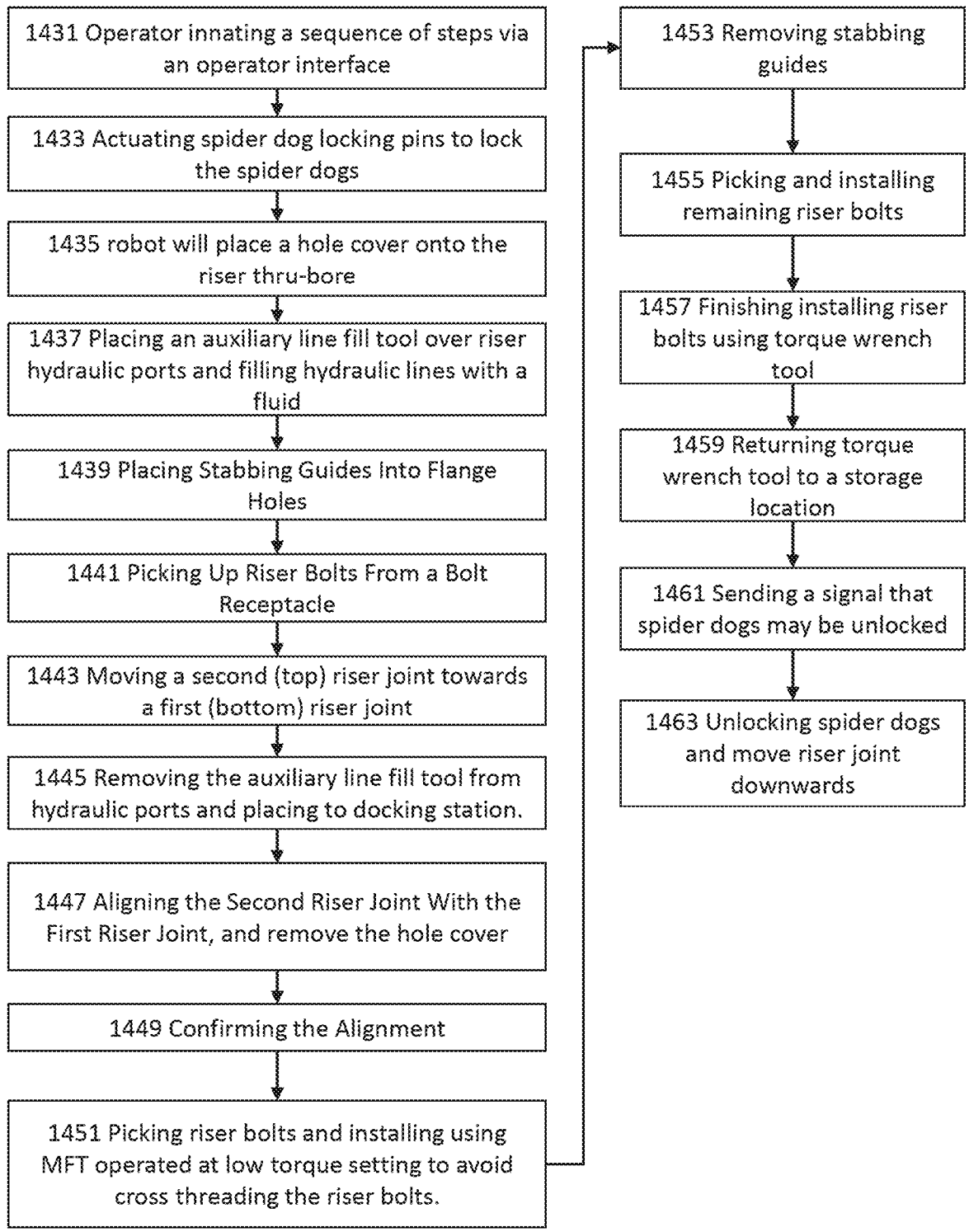

FIG. 14B shows another embodiment of a process 1401 for making the riser. Some of the steps of process 1400 may be performed manually. Some of steps of process 1401 may be optional. In an example embodiment, at step 1431 of process 1401, to make the riser, an operator (e.g., a person operating system 100 or 200) may initiate a sequence of steps via an operator interface (e.g., human-machine interface 144, as described above).

At step 1433, control system 140 (e.g., via interface 144, and/or spider system controller 246) actuates spider dog locking pins to lock the spider dogs. At step 1435, a robotic arm (e.g., robotic arm 114A) is configured to place a hole cover onto a top riser joint and over a thru-bore of the riser, as described above. At step 1437, robotic arms 114A and 114B are configured to place an auxiliary line fill tool (e.g., auxiliary line fill tool 700) over one or more of the riser hydraulic ports. Further, robotic arms 114A and 114B are configured to fill hydraulic lines with a hydraulic fluid via the hydraulic ports, as described above.

At step 1439, robotic arms 114A and 114B (operated by control system 140) are configured to place stabbing guides (e.g., guides 1020) into flange holes, as described above. In an example embodiment, step 1439 may be an optional step.

At step 1441, control system 140, may instruct robotic arms 114A and 114B to pick up riser bolts from a bolt receptacle (e.g., from bolt receptacle 116). In an example embodiment, robotic arms 114A and/or 114B may user MFT 400 for picking riser bolts. Further, robotic arms 114A and 114B may place the riser bolts into a staging rack (herein, the staging rack is a rack for temporarily storing riser bolts, e.g., pin assembly 1000).

At step 1443, an operator may move a second riser joint towards a first riser joint. The movement of the second riser joint towards the first riser joint may be accomplished via any suitable mechanisms such as cranes, robotic arms, and the like.

At step 1445, control system 140 is configured to instruct robotic arms 114A and 114B to remove the fill nozzles from the hydraulic ports and to place the auxiliary line fill tools to a suitable docking station (e.g., place the auxiliary line fill tools to tool cabinets 112A and 112B, as shown, for example, in FIG. 1B).

At step 1447, control system 140 may instruct any suitable mechanisms of system 100 (e.g., robotic arms 114A and 114B) to align a top (herein also referred to as a second) riser joint of the riser (herein also referred to as a riser joint) with a bottom (herein also referred to as a first) riser joint. Alternatively, aligning the top riser joint with the bottom riser joint may be done manually via, for example, an operator operating suitable cranes for holding riser joints, and/or components of spider deck 118 (e.g., robotic arms, spider deck dogs, etc.) using human machine interface 146. The alignment includes aligning holes of the first and the second riser joints in which the riser bolts mat be inserted to connect the first and the second riser joints. In an example embodiment, one robotic arm (e.g., robotic arm 114A) is configured to remove the hole cover, and another robotic arm (e.g., robotic arm 114B) is configured to monitor an alignment of the first and the second riser joints.

At step 1449, an operator may verify/confirm the alignment of the riser using cameras (e.g., camera 452) of riser-connection manipulation tool 130 operated by one or more robotic arms. The confirmation is done by taking images using camera 452, and analyzing images using control system 140 to verify the alignment.

At step 1451, once the first and the second riser joints are properly aligned, robotic arms 114A and 114B are configured to pick up a few (e.g., two) riser bolts from the staging rack and install the riser bolts using MFT 400. In an example embodiment, a low torque setting may be used for installing riser bolts to avoid cross threading the riser bolts.

At step 1453, robotic arms 114A and 114B are configured to remove stabbing guides and return them to an appropriate docking station (e.g., a staging rack which, in some cases, may be a pin assembly 1000).

At step 1455, robotic arms 114A and 114B are configured to pick up the remaining riser bolts from the staging rack and install these riser bolts using MFT 400. In an example embodiment, a low torque setting may be used for installing riser bolts to avoid cross threading the riser bolts.

At step 1457, robotic arms 114A and 114B are configured to use a torque wrench tool (e.g., torque wrench tool 800) to drive two riser bolts at a time (one per robotic arm 114A and 114B). In an example embodiment, torque wrench tool 800 may be picked up from a suitable docking station on the spider deck (e.g., from tool cabinets 112A and 112B). While using torque wrench tool 800, robotic arms 114A and 114B, using pressure sensors and robotic controller 142, are configured to verify that the correct torque is achieved (applied). Further, robotic controller 142 is configured to record torque information and transmit the recorded information via a rig network to an appropriate storage location.

At step 1459, upon confirmation that correct torques have been applied to riser bolts and that riser bolts are installed correctly, robotic controller 142 is configured to operate robotic arms 114A and 114B and return all used riser-connection manipulation tools to appropriate locations (e.g., tool cabinets 112A and 112B). Further, robotic controller 142 is configured to report to the operator that the riser bolts are properly torqued.

At step 1461, an operator may send instructions (e.g., a signal) via human-machine interface 144 that it is appropriate to actuate spider locking pins to unlock spider dogs (e.g., spider dogs 124, as shown in FIG. 1B).

At step 1463, an operator (via control system 140) may unlock spider dogs 124 and move the second riser joint down to a rig floor level, thus allowing for a subsequent riser joint to be connected to a top portion of the second riser joint. In an example embodiment, steps 1431 to 1463 may be repeated until a complete riser is formed.

Figure 15A:
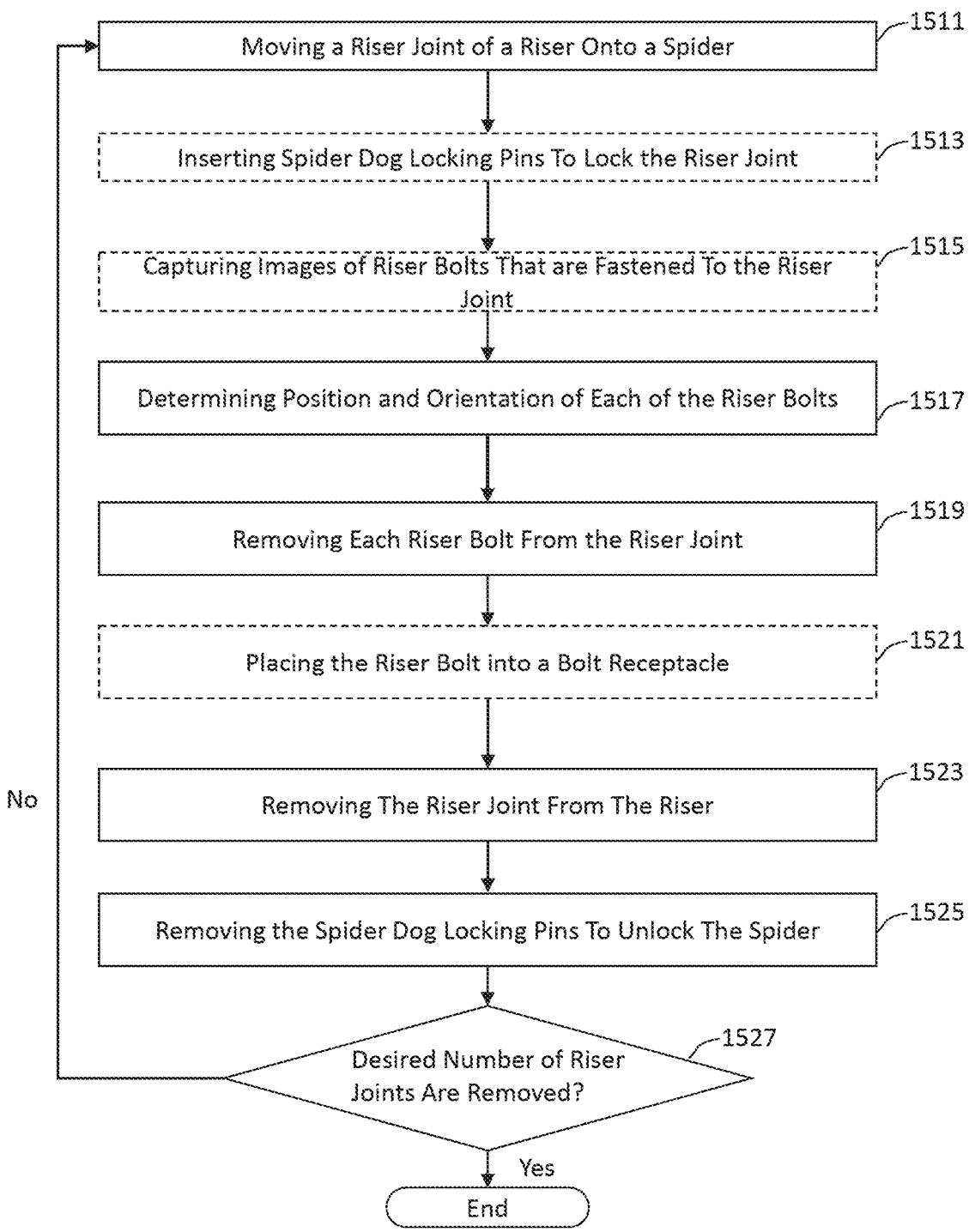

The systems described herein (e.g., system 100 or 200) may also be used in process 1500 for breaking the riser, as shown in FIGS. 15A-15B. Some of the steps of process 1400 may be performed manually. Some of steps of process 1500 may be optional. In an example embodiment, at step 1511 of process 1500, the systems described herein may be configured to move a riser, such that a connecting junction between the first and the second riser joints is placed in an opening of a spider in which spider dogs (e.g., spider dogs 124) may extend to secure the first and the second riser joints. At step 1513, spider dogs 124 may be extended towards the riser, and spider dog pins may be inserted into spider holes, as described above, to lock spider dogs 124 to the riser.

At step 1515, control system 140 may use a camera of riser-connection manipulation tool 130 (e.g., camera 452 of MFT 400) to capture images of one or more riser bolts that are being used for fastening the first riser joint to the second riser joint. At step 1517, based on image analysis, control system 140 may determine a position and an orientation (e.g., rotations of hexagonal heads of the riser bolts) of each one of the riser bolts used for connecting the first and the second riser joint.

At step 1519, robotic arms 114A and/or 114B may be instructed by control system 140 to loosen and remove each one of the riser bolts connecting the first and the second riser joint. At step 1521, robotic arms 114A and/or 114B may be configured to place the riser bolts into a bolt receptacle (e.g., bolt receptacle 116).

At step 1523, an operator may use a suitable machinery (e.g., robotic arms 114A and/or 114B) to remove the top (the second) riser joint from the first riser joint. At step 1525, control system 140 is configured to remove spider dog locking pins, thereby unlocking spider dogs 124 from the riser (herein, this process is referring to as unlocking the spider).

At step 1527, control system 140 may be configured to check if a desired number of the riser joints is removed. If the desired number of the riser joints is removed (step 1527, Yes), process 1500 is completed. Alternatively, if the desired number of the riser joints is not removed (step 1527, No), process 1500 may proceed to step 1511.

FIG. 15B shows another embodiment of a process 1501 for breaking the riser. Some of the steps of process 1400 may be performed manually. Some of steps of process 1501 may be optional. In an example embodiment, at step 1531 of process 1501, to break the riser, an operator may use human-machine interface 144, as described above, to move an incoming riser joint (herein referred to as a top riser joint) into a position of an opening of the spider. The operator instructs the systems described herein (e.g., via spider system controller 246) to close spider dogs 124 (herein closing the spider, or closing spider dogs 124 implies extending spider dogs towards the riser, such that spider dogs are pressed against the riser and exert a target pressure onto the riser).

At step 1533, the operator may instruct spider system controller 246 (via interface 144) to actuate spider dog locking pins to lock spider dog 124 in place.

At step 1535, robotic controller 142 is configured to use robotic arms 114A and 114B to pick torque wrench tool 800 from a storage rack and un-torque (loosen) one or more riser bolts at a time (e.g., robotic arm 114A may loosen a first riser bolt while robotic arm 114B loosens a second riser bolt at the same time). In various embodiments, robotic arms 114A and 114B may use torque wrench tool 800 to record torque information while loosening the riser bolts. Further, robotic arms 114A and 114B may transmit torque information through a rig network to a suitable data storage and/or torque information may be further analyzed by control system 140.

After completing step 1535, at step 1537, all riser bolts connecting a top riser joint with the bottom riser joint may be removed (e.g., riser bolts may be removed by robotic arms 114A and 114B operating MFT 400s). In an example embodiment, riser bolts may be placed in bolt receptacle 116 or elsewhere (e.g., staging rack), and robotic controller 142 may determine that all the riser bolts are successfully removed and stored. Such a determination may be made via, for example, camera 452 of MFT 400.

At step 1539, robotic controller 142 may signal the operator that all the riser bolts are removed and stored. Once the top riser joint is disconnected from the bottom riser joint, at step 1541, to the operator moves the upper riser joint away from the lower riser joint using any suitable mechanical device (e.g., a crane). The crane may store the upper riser joint in an appropriate storage location and thus free up the crane. At step 1543, the operator may signal, e.g., control system 140, that the crane is free and may be used for moving a next riser joint (lower riser joint).

At step 1545, the operator may operate the crane to capture the lower riser joint. The crane may be attached to the lower riser joint using any suitable attaching mechanisms, such as hooks, clamps, and the like. At step 1547, the operator may signal (or confirm) to control system 140 that the lower riser joint has been captured.

At step 1549, control system 140 may unlock spider dog locking pins and signal the operator that the locking pins are removed. At step 1551, control system 140 may open the spider (e.g., may retract spider dogs 124 away from the riser), and move the lower riser joint upward such that a junction between the lower riser joint and the following riser joint is in a position of an opening of the spider.

At step 1553, control system 140 is configured to extend spider dogs 124 towards the riser, thus closing the spider, as described above. Further, at step 1555, control system 140 is configured to lock spider dog locking pins and signal the operator that the spider dog locking pins are locked. In an example embodiment, steps 1531 to 1555 may be repeated until a required number of riser joints are disconnected (i.e., until the riser is broken).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

In various embodiments, robotic arms (e.g., robotic arms 114A and 114B) may be configured to be present in (herein, also referred to as deployed to) a work area. Alternatively, robotic arms 114A and/or 114B may be configured to be removed from the work area. The work area may be defined as a region of space next to or proximate to spider 120, as shown, for example, in FIG. 1D. The work area is a region in which riser joints are joined together (or separated from one another) via, for example, riser bolts. In some cases, in addition to robotic arms 114A and 114B being present or absent in the work area, spider deck components (e.g., spider deck tools, spider deck tools storage units, such as tool cabinet 112A or 112B, or any other suitable spider deck components (e.g., bolt receptacle 116) may be kept in, removed from, or brought into the work area. In some cases, either robotic arms 114A and 114B, or any suitable spider deck components may be moved within the work area. For example, robotic arms 114A and 114B may be configured to be moved to a periphery of the work area or moved towards a center of the work area.

In an example embodiment, the presence in the work area (or absence from the work area) of robotic arms 114A and 114B may be due to various events happening at a riser rig. For instance, such events include lowering a riser joint towards a spider deck, moving (e.g., lifting) a riser joint away from the spider deck, completing making of the riser, completing braking of the riser, joining one riser joint with another riser joint, separating a riser joint from another riser joint, preparing spider 120 for securing a riser joint, preparing spider 120 for releasing a riser joint, or any other suitable events at the riser rig (e.g., storing robotic arms 114A and/or 114B for a period when riser rig is inactive).

Figure 16:
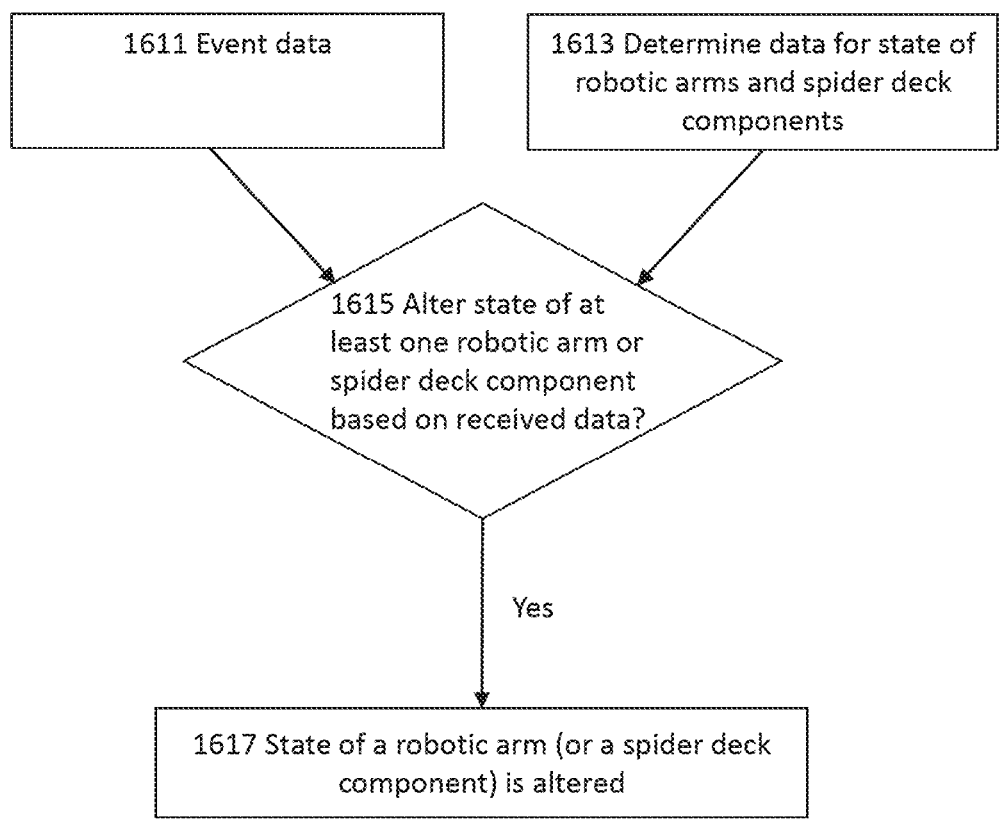
FIG. 16 is an example process of altering state of robotic arms and spider deck components based on the various events at a riser, according to an embodiment.

FIG. 16 shows an example process 1601 for altering a state of one or more of robotic arms (or any other suitable spider deck components) based on data 1611 from one or more events happening at a riser rig. In some cases, a combination of events happening at the riser rig contributes to data 1611 that is used to determine whether a state one or more of robotic arms (or any other suitable spider deck components) should be altered or maintained. For instance, a single event of spider dogs releasing a riser joint may determine that robotic arms 114A and 114B may need to be removed form the work area prior to lifting a riser joint. In some cases, a combination of events of moving the riser joint towards spider 120 and moving spider dogs 124 to secure riser joint to spider 120 may be used for determining that robotic arms 114A and 114B may move to the work area. As shown in FIG. 16, based on input from data 1611 and data 1613 for determining state of robotic arms and spider deck components, at step 1615 a suitable control system (e.g., control system 140, as shown in FIG. 2) for controlling position and placement of robotic arms 114A and 114B, as well as position and placement of spider deck components, is used to determine if a state of at least one robotic arm or spider deck component should be altered, based on the received data 1611 or 1613. In an example embodiment, a state of a robotic arm (e.g., robotic arm 114A) may include a position of robotic arm 114A within the work area, or relative to the work area (e.g., how far robotic arm 114A is from the work area), orientation of robotic arm 114A relative to the work area (e.g., whether robotic arm 114A faces a center of the work area or faces away from the center of the work area), a particular shape of robotic arm 114A (e.g., how much robotic arm 114A is extended, folded, twisted, and the like), or a proximity to other spider deck components (e.g., how proximate robotic arm 114A to spider deck 120, to tool cabinet 112A and 112B, or to bolt receptacle 116). A state of spider deck components may include position and/or orientation of the spider deck components relative to the work area. A change of state may include moving robotic arm 114A (and/or robotic arm 114B) into (or out of) the work area, moving a spider deck component into (or out of) the work area (e.g., moving a tool from tool cabinet 112A into the work area via robotic arm 114A, or moving a riser bolt from bolt receptacle 116 into the work area via robotic arm 114A) or moving robotic arms 114A and/or 114B and/or related spider deck components within the work area in any suitable way (e.g., turning robotic arm 114A away from the center of the work area).

In an example embodiment, a suitable control system (e.g., control system 140, as shown in FIG. 2) may define the work area by defining a region of space having an associated coordinate system relative to which position and orientation of various spider deck components (as well as robotic arms 114A and 114B) may be established with a suitable precision. Further, the coordinate system (herein, referred to as the work area coordinate system) may be configured to establish a surface defining a boundary of the work area. In some cases, a specific definition of the boundary of the work area may not be needed and the work area coordinate system is sufficient to determine position and orientation of robotic arms 114A and 114B, as well as position and orientation of various spider deck components.

In various embodiments, at step 1615 of process 1601, if it is determined via a suitable control logic (possible control logic is further discussed below) that a state of one or more robotic arms need to be changed or a state of spider deck component needs to be changed (step 1615, Yes), at step 1617 a state of at least one robotic arm (or a spider deck component) is changed. Alternatively, if the control logic is determined that a state of one or more robotic arms does not need to be changed or a state of spider deck component does not needs to be changed (step 1615, No), a state of at least one robotic arm (or a spider deck component) is not changed (i.e., step 1617 is not performed).

Figure 17:
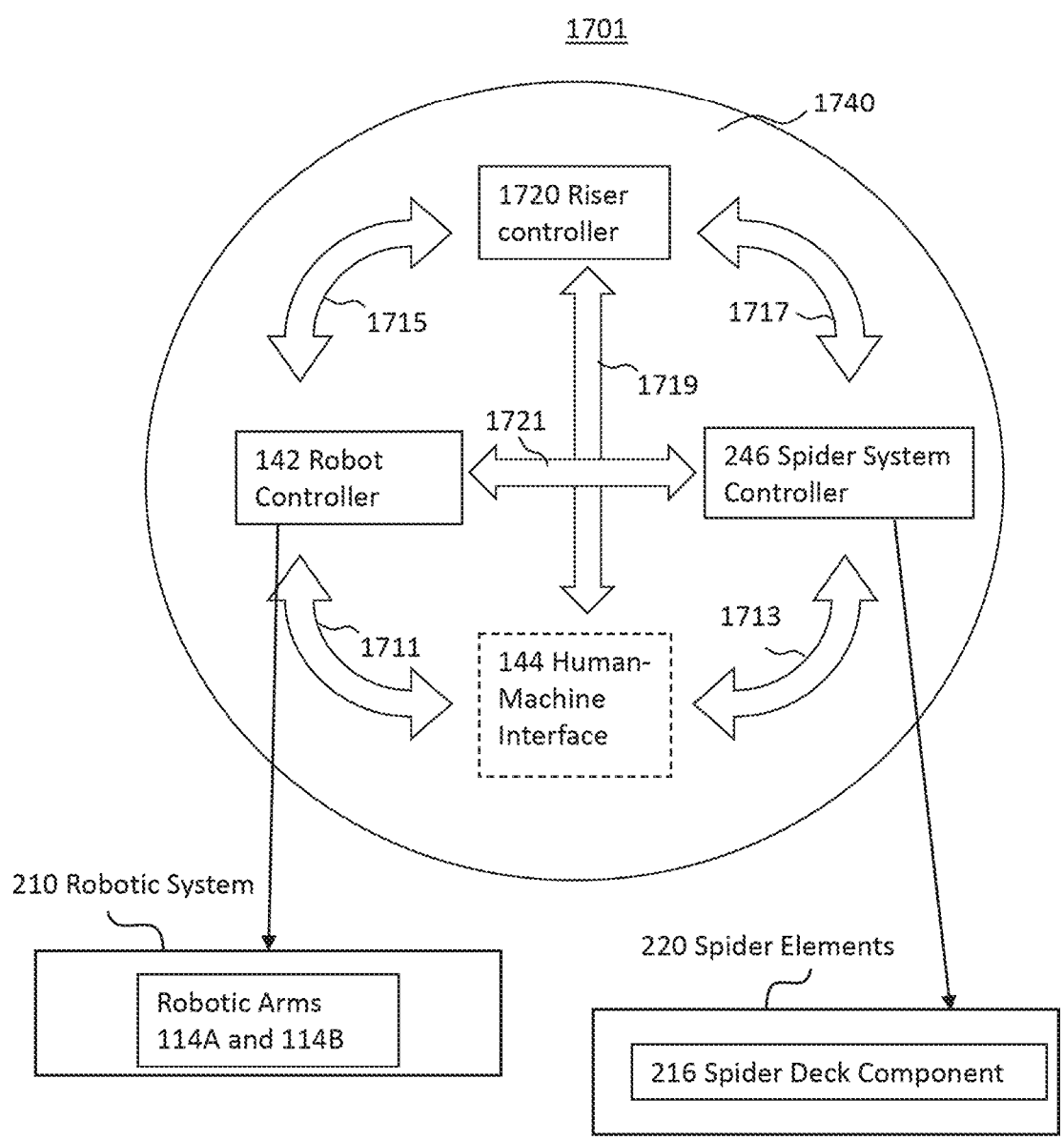
FIG. 17 is an example process of moving robotic arms and spider deck components based on the various events at a riser, according to an embodiment.

FIG. 17 shows an example process 1701 for controlling robotic arms 114A and 114B and spider deck components 216. In an example embodiment a control system 1740 may be used to control state of robotic arms 114A and 114B and spider deck components 216. Control system 1740 may be similar in form and/or function to control system 140, as shown in FIG. 2. In an example embodiment, control system 1740 includes a riser controller 1720 configured to control position of riser joints of a riser. For example, riser controller 1720 may be configured to move riser joint away or towards spider 120 using any suitable device (e.g., a crane, one or more rails with a suitable mechanism for coupling to a riser joint and for moving riser joint along the one or more rails, and the like). In various embodiments, riser controller 1720 may further control a plurality of riser joints simultaneously (or sequentially). For example, riser controller 1720 may lift a first riser joint away from spider 120 while, moving a second riser joint towards spider 120. In some cases, riser controller 1720 is configured to move riser joints vertically relative to spider 120, and in other cases, riser controller 1720 is configured to move riser joints laterally relative to spider 120. Further, riser controller 1720 may be configured to rotate the riser joints, or orient the riser joints in any suitable way relative to, for example, spider 120.

In some cases, riser controller 1720 may be controlled via human machine interface 144 as indicated by arrow 1719. For example, human machine interface 144 may be employed by a human operator to send various commands to riser controller 1720. The human operator may control lifting a first riser joint away from spider 120, lowering the first riser joint towards spider 120, moving a second riser joint, located below spider 120, towards spider 120, and the like. In some cases, riser controller 1720 is configured to send data related to a position and/or orientation of a riser joint to the human machine interface 144, and the received data may be used by the human operator to control operations of riser controller 1720. For example, the human operator may determine that riser joint needs to be further lifted if a position of riser joint (as reported by riser controller 1720) is insufficiently high. In various embodiments, riser controller 1720 may communicate with human machine interface 144 using any suitable approach (e.g., wireless communication, wired communication, near field communication, optical communication (e.g., via a light signal sending a Morse code), and the like). In various embodiments, riser controller 1720 may be configured to move riser joints into a suitable storage location when breaking a riser and move riser joints from the storage location when making the riser. The storage location may be any suitable enclosure (or partially enclosed region) for storing riser joints.

In various embodiments, riser controller 1720 may also interact with robot controller 142, as shown by arrow 1715, and send control signals to robotic arms 114A and 114B. For example, riser controller 1720, may send data to robotic controller 142 regarding locations and orientation of one or more riser joints, and robotic controller 142 may be configured to determine whether or not states (e.g., position or orientation) of robotic arms 114A and/or 114B need to be changed (e.g., controller 142 may determine that robotic arms 114A and/or 114B may need to be moved away from a work area, if a riser joint is in vicinity of the work area and is not secured to spider 120). In an example embodiment, controller 142 may be configured to command robotic arms 114A and 114B to move into the work area, move within the work area, move out of the work area, point towards a center of the work area, point away from the work area, move tools, such as riser-connection manipulation tools toward the work area or away from the work area. In various embodiments, riser controller 1720 may interact with robot controller 142 using any suitable communication, such as wireless communication, wired communication, near field communication, optical communication, and the like.

Further, riser controller 1720 may also interact with spider system controller 246, as shown by arrow 1717, for controlling position and/or orientation of spider deck components. For example, riser controller 1720, may send data to spider system controller 246 regarding locations and orientation of one or more riser joints, and spider system controller 246 may be configured to determine whether or not states (e.g., position or orientation) of spider deck components need to be changed (e.g., controller 246 may determine that spider deck components may need to be moved away from a work area, if a riser joint is in vicinity of the work area and is not secured to spider 120). In an example embodiment, controller 246 may be configured to command spider deck components to move into the work area, move within the work area, move out of the work area, point towards a center of the work area, point away from the work area, and the like. For example, spider system controller 246 may control a position of spider dogs 124, a movement of spider deck 218 (for cases when such a movement is allowed), or a position and a state of spider deck components 216, such as bolt receptacle 116, tool cabinets 112A and 112B, spider dog locking pin assembly 125, as shown in system 100, or any other components, tools, machinery associated with spider deck 218. In various embodiments, the motion and orientation of the spider deck components may be contingent on data received from riser controller 1720. For example, if a riser joint is lowered on spider 120, spider deck may be configured to be moved from the work area until the riser joint is lowered to a target position relative to spider 120. In some cases, spider system controller 246 may control opening or closing of tool cabinets 112A and 112B based on data received from riser controller 1720 (e.g., tool cabinets 112A and/or 112B may be closed until riser joint is lowered to a target position relative to spider 120).

In various embodiments, spider system controller 246 may control a movement of spider dogs 124 as well as locking or unlocking of spider dogs 124 using locking pin assembly 125, based on data received from riser controller 1720. For example, spider dogs 124 may be unlocked until a riser joint is placed within an opening of spider 120 (e.g., a second riser joint located below spider 120 may be moved towards the opening of spider 120). Subsequently, when controller 246 receives data from riser controller 1720 that the riser joint is placed in the opening of spider 120, controller 246 may activate spider dogs 124 to secure the riser joint at spider 120.

Further, spider system controller 246 may control movement of spider 120, for cases when spider 120 is capable of motion. Similar to robotic arm 214 and riser-connection manipulation tool 212, any one of spider deck components 216 may include sensors for collecting data, temporary memory storage associated with the collected data and suitable communication channels for communicating the collected data to spider system controller 246.

In various embodiments, riser controller 1720 may interact with spider system controller 246 using any suitable communication, such as wireless communication, wired communication, near field communication, optical communication, and the like.

As shown in FIG. 17, human machine interface 114 may also be configured to interact with robot controller 142 and spider system controller 246, as shown by arrows 1711 and 1713. For example, a human operator operating human machine interface 114 may issue commands to controllers 142 and 246 based on data received from riser controller 1720. In some cases, various other interactions between controllers 1720, 246, and 142 are possible. For example, spider system controller 246 and robot controller 142 may interact, as shown by arrow 1721, by exchanging data. For example, data about positions of spider dogs 124 (such data may be obtained by suitable sensors, as further described below), may be used by robot controller 142 to control position and orientation or robotic arms 114A and/or 114B. It should be appreciated that data between spider system controller 246 and human machine interface 144 may be transmitted in both ways as indicated by double arrow 1713. For example, data from sensors of spider system controller 246 may be transmitted to interface 144. Similarly, data between robot controller 142 and human machine interface 144 may be transmitted in both ways, as indicated by double arrow 1711. In FIG. 17, double arrows 1711-1721 indicate that data may be transmitted in either direction, as needed.

Figure 18A:
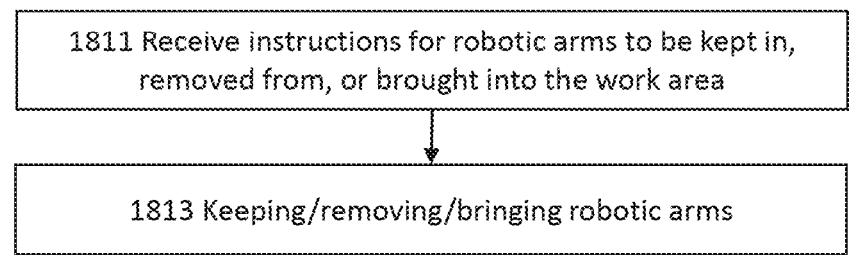
FIGS. 18A and 18B are example processes of moving robotic arms based on the received data, according to an embodiment.
Figure 18B:
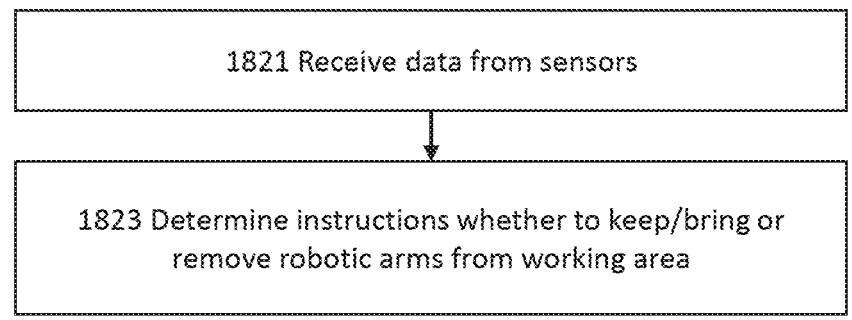

FIGS. 18A-18B show example processes 1801-1802 for changing a state of robotic arms 114A and/or 114B, consistent with disclosed embodiments. FIG. 18A shows that at step 1811 of process 1801, a controller (e.g., robot controller 142) is configured to receive instructions to keep, remove, or bring in robotic arms 114A and/or 114B into the work area. As described before, the instructions may be received either from another controller (e.g., riser controller 1720) or from a human operator via human machine interface 144. At step 1813, robotic arms may be kept within the work area, removed from the work area or brought into the work area.

FIG. 18B shows another process 1802 for determining whether to keep, bring, or remove robotic arms from the work area. At step 1821 of process 1802, a controller (e.g., robot controller 142) is configured to receive data from various sensors. In an example embodiment, sensors may be used for determining a position of spider dogs 124 (e.g., whether spider dogs 124 are open or closed). At step 1823, based on the data received from the sensors, robotic controller 142 determines instructions to robotic arms (e.g., whether to keep, bring, or remove robotic arms from the work area). For instance, if spider dogs 124 are in an open position, robotic controller 142 may determine that robotic arms should be kept away from the work area. In some cases, data from sensors may include receiving information about a position of a riser joint. For example, if the riser joint is lowered towards spider deck 118, robotic arms 114A and 114B may be kept away from the work area until the riser joint is lowered and secured by spider dogs 124 to spider 120.

Figure 19A:
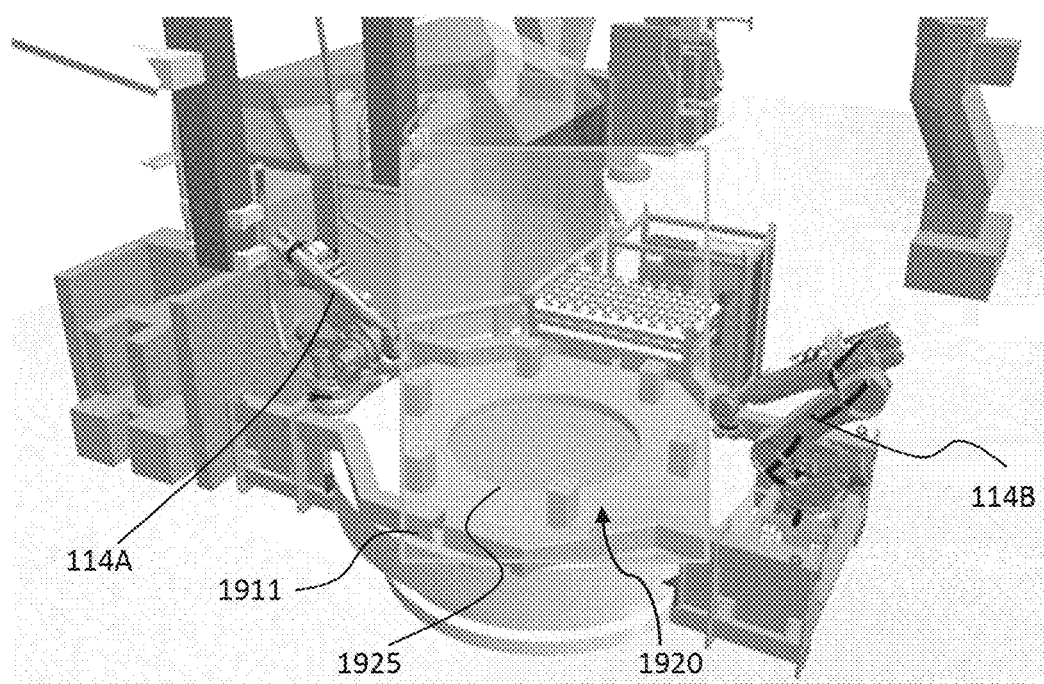
FIG. 19A is an example region of work area with robotic arms removed from the region, according to an embodiment.
Figure 19B:
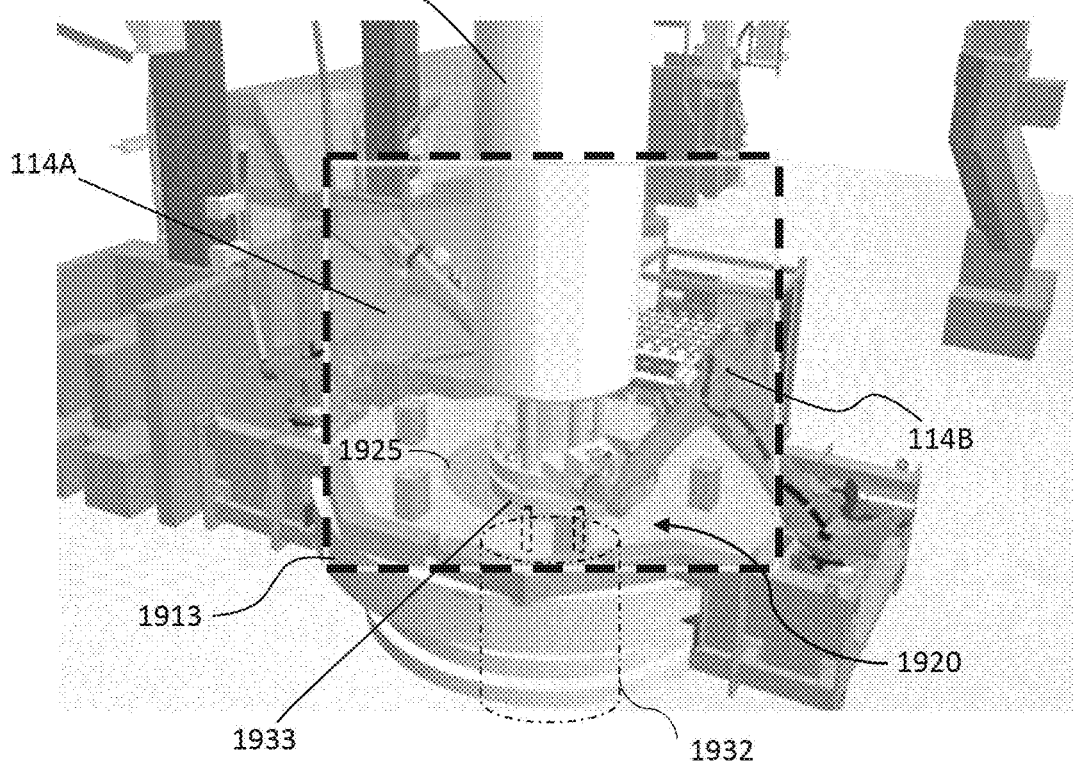
FIG. 19B is an example region of work area with robotic arms present in the region, according to an embodiment.

FIG. 19A shows a work region 1911 (or a work area 1911) with robotic arms 114A and 114B removed from work area 1911. As shown in FIG. 19A, opening 1925 of spider 1920 does not contain a first riser joint above spider 1920 that needs to be joined with a second riser joint below spider 1920. FIG. 19B shows a work region 1913 (or a work area 1913) with robotic arms 114A and 114B present in the work area 1913. As shown in FIG. 19B, a first riser joint 1931 is present in the work area 1913 and is being joined with a flange 1933 of a second riser joint 1932 located underneath spider 1920, as indicated in FIG. 19B.

Figure 20:
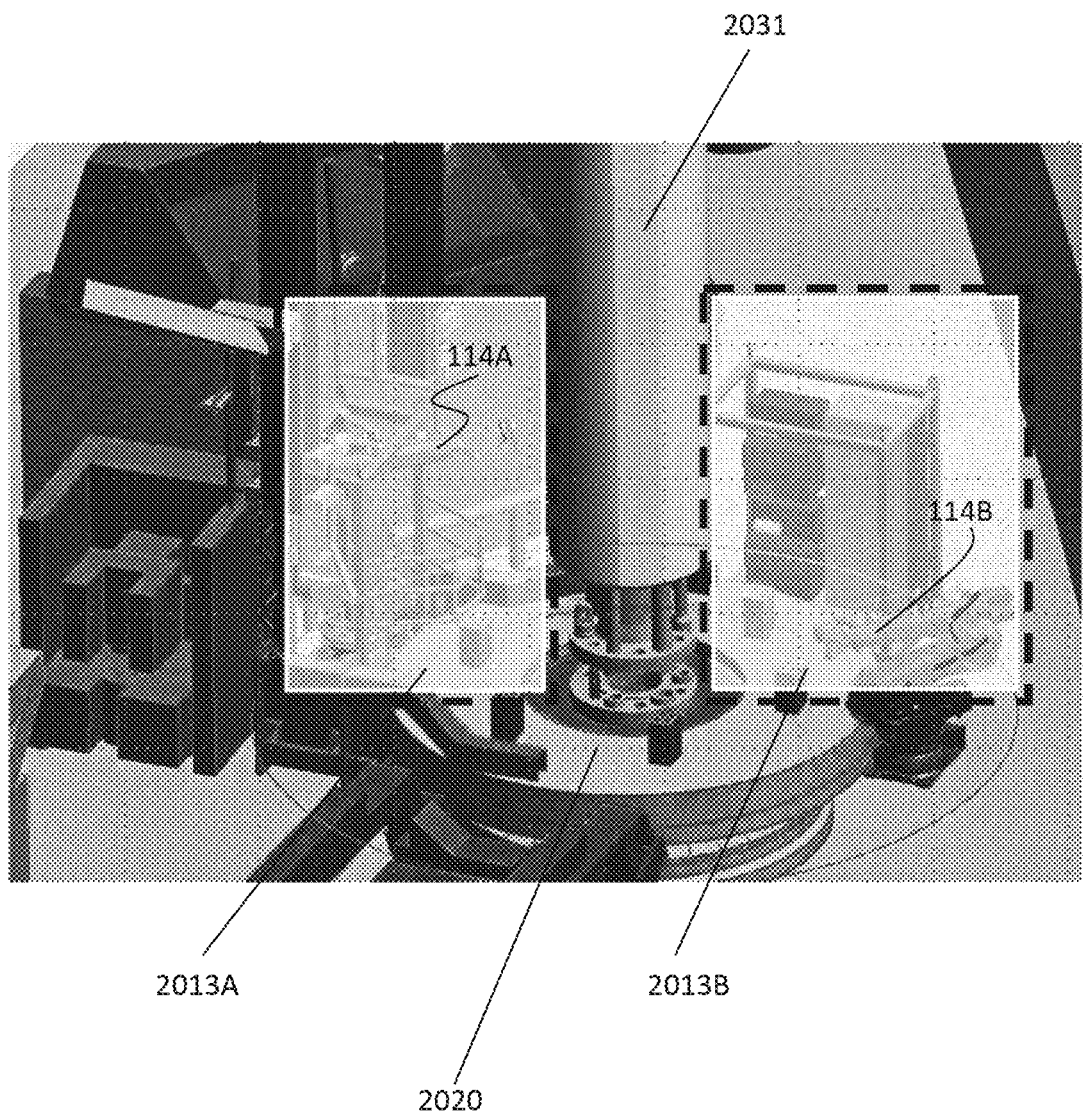
FIG. 20 are two regions of work area with robotic arms present in these regions, according to an embodiment.

FIG. 20 shows that each robotic arms 114A and 114B may have respective work areas 2013A and 2013B. In an example embodiment, robot controller 142 may control position and/or orientation of robotic arm 114A and 114B relative to their respective work areas 2013A and 2013B. For example, as shown in FIG. 20, robotic arm 114A may be moved to a periphery of work area 2013A while robotic arm 114B is placed close to a center of work area 2013B. In an example embodiment, robotic arm 114A may be extended upwards, while robotic arm 114B may be folded, as shown in FIG. 20. In an example embodiment, robotic arms 114A and 114B may be sufficiently away from a riser joint 2031 to allow riser joint 2031 to be lowered towards spider 2020.

Figure 21:
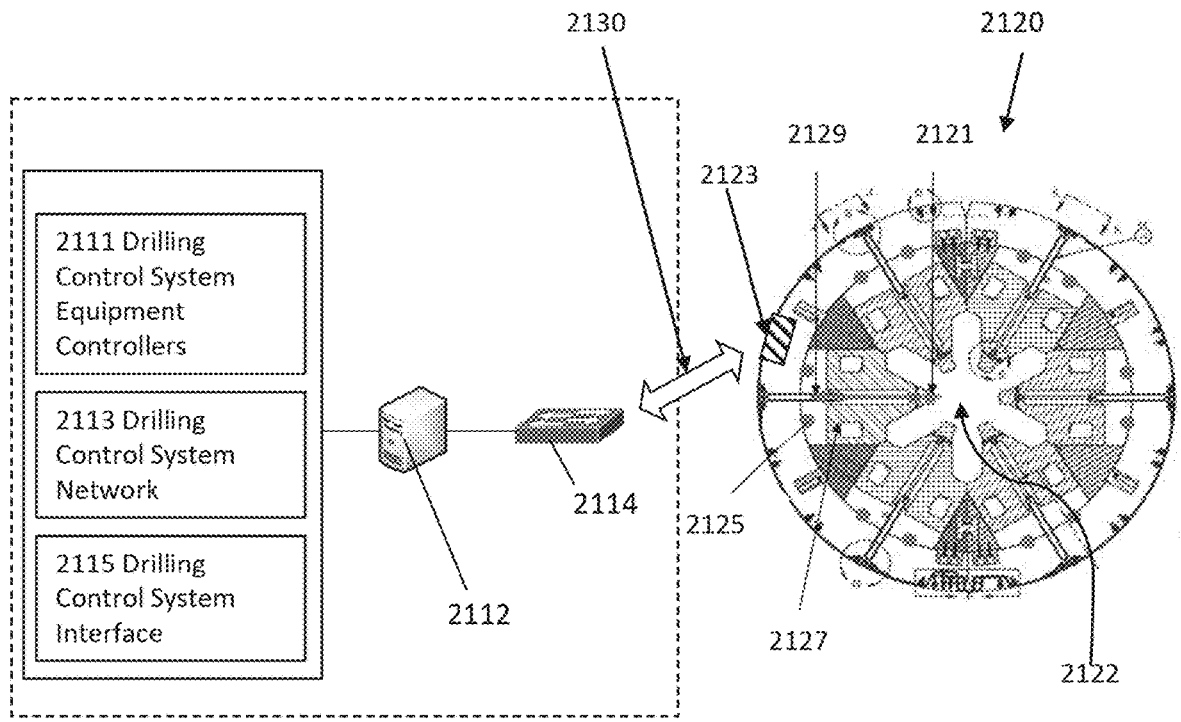
FIG. 21 is a diagram of components of drilling control system in communication with spider deck components, according to an embodiment.

FIG. 21 shows a network system 2101 formed form drilling control system (DCS) equipment controllers 2111, DCS network 2113, DCS interface 2115, a server 2112, a communication access point 2114, and a spider 2120. In an example embodiment, DCS equipment controllers 2111 may be part of robot controller 142, and/or may be part of spider system controller 246. Spider 2120 includes one or more sensors, such as a sensor 2125 for detecting positions of spider dogs 2127 which can be moved into an open direction as indicated by an arrow 2129, and a closed direction as indicated by an arrow 2121. Sensor(s) 2125 may be located on riser spider 2120 behind spider locking dogs 2127. Alternatively, sensor(s) 2125 may be mounted on a hydraulic cylinder configured to move spider dogs 2127.

Spider 2120 may communicate with access point 2114 using a spider associated communication module 2123 via a dual communication channel 2130 (e.g., channel 2130 may be used to exchange data between access point 2114 and 2123, and the data may be transmitted to and from access point 2114).

In an example embodiment, sensor 2125 may determine whether spider dogs 2127 are open or closed. Sensor 2125 may provide data to communication module 2123, and the communication module 2123 is configured to communicate with access point 2114, via server 2112 to DCS equipment controllers 2111. In some cases, information obtained from server 2112 may be transmitted via DCS network 2113 and DCS interface 2115 to various other suitable controllers or to a human operator. In an example embodiment, when spider dogs 2127 are closed, sensor 2125 reports the data to DCS equipment controllers 2111, and DCS equipment controllers 2111 are configured to control position, orientation, and/or configuration (e.g., shape, extension, and the like) of robotic arms 114A and 114B as well as position and/or orientation of spider deck components. For example, DC equipment controllers 2111 may be configured to move robotic arms 114A and/or 114B, or fold joints of robotic arms 114A and/or 114B such that robotic arms 114A and/or 114B are sufficiently removed from an opening 2122 of spider 2020.

In various embodiments, access point 2114 and module 2123 may interact with each other using any suitable means (e.g., wireless communication, wired communication, near field communication, optical communication, and the like). Further, while spider 2020 sensors 2025 are shown in FIG. 21, any other suitable sensors may be used for detecting events related to making and/or breaking a riser. For example, sensors for determining a proximity of a riser joint to spider 2020 may be used to determine whether robotic arms 114A and/or 114B, or spider deck components need to be moved away from a work area, as described above.

FIG. 22 shows an example process 2201 of determining whether robotic arms 114A and/or 114B should be kept from the work area or can be brought or allowed into the work area. At step 2211 of process 2201, a controller (e.g., DCS equipment controller 2111, which may be part of robot controller 142) may be configured to communicate with one or more sensors associated with a riser joint (or sensors associated with a crane lifting a riser joint). For example, the crane for lifting or lowering a riser joint may have associated sensors determining a height of a lowest point of the riser joint (or an assembly of riser joints, which, herein, is referred to as a traveling assembly) relative to a surface of spider 2020. In an example embodiment, the crane may have an associated crane communication module for transmitting data from the sensors to access point 2114, which in turn may communicate with one or more controllers (e.g., DCS equipment controllers 2111) for controlling position, orientation, or shape of robotic arms 114A and/or 114B. In an example embodiment, access point 2114 may communicate with the crane communication module using any suitable means such as wireless communication, wired communication, near field communication, optical communication, and the like.

If the traveling assembly is located at a height that is lower than a target height (i.e., if the traveling assembly is below a target height position, step 2211, Yes), then at step 2213, robotic arms 114A and 114B may be removed (or kept away) from the work area. Alternatively, if the traveling assembly is located at a height that is higher than a target height (step 2211, No), then at step 2215, robotic arms 114A and 114B may be kept in (or brought into) the work area.

Figure 23A:
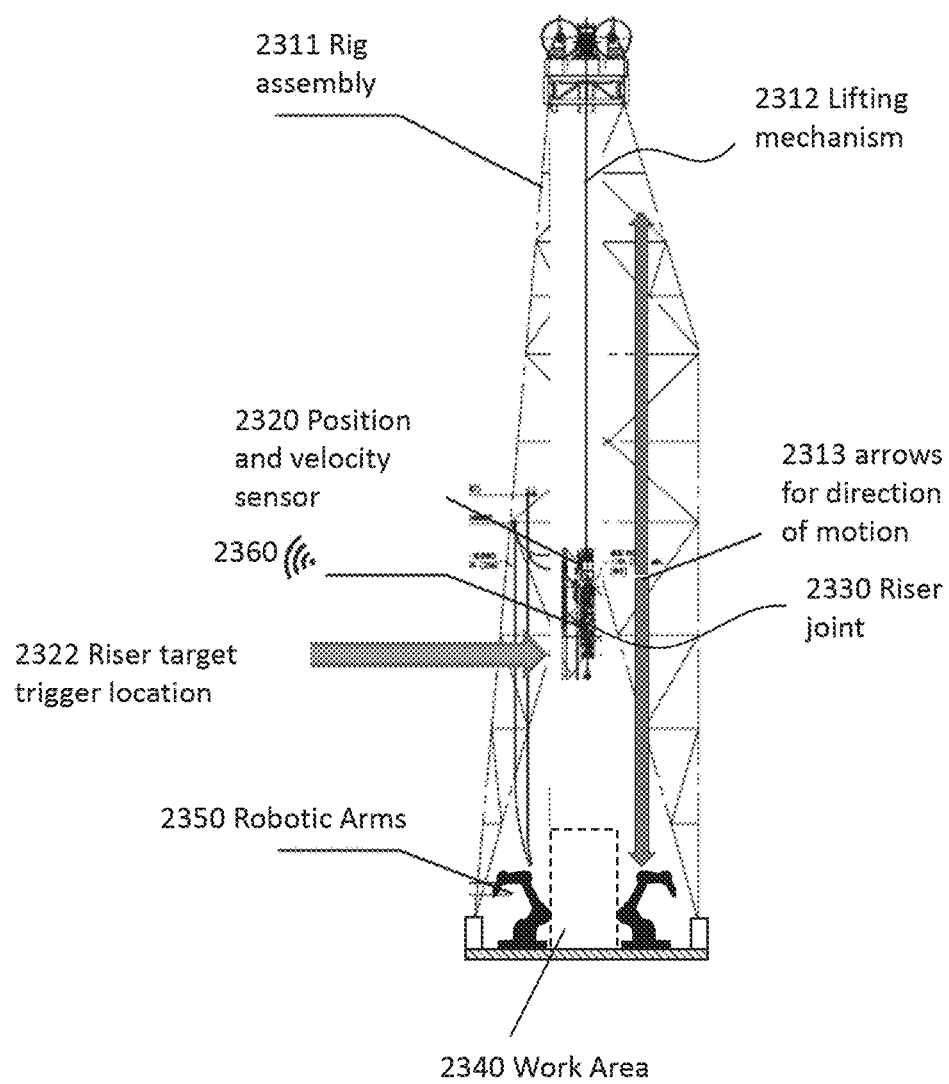
FIG. 23A is a schematic of a rig structure containing one or more riser joints and having robotic arms present in the work area, according to an embodiment.
Figure 23B:
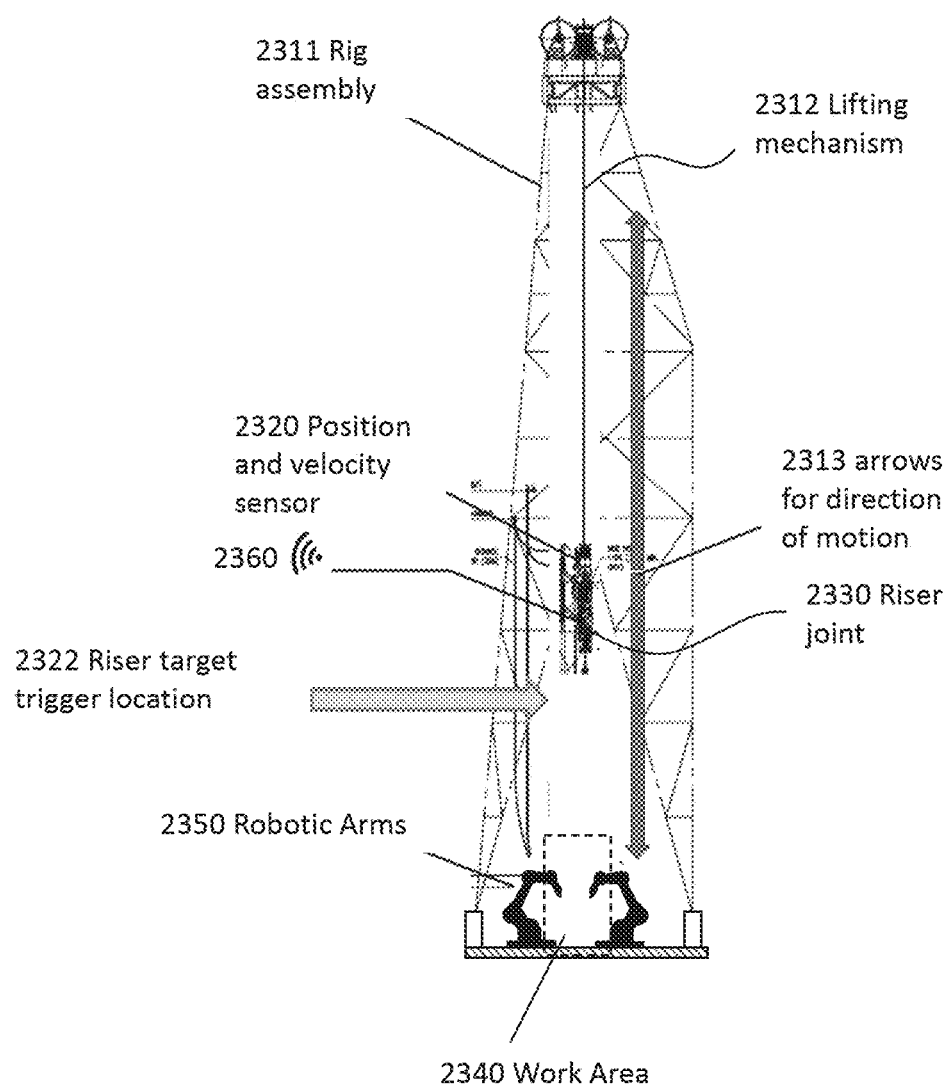
FIG. 23B is a schematic of a rig structure containing one or more riser joints and having robotic arms absent from the work area, according to an embodiment.

FIGS. 23A and 23B show a rig assembly 2311 including a lifting mechanism 2312 for lifting a riser joint 2330. In an example embodiment, 2313 arrows show a direction of motion of riser joint 2330. In an example embodiment, to prevent riser joint 2330 from moving laterally, riser joint 2330 may be attached to a vertical rail when moving vertically (e.g., lifting mechanism 2312 may be configured to slide along a vertical rail and simultaneously be attached to riser joint 2330). In an example embodiment, lifting mechanism 2312 may be attached to riser joint 2330 using any suitable approach (e.g., via bolts, clamps, hooks, and the like). Lift mechanism 2312 may be a crane configured to lift and lower riser joint 2330.

In various embodiments, riser joint 2330 (or lift mechanism 2312) may include position and velocity sensors 2320. In an example embodiment, position sensors 2320 may be configured to report positional data to a suitable controller (e.g., robot controller 142) for determining whether to move robotic arms 2350 into a work area 2340, to keep robotic arms 2350 in work area 2340, or move robotic arms 2350 from work area 2340. In some cases, robot controller 142 may be configured to determine a location of a lowest portion of riser joint 2330, to ensure that robotic arms 2350 may enter (or be kept into) work area 2340. In an example embodiment, as shown in FIG. 23A, robotic arms 2350 are moved away from work area 2340 due to the lowest point of riser joint 2330 being below a riser target trigger location 2322, while in FIG. 23B, robotic arms 2350 are moved towards work area 2340 due to the lowest point of riser joint 2330 being above riser target trigger location 2322.

In various embodiments, position of riser spider dogs 2127, as shown in FIG. 21, such as riser dogs 2127 open or close status may be sensed and used as a direct feedback to a riser system controller (e.g., robot controller 142) to be utilized for interlocking and operational permissive for the robotic riser handling system operational sequencing. In an example embodiment, spider dogs 2127 open/close positions may provide the feedback through either a hardwired network—using industry standard or proprietary protocols, a wireless network—using industry standard or proprietary protocols or hardwired I/O interfaces to the robotic riser control system. In an example embodiment, sensors 2125 for detecting whether spider dogs 2127 are open or close may be based on inductive technology, magnetic technology, digital limit switch encoder linear technology, lidar technology, camera technology, laser technology, accelerometer technology, or any other suitable proprietary sensing technology. In an example embodiment, all system interlocks and permissive will be programmed and resided in external or internal controller via means of industry standards, open source, or proprietary programming methods.

In various embodiments, spider dogs 2127 open/close positions will be used to drive prevent/allow robotic arms 2350 from entering work area 2340 (herein, also referred to as a working zone) in vicinity of riser spider center. Preventing robotic arms 2350 from entering work area 2340 prevents robotic arms 2350 from colliding with possible a riser joint or riser traveling assembly located at work area 2340. In various embodiments, and extend of work area 2340 (e.g., exact size of work area 2340 and boundaries of work area 2340) may be dynamically defined and tuned through a suitable controller interface on a case-by-case basis (e.g., depending on a type of work done at a riser spider, or depending on a type of a tool needed at the riser spider). In an example embodiment, if spider dogs 2127 are in an open status, robotic arms 2350 may be prevented from entering work area 2340.

In various embodiments, a position of riser joint 2330, as shown in FIGS. 23A and 23B is used for providing a feedback to be utilized for interlocking and operational permissive for the robotic riser handling system operational sequencing. In an example embodiment, a position may be measured in any suitable units (e.g., meters, feet, inches, etc.) from riser spider 2120 (riser spider 2120 is shown in FIG. 21). The measured position of riser joint 2330 may provide the feedback through a hardwired network using industry standard or proprietary protocols, a wireless network—using industry standard or proprietary protocols, or a hardwired I/O interfaces to the robotic riser control system (e.g., to a robotic controller 142). In an example embodiment, sensors 2320 for detecting position of riser joint 2330 may be based on inductive technology, magnetic technology, digital limit switch encoder linear technology, lidar technology, camera technology, laser technology, accelerometer technology, or any other suitable proprietary sensing technology. In an example embodiment, all system interlocks and permissive will be programmed and resided in external or internal controller via means of industry standards, open source, or proprietary programming methods.

In various embodiments, position determined by sensors 2320 will be used to drive prevent/allow robotic arms 2350 from entering work area 2340 in vicinity of riser spider center. In various embodiments, and extend of work area 2340 (e.g., exact size of work area 2340 and boundaries of work area 2340) may be dynamically defined and tuned through a suitable controller interface on a case by case basis (e.g., depending on a type of work done at a riser spider, or depending on a type of a tool needed at the riser spider). In an example embodiment, if riser joint 2330 is below riser target trigger location 2322, then robotic arms 2350 may be prevented from entering work area 2340. In various embodiment, riser target trigger location 2322 may be determined on a case-by-case basis. (e.g., depending on a type of work done at a riser spider, depending on a type of a tool needed at the riser spider, depending on a type of riser joint, and the like).

In various embodiments a network system formed from suitable drilling control system (DCS) equipment controllers 2111, DCS network 2113, DCS interface 2115, a server 2112, a communication access point 2114, and a communication module 2360 associated with either rig assembly 2311 or riser joint 2330. In an example embodiment, as described above, DCS equipment controllers 2111 may be part of robot controller 142, and/or may be part of spider system controller 246. Communication module 2360 may be installed on riser assembly 2311, and may interact with access point 2114 via a dual communication channel (e.g., the dual communication channel may be used to exchange data between access point 2114 and module 2160, and the data may be transmitted to and from access point 2114).

In an example embodiment, module 2360 may receive information from sensors 2320 and the communication module 2160 is configured to communicate with access point 2114, via server 2112 to DCS equipment controllers 2111. In some cases, information obtained from server 2112 may be transmitted via DCS network 2113 and DCS interface 2115 to various other suitable controllers or to a human operator. In an example embodiment, when riser joint is above trigger location 2322, module 2360 reports the data to DCS controllers 2111, and DCS equipment controllers 2111 are configured to control position, orientation, and/or configuration (e.g., shape, extension, and the like) of robotic arms 114A and 114B as well as position and/or orientation of spider deck components. For example, DC equipment controllers 2111 may be configured to move robotic arms 114A and/or 114B, or fold joints of robotic arms 114A and/or 114B such that robotic arms 114A and/or 114B are sufficiently removed from an opening 2122 of spider 2020 (as shown in FIG. 20).

In various embodiments, access point 2114 and module 2360 may interact with each other using any suitable means (e.g., wireless communication, wired communication, near field communication, optical communication, and the like). Further, while sensors 2320 are shown in FIGS. 23A and 23B, any other suitable sensors may be used for detecting events related to making and/or breaking a riser. For example, sensors for determining an orientation of riser joint 2330, a vibration of riser joint 2330, an acceleration or speed or riser joint 2330 may be used to determine whether robotic arms 114A and/or 114B, or spider deck components need to be moved away from a work area, as described above.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

As used herein in the specification and in the claims, the terms "target" and "control target" are used interchangeably.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system configured to make or break a riser having a riser joint, the system comprising:
    (a) a robotic system having:
        one or more robotic arms, each having six degrees of freedom; and
        one or more riser-connection manipulation tools each having a camera and being configured to manipulate a riser connection, the camera being configured to capture an image of an object, wherein each robotic arm is configured to couple to one riser-connection manipulation tool; and
    (b) a control system having:
        a robot controller in communication with the one or more robotic arms and configured to control the one or more robotic arms;
        wherein the robot controller is configured to: (1) analyze the image to determine the location and orientation of the object; and (2) transmit signals to the one or more robotic arms based on the determined location and the orientation of the object.

2. The system of claim 1, wherein the one or more robotic arms comprise:
    a first robotic arm; and
    a second robotic arm substantially diametrically opposed to the first robotic arm.

3. The system of claim 1, wherein the riser connection is at least one of a riser bolt, a breech lock, or a latching dog.

4. The system of claim 3, wherein the riser-connection manipulation tool is a multi-function tool configured to place the riser bolt into the riser joint, remove the riser bolt from the riser joint, manipulate the breech lock, manipulate the latching dog, manipulate a stabbing guide, manipulate a hole cover, apply a pre-determined torque, or a combination thereof.

5. The system of claim 4, wherein the multi-function tool further comprises:
    a socket disposed below the camera and configured to engage a head of the riser bolt;
    a servo motor operatively coupled to the socket and configured to drive the socket; and
    a fork tool assembly having a retaining fork disposed in proximity to the socket, the fork tool assembly being configured to pick and place an object using the retaining fork.

6. The system of claim 5, wherein the fork tool assembly further comprises a retaining fork actuation cylinder operatively coupled to the retaining fork and configured to extend and retract the retaining fork.

7. The system of claim 5, wherein when the image is a head of the riser bolt, analyzing the image comprises using line recognition to detect a straight line of the riser bolt and determine a rotation angle of the straight line, the control system being configured to send the rotation angle to the servo motor of the multi-function tool, thereby permitting the servo motor to rotate the socket to match the rotation of the head of the riser bolt.

8. The system of claim 5, wherein the multi-function tool is configured to rotate the socket back and forth at a pre-determined frequency when the socket is engaged or disengaged from the head of the riser bolt.

9. The system of claim 1, wherein the riser-connection manipulation tool is a torque wrench tool configured to apply a pre-determined torque.

10. The system of claim 9, wherein the riser connection is a riser bolt, and wherein the pre-determined torque is configured to be applied to a head of the riser bolt that is disposed on the riser joint, thereby tightening or loosening the riser bolt from the riser joint.

11. The system of claim 10, wherein the torque wrench tool further comprises a socket disposed below the camera and configured to rotate, thereby applying the pre-determined torque to the head of the riser bolt.

12. The system of claim 11, wherein the torque wrench tool further comprises a hydraulic torque tool operatively coupled to the socket and configured to rotate the socket.

13. The system of claim 11, further comprising a pressure sensor configured to measure a hydraulic pressure provided to the torque wrench tool, thereby detecting when the predetermined torque is achieved.

14. The system of claim 1, further comprising a quick-change system having:
   a master end disposed on a distal end of the first or second robotic arm; and
   a tool end disposed on the riser-connection manipulation tool and configured to couple to the master end, the quick-changing system being configured to permit each robotic arm to replace one riser-connection manipulation tool with another riser-connection manipulation tool.

15. The system of claim 14, wherein the tool end is configured to couple to the master end through a fail-safe ball lock system.

16. The system of claim 1, further comprising an auxiliary line fill tool configured to fill a riser conduit with a drilling fluid while making the riser.

17. The system of claim 1, wherein the robot controller is a programmable logic controller.

18. The system of claim 1, wherein the riser connection is a riser bolt, and wherein the system is configured to pick up the riser bolt from a bolt receptacle and secure the riser bolt to the riser joint without human intervention, thereby making the riser.

19. The system of claim 1, wherein the riser connection is a riser bolt, and wherein the system is configured to remove the riser bolt from the riser joint and place it into a bolt receptacle without human intervention, thereby breaking the riser.

20. The system of claim 1, wherein the control system further comprises a human machine interface configured to provide input to the robot controller by an operator.

21. The system of claim 1, wherein the robotic system has at most four robotic arms.

22. The system of claim 1, wherein at least one robotic arm is configured to manipulate more than one riser connection to make or break the riser.

\* \* \* \* \*